(12) United States Patent
Kadarundalagi Raghura et al.

(10) Patent No.: US 12,399,905 B2
(45) Date of Patent: Aug. 26, 2025

(54) CONTEXT-SENSITIVE LINKING OF ENTITIES TO PRIVATE DATABASES

(71) Applicant: Amazon Technologies, Inc., Seattle, WA (US)

(72) Inventors: Srikanth Doss Kadarundalagi Raghura, Seattle, WA (US); Yogarshi Paritosh Vyas, New York, NY (US); Miguel Ballesteros Martinez, New York, NY (US); Yahor Pushkin, Redmond, WA (US); Sunil Mallya Kasaragod, San Francisco, CA (US); Yaser Al-Onaizan, Cortlandt Manor, NY (US); Sameer Karnik, Issaquah, WA (US); Abhinav Goyal, Snohomish, WA (US); Graham Vintcent Horwood, Centreville, VA (US); Kapil Singh Badesara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 17/039,887

(22) Filed: Sep. 30, 2020

(65) Prior Publication Data

US 2022/0100772 A1    Mar. 31, 2022

(51) Int. Cl.
*G06F 16/25*    (2019.01)
*G06F 16/23*    (2019.01)
(Continued)

(52) U.S. Cl.
CPC ........ *G06F 16/254* (2019.01); *G06F 16/2358* (2019.01); *G06F 21/6218* (2013.01); *G06F 40/289* (2020.01); *H04L 67/10* (2013.01)

(58) Field of Classification Search
CPC .............. G06F 16/254; G06F 16/2358; G06F 21/6218; G06F 40/289; G06F 40/30; H04L 67/10
See application file for complete search history.

(56) References Cited

U.S. PATENT DOCUMENTS

| | | |
|---|---|---|
| 8,036,876 B2 | 10/2011 | Sanfilippo et al. |
| 8,374,862 B2 | 2/2013 | Bocking |

(Continued)

FOREIGN PATENT DOCUMENTS

WO    2013016071 A1    1/2013

OTHER PUBLICATIONS

International Search Report and Written Opinion mailed Jan. 5, 2022 in International Patent Application No. PCT/US2021/051955, Amazon Technologies, Inc., pp. 1-12.

(Continued)

*Primary Examiner* — Charles D Adams
(74) *Attorney, Agent, or Firm* — Robert C. Kowert; Kowert, Hood, Munyon, Rankin & Goetzel, P.C.

(57) ABSTRACT

Methods, systems, and computer-readable media for context-sensitive linking of entities to private databases are disclosed. An entity linking service stores a plurality of representations of entities. Individual ones of the entities correspond to individual ones of a plurality of records in one or more private databases. The entity linking service determines a mention of an entity in a document. The entity linking service selects, from the plurality of records in the one or more private databases, a record corresponding to the entity. The record is selected based at least in part on the plurality of representations of the entities and based at least in part on a context of the mention of the entity in the (Continued)

document. The entity linking service generates output comprising a reference to the selected record in the one or more private databases.

16 Claims, 23 Drawing Sheets

(51) Int. Cl.
*G06F 21/62* (2013.01)
*G06F 40/289* (2020.01)
*H04L 67/10* (2022.01)

(56) References Cited

U.S. PATENT DOCUMENTS

| | | | |
|---|---|---|---|
| 8,799,237 | B2 | 8/2014 | Walsh et al. |
| 9,183,290 | B2 | 11/2015 | Griffith |
| 10,133,728 | B2 | 11/2018 | Poon et al. |
| 10,133,791 | B1 | 11/2018 | Chan |
| 10,152,478 | B2 | 12/2018 | Langmead et al. |
| 10,242,320 | B1 | 3/2019 | Elkholy et al. |
| 10,503,748 | B1 | 12/2019 | Farrow |
| 10,509,829 | B2 | 12/2019 | Rambhia et al. |
| 10,521,466 | B2 | 12/2019 | Bellegarda et al. |
| 10,623,890 | B1 | 4/2020 | Greenberger et al. |
| 10,691,698 | B2 | 6/2020 | Chandrasekaran et al. |
| 11,954,126 | B2 | 4/2024 | Srinivasan |
| 2011/0213742 | A1 | 9/2011 | Lemmond |
| 2012/0084292 | A1 | 4/2012 | Liang |
| 2014/0278373 | A1 | 9/2014 | Grove et al. |
| 2015/0379423 | A1 | 12/2015 | Dirac |
| 2016/0019470 | A1 | 1/2016 | Lightner |
| 2016/0132590 | A1* | 5/2016 | Byron ................ G06F 16/3344 707/722 |
| 2016/0180245 | A1* | 6/2016 | Tereshkov ............ G06N 20/00 706/12 |
| 2016/0360382 | A1 | 12/2016 | Gross et al. |
| 2017/0097966 | A1* | 4/2017 | Kozareva ............... G06Q 30/02 |
| 2017/0344625 | A1 | 11/2017 | Hosokawa |
| 2018/0137404 | A1 | 5/2018 | Fauceglia et al. |
| 2018/0260474 | A1 | 9/2018 | Surdeanu |
| 2019/0163739 | A1 | 5/2019 | Marascu et al. |
| 2019/0222602 | A1* | 7/2019 | Linder ................ H04L 63/1433 |
| 2020/0192979 | A1 | 6/2020 | Liu et al. |
| 2020/0202171 | A1 | 6/2020 | Hughes |
| 2020/0286002 | A1 | 9/2020 | Szanto et al. |
| 2021/0056131 | A1* | 2/2021 | Ackermann .......... G06F 16/383 |
| 2021/0149993 | A1 | 5/2021 | Torres |
| 2021/0232920 | A1 | 7/2021 | Parangi |
| 2021/0240934 | A1 | 8/2021 | Mahajan |
| 2022/0100963 | A1 | 3/2022 | Anubhai et al. |
| 2022/0100967 | A1 | 3/2022 | Pushkin et al. |

OTHER PUBLICATIONS

U.S. Appl. No. 17/039,919, filed Sep. 30, 2020, Rishita Rajal Anubhai, et al.

U.S. Appl. No. 17/039,891, filed Sep. 30, 2020, Yahor Pushkin, et al.

Trung Minh Nguyen, Thien Huu Nguyen, "One for All: Neural Joint Modeling of Entities and Events," The 33rd AAAI Conference on Artificial Intelligence (AAAI-19), Honolulu, Hawaii, Dec. 2018, pp. 1-8.

Sen Yang, Dawei Feng, Linbo Qiao, Zhigang Kan, Dongsheng Li, "Exploring Pre-Trained Language Models for Event Extraction and Generation," Proceedings of the 57th Annual Meeting of the Association for Computational Linguistics, pp. 5284-5294, Florence, Italy, Jul. 2019.

Kiao Liu, Zhunchen Luo, Heyan Huang, "Jointly Multiple Events Extraction via Attention Based Graph Information Aggregation," Proceedings of the 2018 Conference on Empirical Methods in Natural Language Processing, pp. 1247-1256, Brussels, Belgium, Oct. 2018.

Lei Sha, Feng Qian, Baobao Chang, Zhifang Sui, "Jointly Extracting Event Triggers and Arguments by Dependency-Bridge RNN and Tensor-Based Argument Interaction," The 32nd AAAI Conference on Artificial Intelligence (AAAI-18), New Orleans, Louisiana, Feb. 2018, pp. 1-8.

Yubo Chen, Liheng Xu, Kang Liu, Daojian Zeng, Jun Zhao, "Event Extraction via Dynamic Multi-Pooling Convolutional Neural Networks," Proceedings of the 53rd Annual Meeting of the Association for Computational Linguistics and the 7th International Joint Conference on Natural Language Processing (vol. 1: Long Papers), pp. 167-176, Beijing, China, Jul. 2018.

Qi Li, Heng Ji, Liang Huang, "Joint Event Extraction via Structured Prediction with Global Features," Proceedings of the 51st Annual Meeting of the Association for Computational Linguistics, pp. 73-82, Sofia, Bulgaria, Aug. 2013.

Jing Lu, Vincent Ng, "Joint Learning for Event Coreference Resolution," Proceedings of the 55th Annual Meeting of the Association for Computational Linguistics, pp. 90-101, Vancouver, Canada, Jul. 2017.

Haoruo Peng, Yangqiu Song, Dan Roth, "Event Detection and Co-reference with Minimal Supervision," Proceedings of the 2016 Conference on Empirical Methods in Natural Language Processing, pp. 392-402, Austin, Texas, Nov. 2016.

Kenton Lee, Luheng He, Luke Zettlemoyer, "Higher-Order Coreference Resolution with Coarse-to-Fine Inference," Proceedings of NAACL-HLT 2018, pp. 687-692, New Orleans, Louisiana, Jun. 2018.

Kenton Lee, Luheng He, Mike Lewis, Luke Zettlemoyer, "End-to-end Neural Coreference Resolution," Proceedings of the 2017 Conference on Empirical Methods in Natural Language Processing, Jul. 2017, pp. 1-10.

Jacob Devlin, Ming-Wei Chang, Kenton Lee, Kristina Toutanova, "BERT: Pre-training of Deep Bidirectional Transformers for Language Understanding," Proceedings of NAACL-HLT 2019, pp. 4171-4186, Minneapolis, Minnesota, May 2019.

* cited by examiner

CONTEXT-SENSITIVE LINKING OF ENTITIES TO PRIVATE DATABASES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated.

Figure 1A:
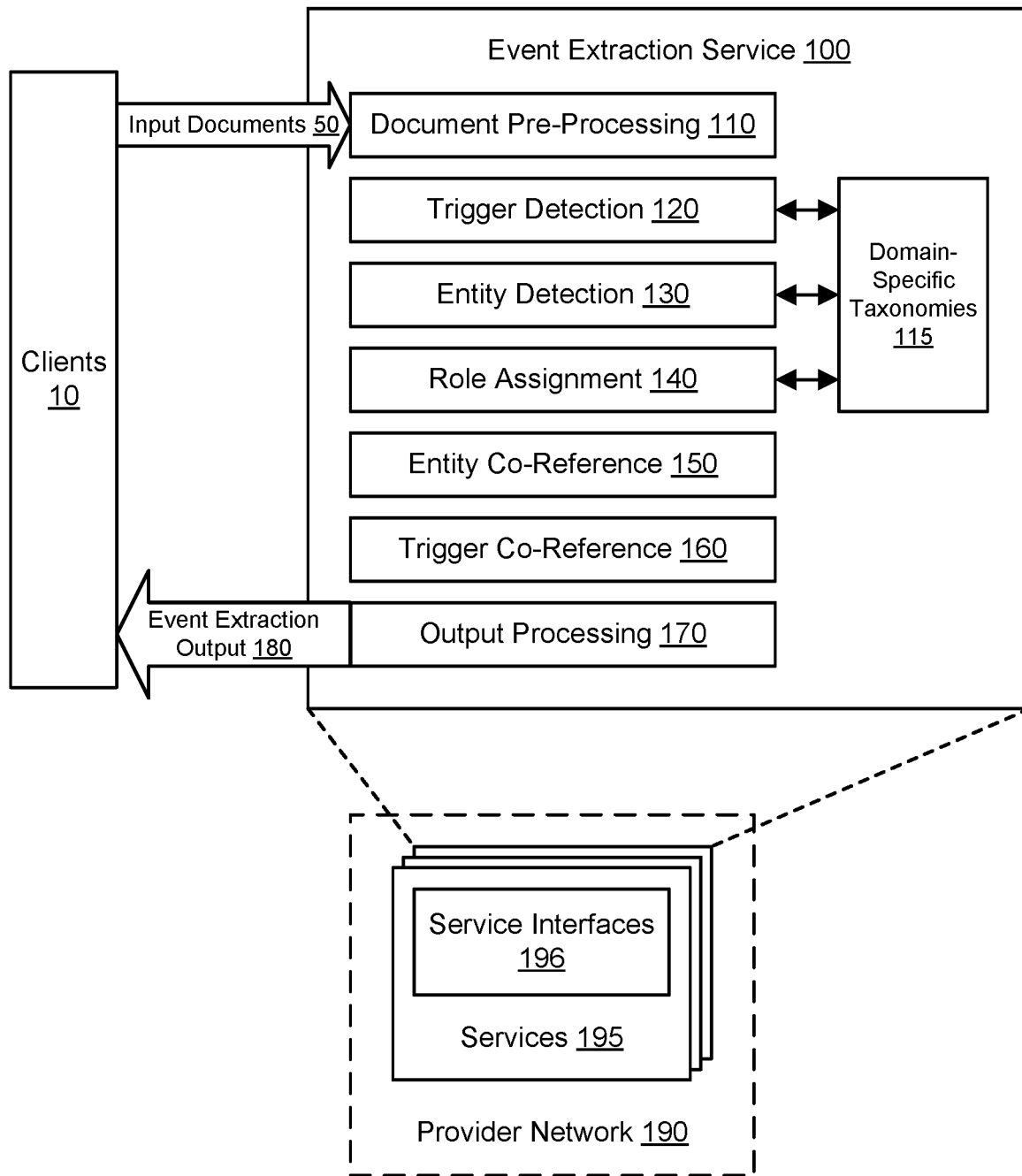
FIG. 1A and FIG. 1B illustrate an example system environment for event extraction from documents with co-reference, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for context-sensitive linking of entities to private databases are described. Vast amounts of unstructured text are generated every day, often in the form of e-mails, news articles, press releases, research documents, official reports from public entities, and other documents. Consumers of such data (e.g., individuals, private sector companies, and other organizations) may have a need to identify entities (e.g., persons, places, or things) in such documents and then link those entities to relevant information in databases or knowledge bases. Manual approaches for performing entity linking from text to databases may be time-consuming and prone to error. A mention of an entity in a document may be ambiguous or may potentially be matchable with more than one record in a database, e.g., if the database includes different records for several people having the same name. Prior automated approaches for entity linking may not be able to perform accurate disambiguation. Additionally, databases with relevant information may be private, proprietary, and/or confidential. For example, a private database may include records for names, addresses, and other data for employees of a particular organization. As another example, a private database may include a list of place names along with proprietary information descriptive of those places. Entity linking may become more complicated if the text that mentions an entity is unstructured while any private databases with additional entity data store structured content (e.g., with individual records including attribute-value pairs) according to a diverse set of schemas.

The aforementioned challenges, among others, are addressed by embodiments of the techniques described herein, whereby an entity linking service performs automated analysis of input documents to link mentions of entities in those documents to records in private databases. The entity linking service may be hosted in the cloud using a provider network that offers numerous services to a distributed set of clients. Entity linking by the entity linking service may include disambiguating mentions in text against one or more databases or knowledge bases. Disambiguation may include selecting one record that best matches an entity mention and not selecting other records that represent potential matches. The text with entity mentions may be unstructured. In contrast, the information (e.g., records) in the private databases may generally be structured, e.g., with records having values for particular fields or with other attribute-value pairs. Entity linking may be performed for databases having diverse and varied schemas that describe the format of database contents. The entity linking service may transform records in one or more source databases from one or more source schemas to a single target schema. One or more Extract-Transform-Load (ETL) tools may be used for extracting records, transforming records into the target schema, and loading the records into storage locations that are accessible to the entity linking service. Because the private databases may not be globally accessible to all users, the entity linking service may use access credentials of owners of the private databases to access the databases and/or the extracted, transformed, and loaded records.

The entity linking service may convert or transform records in private databases into flat strings or vectors with fixed numbers of values or fixed lengths. Records may be converted into contextual representations that are sensitive to a context within the source database, e.g., a context of the converted record. The entity linking service may use the contextual representations to determine a set of candidate records for a particular mention, e.g., by filtering out a large number of contextual representations that represent unlikely matches with the mention. The candidate contextual representations and/or corresponding candidate records may be ranked according to scores or other values indicative of a likely match with an entity mention. The entity linking service may examine one or more of the candidate records in the private database(s) to select a record representing the best match for a mention. The entity linking service may generate output including a link or reference to a record in a private database that matches a particular mention, e.g., in a user interface in which the mention can be highlighted in the text and portions of the record can be presented at the same time. Using automated techniques, the entity linking service may simplify the linking of entity mentions from documents to private databases while providing both accuracy and scalability.

As one skilled in the art will appreciate in light of this disclosure, embodiments may be capable of achieving certain technical advantages, including some or all of the following: (1) improving the latency of entity linking from text using automated techniques instead of manual review; (2) improving the scalability of entity linking from text using automated techniques instead of manual review; (3) improving the accuracy of entity linking from text using automated techniques instead of manual review; (4) improving the security of entity linking to private databases using access credentials to access the databases as needed; and so on.

Embodiments of methods, systems, and computer-readable media for event extraction from documents with co-reference are described. Vast amounts of unstructured text are generated every day, often in the form of news articles, press releases, research documents, official reports from governmental entities, official filings with governmental entities, and other documents. Consumers of such data (e.g., individuals, private-sector companies, and other organizations) in particular domains may have a need to identify important events in such documents. For example, a consumer of public health data may seek to discover events in announcements regarding public health concerns, announcements regarding progress towards treatments, and so on, such that the consumer can plan a course of action. As another example, a consumer that builds predictive models about private-sector organizations may seek to discover relevant events such as mergers, acquisitions, initial public offerings, product announcements, leadership changes, and so on. In some domains, millions of pages of text may be generated on a daily basis. Prior approaches have used manual review and unsophisticated rules-based automation to extract events from documents. Manual processes may be slow, expensive, and prone to error, especially for very large amounts of data. Rules-based approaches may require large investments from organizations for development and continued maintenance of customized solutions. Additionally, rules-based approaches may miss vital events while also reporting irrelevant information.

The aforementioned challenges, among others, are addressed by embodiments of the techniques described herein, whereby an event extraction service performs automated extraction of events and relevant entities from potentially very large amounts of textual input. The event extraction service may be hosted in the cloud using a provider network that offers numerous services to a distributed set of clients. The event extraction service may employ machine learning techniques for increased accuracy of event extraction. Machine learning models may be pre-trained for particular domains such as public health and analysis of private-sector behavior. For a given document, the event extraction service may identify words that represent triggers for occurrences of events, identify words (mentions) that represent entities (e.g., real-world objects such as persons, organizations, places, dates, and so on), and assign entities to semantic roles for the triggers (e.g., who, where, when, etc.). The event extraction service may group related trigger representations (e.g., synonyms for the same occurrence of a particular event type) and/or group related entity representations (e.g., the initial reference to a named organization as well as subsequent pronouns with the same referent). For a particular input document, the event extraction service may produce output that identifies one or more events described in the document along with relevant entities that fill roles for the particular event type while filtering out and not reporting irrelevant entities. For example, for a public health event, the event extraction service may report the event type (e.g., a disease outbreak), the organization that made the announcement, the date of the announcement, the place at which the announcement was made, and so on. Using automated techniques, the event extraction service may simplify the extraction of events from documents for clients while providing both accuracy and scalability.

As one skilled in the art will appreciate in light of this disclosure, embodiments may be capable of achieving certain technical advantages, including some or all of the following: (1) improving the latency of event extraction from documents using automated techniques such as machine learning instead of manual review; (2) improving the scalability of event extraction from documents using automated techniques such as machine learning instead of manual review; (3) improving the accuracy of event extraction from documents using automated techniques for trigger detection, event detection, role assignment, trigger co-reference, and entity co-reference; and so on.

Embodiments of methods, systems, and computer-readable media for lifecycle management for customized natural language processing are described. Vast amounts of unstructured text are generated every day, often in the form of e-mails, news articles, press releases, research documents, official reports from public entities, and other documents. Consumers of such data (e.g., individuals, private sector companies, and other organizations) may have a need to perform custom natural language processing (NLP) tasks such as document classification, event extraction, entity extraction, and so on. Custom NLP tasks may often require knowledge of domain-specific attributes such as different document categories, different event types, different entity types, different semantic roles of entities to events, and other attributes that vary from domain to domain. For example, a consumer in the public health domain may have different requirements for custom NLP tasks than a consumer in the investment domain. Additionally, some consumers may wish to combine NLP tasks such as custom document classification and custom event extraction. Due to the complexity of these NLP tasks, the time and resources required to build and deploy custom NLP solutions may pose obstacles to many consumers.

The aforementioned challenges, among others, are addressed by embodiments of the techniques described herein, whereby an NLP customization service may provide automated (or semi-automated) management of custom NLP models across the model lifecycle on behalf of clients. An NLP model may include a machine learning model that can analyze natural language input (e.g., in the form of documents) and output predictions based (at least in part) on the contents of the input. For example, a custom NLP model may be used to classify documents in various categories, extract events from documents, extract entities from documents, link entities to records in databases, and so on. The NLP customization service may be hosted in the cloud using a provider network that offers numerous services to a distributed set of clients. A custom NLP model lifecycle may include various stages such as collecting training data for a model, annotating the training data, selecting attributes for the model, training the model, evaluating the trained model (e.g., for accuracy and/or performance), deploying the trained model to a production environment, using the deployed model to provide predictions (inference), and refining or fine-tuning the model over time (e.g., to adapt to changing conditions observed in newer input documents). One or more of the lifecycle stages may be performed in the absence of user input. Using automated techniques, the NLP customization service may simplify the creation and management of custom NLP applications while reducing the need for manual oversight.

As one skilled in the art will appreciate in light of this disclosure, embodiments may be capable of achieving certain technical advantages, including some or all of the following: (1) improving the latency of building, training, and deploying custom natural language processing (NLP) models using automated techniques that reduce the need for user input; (2) improving the accuracy of custom NLP models using automated techniques for evaluation against user-specified requirements; (3) improving the performance of custom NLP models using automated techniques for evaluation against user-specified requirements; (4) improving the accuracy of custom NLP models over time using automated techniques for monitoring and fine-tuning custom models; and so on.

Event Extraction from Documents with Co-Reference

FIG. 1A illustrates an example system environment for event extraction from documents with co-reference, according to some embodiments. An event extraction service 100 may perform event extraction tasks on input documents 50 for a distributed set of clients 10. In some embodiments, the input documents 50 may include news articles, press releases, research papers, official reports from governmental entities, official filings with governmental entities, and so on. The input documents 50 may be generated through various publishing channels and outlets by various news sources, private-sector groups, public-sector groups, individuals, groups, and so on. The input documents 50 may generally include free-form text, e.g., phrases, sentences, paragraphs, headings, sub-headings, captions for images, and so on. The input documents 50 may represent unstructured information such that the documents may not be associated with pre-determined schemas that describe the structure of document contents. The input documents 50 may include expressions in one or more natural languages. A natural language expressed in the input documents 50 may represent a language, such as English, that developed naturally among people, in contrast to an artificial language or a computer programming language.

In some embodiments, one or more of the input documents 50 may be generated using transformation of audio input to text, e.g., using speech recognition techniques. In some embodiments, one or more of the input documents 50 may be generated using transformation of image input or video input to text, e.g., using optical character recognition (OCR) techniques. The transformation of audio, images, or video to text may be performed by another service, e.g., an audio transcription or OCR service hosted by the same provider network that hosts the event extraction service 100.

At least some of the clients 10 may have domain-specific requirements. For example, a particular client in the public health domain may seek to identify particular types of events such as announcements of outbreaks and announcements of new treatments, and those event types may have domain-specific taxonomies of entities and roles. Using the event extraction service 100, a particular event type may be associated with argument slots that represent relationships of particular entities to a particular occurrence (an event) of the event type. These relationships may be described by domain-specific taxonomies 125 and may influence the event extraction process once a trigger is detected in a document. For example, an "outbreak" event type may be associated with argument slots for semantic roles such as the name of the outbreak, the entity that is reporting the outbreak, the date of the outbreak or the announcement, the location where the outbreak was detected, the location at which the announcement was made, and so on. By identifying such public health events, the client may develop or update predictive models about public health patterns, develop plans to respond to public health crises, and so on. As another example, a particular client that analyzes behaviors of private-sector organizations may seek to identify particular types of events such as mergers, acquisitions, initial public offerings, product announcements, earnings announcements, leadership changes, changes in analyst ratings, changes in price targets, and so on. The semantic roles for such organizational events may differ from those of the outbreak event type in the public health domain. By identifying such organizational events, the client may develop or update predictive models about future organizational behavior.

A client of the event extraction service 100 may invoke or request event extraction tasks using one or more calls to a service interface of the event extraction service. In connection with such a service call, a client of the event extraction service 100 may provide one or more documents (or references to one or more documents) to the service. The input documents 50 for a given client may be provided to the service 100 as single documents or in batches of varying size (e.g., using one call to the service to request event extraction for one document or many documents). In some embodiments, the input documents 50 may be collected by a client and stored in a storage location, e.g., a storage bucket of a storage service hosted by the same provider network that offers the event extraction service 100. The client may specify the storage location, and the event extraction service 100 may read one or more input documents 50 from the storage location. In some embodiments, the event extraction service 100 may use an access credential associated with the client (e.g., an account name and password or an identity and access management role) to read input documents 50 from the storage location.

For a particular input document, the event extraction service 100 may use automated techniques to perform event extraction tasks such as identifying words that represent triggers for occurrences of events, identifying words that represent entities, and assigning entities to semantic roles for the events (e.g., who, where, when, etc.). In some embodiments, the event extraction service 100 may perform pre-processing 110 of the text of an input document, e.g., to break the text into a sequence of tokens (e.g., individual words or numbers) and potentially perform clean-up tasks before performing additional event extraction tasks. In some embodiments, using a component for trigger detection 120, the event extraction service 100 may identify any triggers in an input document. A trigger may represent a word or short phrase that best expresses the occurrence of an event. An event represents an occurrence that happened or could happen in the real world. An event may represent some change of state. The event extraction service 100 may classify events in different event types. A trigger may represent a textual reference to a unique event type and a span of tokens within the input document. For example, the trigger detection 120 may detect "elected" or "voted in" as the trigger for an "election" event type that represents a change in the state of an elected office in a government. In some embodiments, multiple triggers in the same input document may refer to the same occurrence.

In some embodiments, using a component for entity detection 130, the event extraction service 100 may identify any entities in an input document. Entities may include references to real-world objects such as persons, groups of people, organizations, things, places, dates, and so on. Entities may often be associated with names and pronouns in the input documents 50. An entity may represent a textual reference to a unique entity type and a span of tokens within the input document. For example, the entity detection 130 may detect "Joan Smith" as a particular example of a "person" entity type. A mention may represent the occurrence of an entity in the document. An entity group may include multiple expressions that refer to the same real-world object. For example, within one input document, the different expressions "Joan Smith," "Ms. Smith," and "she" may be assigned to the same entity group if they are predicted to refer to the same person.

In some embodiments, using a component for role assignment 140, the event extraction service 100 may assign entities to semantic roles associated with triggers or events. An argument may represent an entity or entity group that stands in a particular semantic relationship with respect to an occurrence of an event type. Arguments may fill semantic roles specified by the domain-specific taxonomies 125. The role assignment 140 may assign identified entities to one or more of the roles associated with a trigger. The role assignment 140 may select one or more of the identified entities for assignment to one or more roles and may discard or not select others of the identified entities. For example, an input document may be analyzed by the service 100 to detect a trigger ("elected") for an "election" event type and to assign entities to election-related roles such as "Joan Smith" (elected person), "November 3" (date of election), "U.S. House" (office), "New York" (constituency), and so on. The event type and the role assignments may be included in the output of the event extraction service 100 for the particular input document. For the same "election" event, the role assignment 140 may not assign roles to other entities such as other people who are quoted in the document, named family members of Ms. Smith, other dates, other places, and so on. These other entities may be excluded from the output of the event extraction service 100 for the particular input document.

In some embodiments, using a component for entity co-reference 150, the event extraction service 100 may group related entity representations in the same document. An entity group may include one or more related entity representations. Related entity representations may include, for example, the initial reference to a named organization as well as subsequent pronouns (e.g., "it" or "they") or other references to the same organization. In some embodiments, using a component for trigger (event) co-reference 160, the event extraction service 100 may group related trigger representations in the same document. A trigger group or event group may include one or more related trigger representations or event representations. Related trigger or event representations may include, for example, synonyms for the same occurrence of a particular event type or repeated references to the same occurrence of a particular event type. Using the entity co-reference 150 and the trigger co-reference 160, the outputs of the event extraction service 100 may be simplified by grouping or clustering triggers or entities. For example, an output data structure may indicate that multiple entity representations (e.g., "Ms. Smith," "Joan," and "she") in a document refer to the same real-world entity (of entity type "person").

Figure 1B:
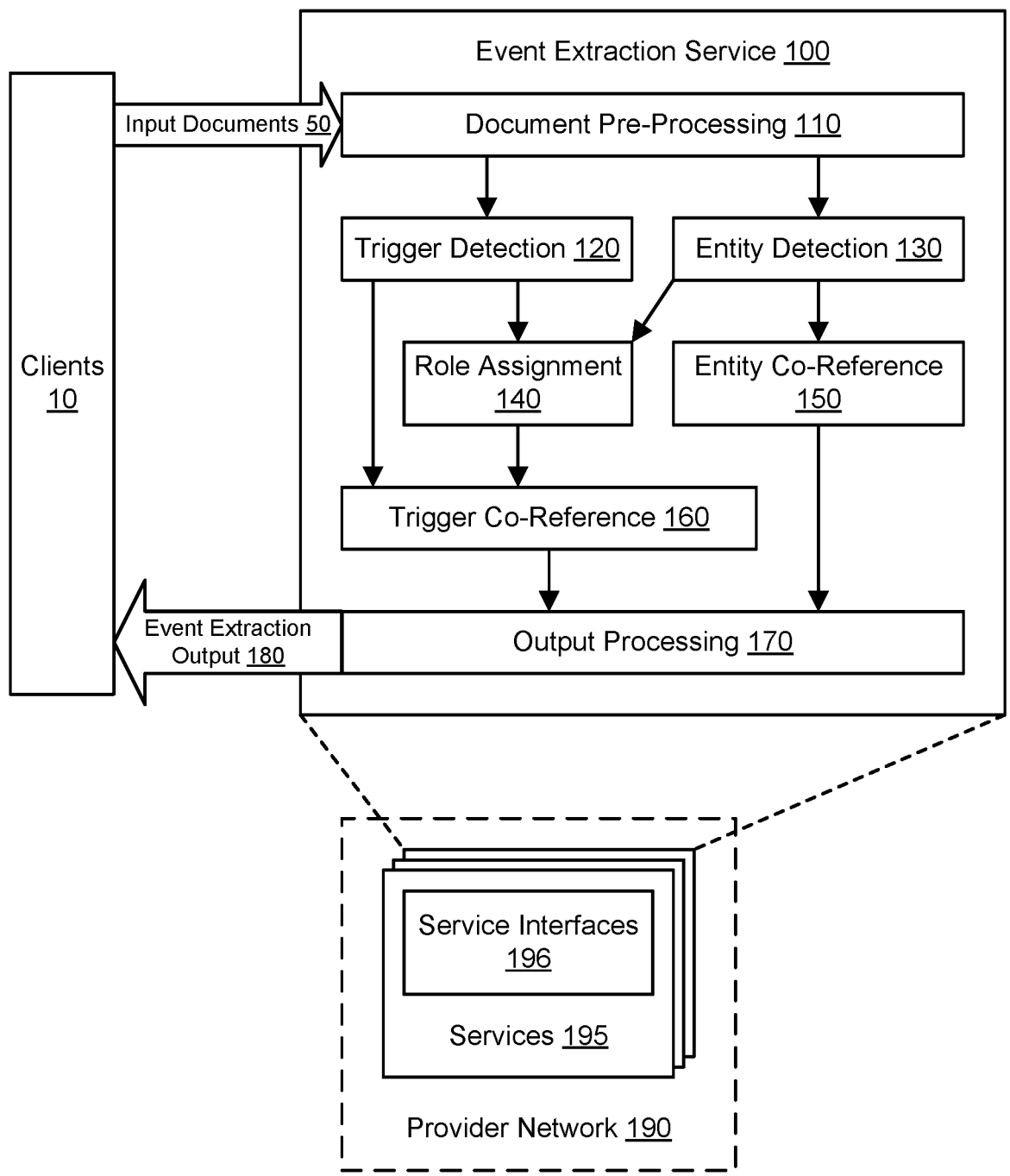

FIG. 1B illustrates an example of a data flow for event extraction from documents with co-reference, according to some embodiments. As shown in FIG. 1B, entity co-reference 150 may be performed using intermediate output of entity detection 130. As also shown in FIG. 1B, role assignment 140 may be performed intermediate output of trigger detection 120 and entity detection 130. As further shown in FIG. 1B, trigger co-reference 160 may be performed intermediate output of trigger detection 120 and role assignment 140. In some embodiments, the same encoder (e.g., a BERT encoder) may encode the input text from one or more documents 50 for use by the trigger detection 120, entity detection 130, role assignment 140, entity co-reference 150, and trigger co-reference 160. Entity co-reference 150 may be performed by pairing each entity mention with its precedent mention and calculating a representation for each pair. Trigger co-reference 160 may be performed by pairing each trigger mention with its precedent mention and calculating a representation for each pair.

In some embodiments, entity co-reference 150 may group a plurality of entity representations across a plurality of documents 50. For example, a particular client may provide the service 100 with a set of documents 50 (in a single batch or in multiple batches over time), and the service may produce output 180 for the client that assigns one or more entity representations from one of the documents to the same entity group as one or more entity representations from another of the documents. In some embodiments, trigger co-reference 160 may group a plurality of trigger (event) representations across a plurality of documents 50. For example, a particular client may provide the service 100 with a set of documents 50 (in a single batch or in multiple batches over time), and the service may produce output 180 for the client that assigns one or more trigger representations from one of the documents to the same trigger group as one or more trigger representations from another of the documents.

Using a component for output processing 170, the event extraction service 100 may generate outputs 180 of event extraction processes. The outputs 180 may include one or more files. For example, the event extraction service 100 may generate one output file per input document or an output file that summarizes numerous input documents. For a particular input document, the event extraction service 100 may produce output that identifies one or more events described in the document along with relevant entities that fill roles for the particular event type. The outputs 180 may include one or more data structures, e.g., one JSON data structure per event that specifies the event type along with the entities that fill various roles associated with the event. For example, for a public health event, the event extraction service 100 may report the event type (e.g., a disease outbreak), the organization that made the announcement, the date of the announcement, the place at which the announcement was made, and so on. The event extraction service 100 may exclude irrelevant entities in the outputs 180, e.g., entities that were identified in the input document but that were not assigned to particular semantic roles. For example, for a public health event, the output may not refer to named persons in the input document, such as a spokesperson for the announcing organization, who were not assigned to pre-defined argument slots for an "outbreak" event type. Mentions, arguments, and triggers may be assigned scores by the event extraction service 100, and the scores may be reported in the output. The scores may represent estimates of accuracy.

In some embodiments, for a particular input document, the event extraction service 100 may generate an output according to the following data structure:

```
{
    "Entities": [
        {
            "Mentions": [
                {
                    "BeginOffset": number,
                    "EndOffset": number,
                    "Score": number,
                    "MentionScore": number,
                    "Text": "string",
                    "Type": "string" #EventEntityType
                }, . . .
            ]
        }, . . .
    ],
    "Events": [
        {
            "Type": "string", #EventType
            "Arguments": [
                {
                    "EntityIndex": number,
                    "Role": "string", #EventRoleType
                    "Score": number
                }, . . .
            ],
            "Triggers": [
                {
                    "BeginOffset": number,
                    "EndOffset": number,
                    "Score": number,
                    "MentionScore": number,
                    "Text": "string",
                    "Type": "string" #EventTriggerType
                }, . . .
            ]
        }, . . .
    ]
}
```

In some embodiments, the output data structure may include "file" and "line" fields as part of a batch processing output schema. In the output data structure indicated above, EventEntityMention.Text may indicate the entity text for a given entity mention in an entity group. EventEntityMention.Type may indicate the entity type for a given entity mention in an entity group. EventEntityMention.BeginOffset may indicate the begin offset of the entity text in the document. EventEntityMention.EndOffset may indicate the end offset of the entity text in the document. EventEntityMention.Score may indicate the level of confidence associated with entity type for an entity mention. EventEntityMention.MentionScore may indicate the level of confidence for the entity mentioned in a given entity group. Event.Type may represent the enumeration of all supported event types, e.g., WON_ELECTION, LOST_ELECTION, RETIRED, etc. EventArgument.EntityIndex may indicate a reference to an entity from the Entities list. EventArgument.Role may represent the enumeration of all supported argument names. e.g., ELECTED_PERSON, OFFICE, ELECTION_DATE, CONSTITUENCY, etc. EventArgument.Score may indicate the confidence level associate with detected argument. EventTrigger.BeginOffset may indicate the begin offset of the trigger text in the document. EventTrigger.EndOffset may indicate the end offset of the trigger text in the document. EventTrigger.Score may indicate the level of confidence associated with entity type for trigger mention. EventTrigger.MentionScore may indicate the level of confidence for the trigger mentioned in a given trigger group. EventTrigger.Type may represent the enumeration of all supported trigger types. EventTrigger.Text may indicate the trigger text for a given trigger mention in trigger group.

In some embodiments, event extraction output 180 may include data or metadata sourced from a plurality of different input documents for a particular client. For example, event extraction output 180 may indicate the position of different events on a timeline. The events on the timeline may be identified across a plurality of documents 180. For example, a variety of announcement events made by the same organization (e.g., a particular entity group that fills the semantic role of "announcer" in multiple events) may be associated with announcement dates, and those dates may be used to organize the announcement events on a timeline. In some embodiments, event extraction output 180 may indicate the position of different events on a map. The mapped events may be identified across a plurality of documents 180. For example, announcements of disease outbreaks may be associated with outbreak locations (e.g., a plurality of entities or entity groups that fill the semantic role of "outbreak_place" in multiple events), and those locations may be used to organize the announcement events on a map. In some embodiments, cross-document output may be configured for particular clients according to the domain-specific taxonomies 115 or other domain-specific constraints. For example, a particular client may choose to have the service 100 produce output in which events of a particular event type in a domain are graphed on a single timeline, while events of another event type in the domain are not graphed on a single timeline per the client's configuration choices.

In some embodiments, the client may specify a storage location for output of the event extraction service 100. The storage location may be specified using a service call to the event extraction service 100, e.g., the same service call that invoked the event extraction for one or more input documents. The event extraction service 100 may write one or more outputs to the storage location. In some embodiments, the event extraction service 100 may use an access credential associated with the client (e.g., an account name and password or an identity and access management role) to write the outputs to the storage location.

Clients 10 may use outputs 180 to enhance or augment other data, e.g., data about events and entities. For example, one of the clients 10 may use output 180 to populate nodes in a knowledge graph about events and the semantic roles that are filled by particular entities. As another example, one of the clients 10 may use output 180 to populate records in a database that describes entities and their attributes. In some embodiments, events may be visualized on a timeline or on a map using contents of such a knowledge graph or database.

In one embodiment, one or more components of the event extraction service 100 may be implemented using resources of a provider network 190. The provider network 190 may represent a network set up by an entity such as a private-sector company or a public-sector organization to provide one or more services 195 (such as various types of network-accessible computing or storage) accessible via the Internet and/or other networks to a distributed set of clients. The provider network 190 may include numerous services 195 that collaborate according to a service-oriented architecture. For example, the event extraction service 100 may be implemented using a service-oriented architecture in which various services 195 perform complex tasks by sending requests and responses using service interfaces 196. The event extraction service 100 may offer one or more service interfaces by which clients of the event extraction service (e.g., other services) may request event extraction tasks. A service interface may be implemented as an application programming interface (API) or other programmatic interface. For example, a client of the event extraction service 100 may use an API to provide one or more documents (e.g., by specifying a storage bucket in which the documents are stored) for which event extraction is sought. In some embodiments, a user interface (e.g., a graphical user interface or command-line interface) may be built on top of the API or other programmatic interface such that end users may invoke the functionality of the event extraction service 100.

The provider network 190 may include numerous data centers hosting various resource pools, such as collections of physical and/or virtualized computer servers, storage devices, networking equipment and the like, that are used to implement and distribute the infrastructure and services offered by the provider. Compute resources may be offered by the provider network 190 to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the event extraction service 100 may be implemented as a service of the provider network 190, the service may be implemented using a plurality of different instances that are distributed throughout one or more networks, and each instance may offer access to the functionality of the service to various clients. Because resources of the provider network 190 may be under the control of multiple clients (or tenants) simultaneously, the provider network may be said to offer multi-tenancy and may be termed a multi-tenant provider network. The provider network 190 may be hosted in the cloud and may be termed a cloud provider network. In one embodiment, portions of the functionality of the provider network 190, such as the event extraction service 100, may be offered to clients in exchange for fees.

Figure 18:
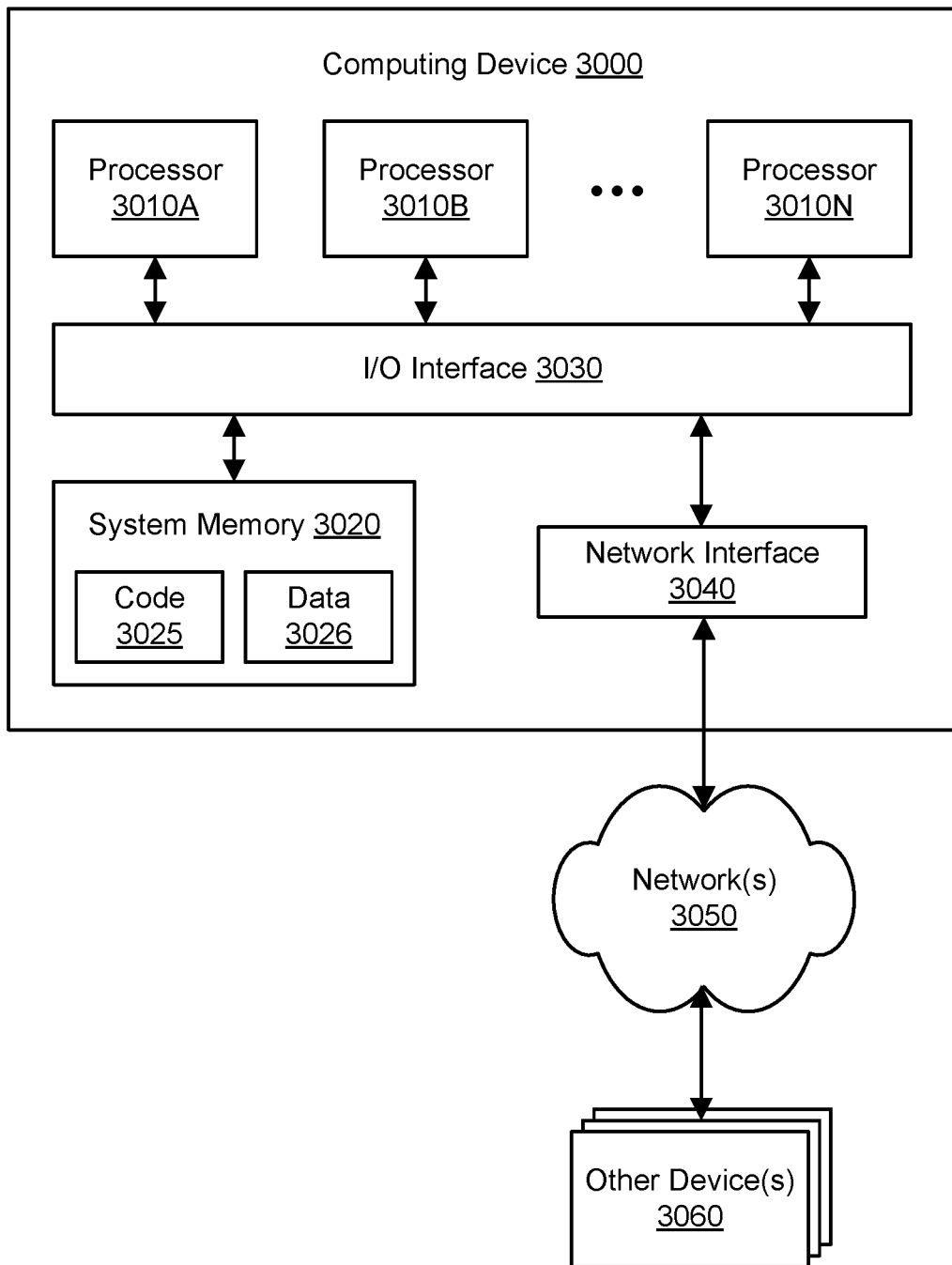
FIG. 18 illustrates an example computing device that may be used in some embodiments.

In various embodiments, components of the event extraction service 100 may be implemented using any suitable number and configuration of computing devices, any of which may be implemented by the example computing device 3000 illustrated in FIG. 18. In some embodiments, the computing devices may be located in any suitable number of data centers or geographical locations. In various embodiments, at least some of the functionality of the event extraction service 100 may be provided by the same computing device or by different computing devices. In various embodiments, if any of the components of the event extraction service 100 are implemented using different computing devices, then the components and their respective computing devices may be communicatively coupled, e.g., via one or more networks. Any of the components of the event extraction service 100 may represent any combination of software and hardware usable to perform their respective functions. In some embodiments, operations implemented by the event extraction service 100 may be performed automatically, e.g., without a need for user initiation or user intervention after an initial configuration stage, and/or programmatically, e.g., by execution of program instructions on at least one computing device. In some embodiments, the event extraction service 100 may include additional components not shown, fewer components than shown, or different combinations, configurations, or quantities of the components shown.

Clients 10 of the event extraction service 100 may represent external devices, systems, or entities with respect to the event extraction service. Client devices 10 may be managed or owned by one or more customers or end users of the event extraction service 100. In one embodiment, the client devices may be implemented using any suitable number and configuration of computing devices, any of which may be implemented by the example computing device 3000 illustrated in FIG. 18. Clients 10 may convey network-based service requests to the event extraction service 100 via one or more networks, e.g., to request event extraction from one or more specified documents. The network(s) may encompass any suitable combination of networking hardware and protocols necessary to establish network-based communications between client devices and the event extraction service 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the event extraction service 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the event extraction service 100. In one embodiment, client devices may communicate with the event extraction service 100 using a private network rather than the public Internet. In various embodiments, the various components of the event extraction service 100 may also communicate with other components of the event extraction service using one or more network interconnects.

Figure 2:
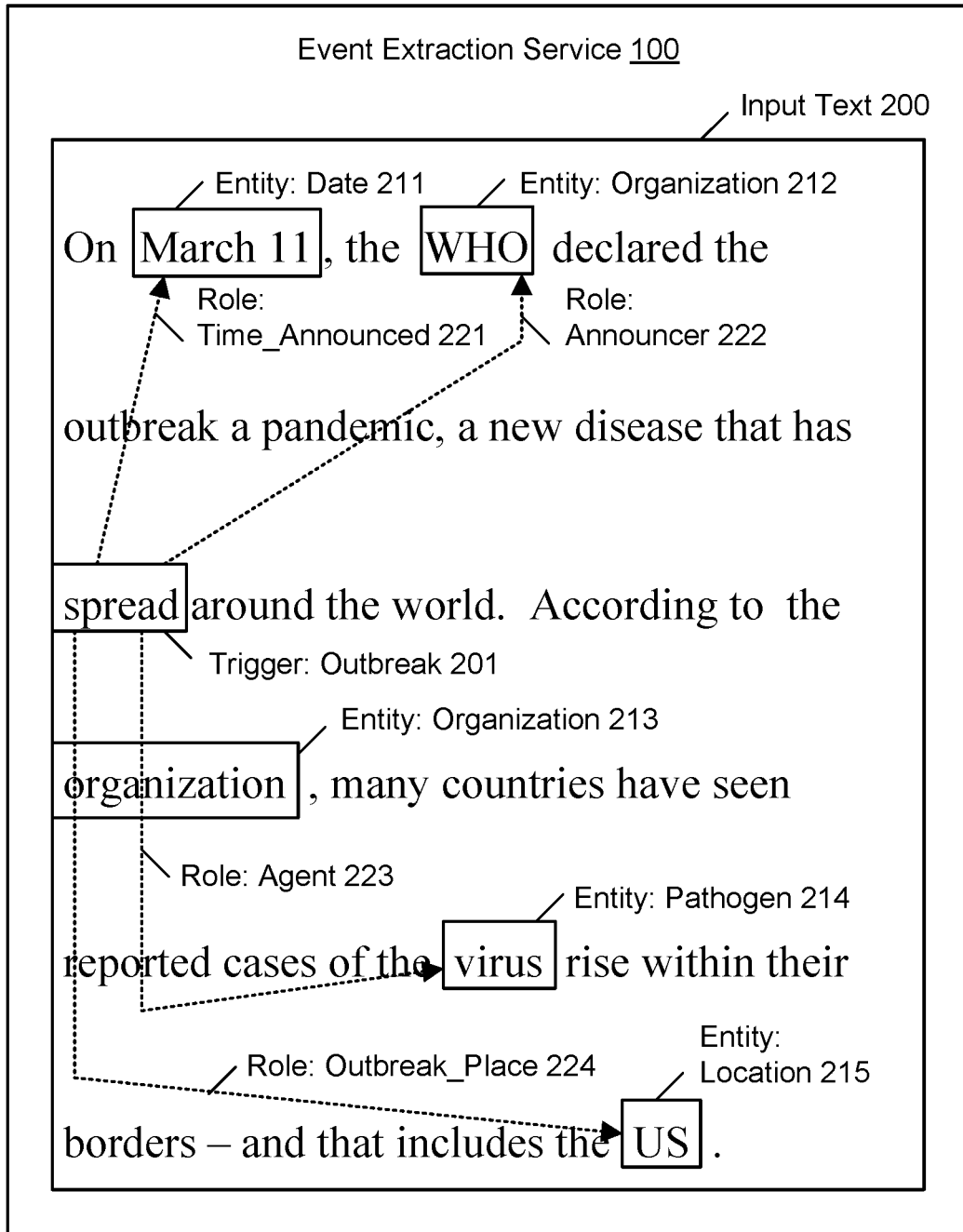
FIG. 2 is an example of an input for event extraction from documents with co-reference, according to some embodiments.

FIG. 2 is an example of an input for event extraction from documents with co-reference, according to some embodiments. An input document to the event extraction service 100 may include the following text 200: "On March 11, the WHO declared the outbreak a pandemic, a new disease that has spread around the world. According to the organization, many countries have seen reported cases of the virus rise within their borders—and that includes the US." Based (at least in part) on this input, the trigger detection 120 may detect a trigger "spread" that indicates the span in the raw text of the presence of a known event type OUTBREAK: e.g., {spread|OUTBREAK} 201. The entity detection 130 may detect mentions of entities present in the document from a pre-defined taxonomy: e.g., {March 11|DATE} 211, {WHO|ORGANIZATION} 212, {the organization|ORGANIZATION} 213, {virus|PATHOGEN} 214, and {US|LOCATION} 215. The role assignment 140 may identify the entity mentions that fill semantic roles for the trigger: e.g., {March 11|DATE} fills the TIME_ANNOUNCED role 221 for the {spread|OUTBREAK} 201, {WHO|ORGANIZATION} 212 fills the ANNOUNCER role 222, {virus|PATHOGEN} 214 fills the AGENT role 223, and {US|LOCATION} 215 fills the OUTBREAK_PLACE role 224. The entity co-reference 150 may group mentions in the same document that refer to a single entity: e.g., group ({WHO ORGANIZATION} 212, {the organization|ORGANIZATION} 213). The event (trigger) co-reference may group any triggers in the same document that refer to the same occurrence: e.g., if "the outbreak" is identified as a trigger, that span may be grouped with {spread|OUTBREAK} 201.

Figure 3:
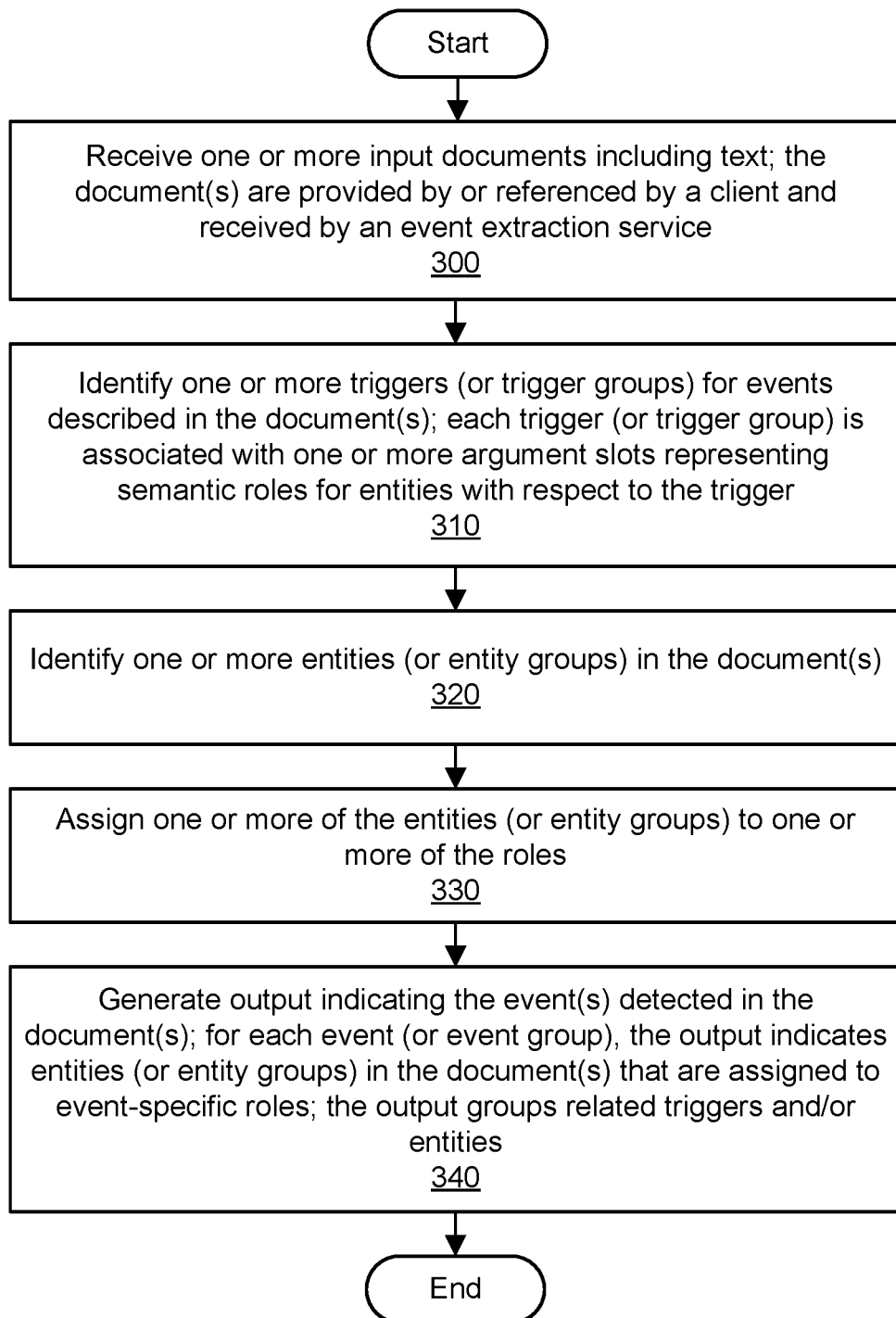
FIG. 3 is a flowchart illustrating a method for event extraction from documents with co-reference, according to some embodiments.

FIG. 3 is a flowchart illustrating a method for event extraction from documents with co-reference, according to some embodiments. As shown in 300, one or more input documents may be received. The document(s) may be received from or otherwise provided by a client of an event extraction service. The document(s) may represent one or more news articles, press releases, research papers, official reports from a governmental entity, official filings with a governmental entity, and so on. The document(s) may generally include free-form text, e.g., phrases, sentences, paragraphs, headings, sub-headings, captions for images, and so on. The document(s) may be pre-processed to generate a sequence of tokens representing words and numbers.

As shown in 310, one or more triggers for events may be identified in the document(s). A trigger may represent a word or short phrase that best expresses the occurrence of an event. An event represents an occurrence that happened or could happen in the real world. An event may represent some change of state. The event extraction service may classify events in different event types. A trigger may represent a textual reference to a unique event type and a span of tokens within the input document(s). A particular event type may be associated with argument slots that represent relationships (semantic roles) of particular entities to a particular occurrence (an event) of the event type. These relationships may be described by domain-specific taxonomies and may influence the event extraction process once a trigger is detected in a document. For example, an "outbreak" event type may be associated with argument slots for semantic roles such as the name of the outbreak, the entity that is reporting the outbreak, the date of the outbreak or the announcement, the location where the outbreak was detected, the location at which the announcement was made, and so on. Triggers may be clustered using trigger groups, where an individual trigger group may include a plurality of different trigger representations that refer to the same occurrence of a real-world event type.

As shown in 320, one or more entities may be identified in the document(s). Entities may include references to real-world objects such as persons, groups of people, organizations, things, places, dates, and so on. Entities may often be associated with names and pronouns in the input document(s). An entity may represent a textual reference to a unique entity type and a span of tokens within the input document(s). For example, the entity detection may detect "Joan Smith" as a particular example of a "person" entity type. Entities may be clustered using entity groups, where an individual entity group may include a plurality of different entity representations that refer to the same instance (e.g., the same person, place, or thing) of a real-world entity type.

As shown in 330, one or more of the entities may be assigned to one or more of the argument slots or semantic roles. An argument may represent an entity or entity group that stands in a particular semantic relationship with respect to an occurrence of an event type. Arguments may fill semantic roles. The role assignment may assign identified events (or event groups) to one or more of the roles associated with a trigger. The role assignment may select one or more of the identified entities (or entities groups) for assignment to one or more roles and may discard or not select others of the identified entities. For example, an input document may be analyzed by the service to detect a trigger ("elected") for an "election" event type and to assign entities to election-related roles such as "Joan Smith" (elected person), "November 3" (date of election), "U.S. House" (office), "New York" (constituency), and so on. For the example "election" event, the role assignment may not assign roles to other entities such as other people who are quoted in the document(s), named family members of Ms. Smith, other dates, other places, and so on.

As shown in 340, output may be generated that captures aspects of the event extraction for the input document(s). The output may indicate the one or more events (or event groups) and the one or more of the entities (or entity groups) assigned to the one or more of the argument slots. The output may group a plurality of trigger representations under the same trigger group. The output may group a plurality of entity representations under the same entity group. The role assignments for entities or entity groups may be included in the output of the event extraction service for the particular input document(s). Entities or entity groups that were not assigned to roles may be excluded from the output of the event extraction service for the particular input document(s).

Figure 4A:
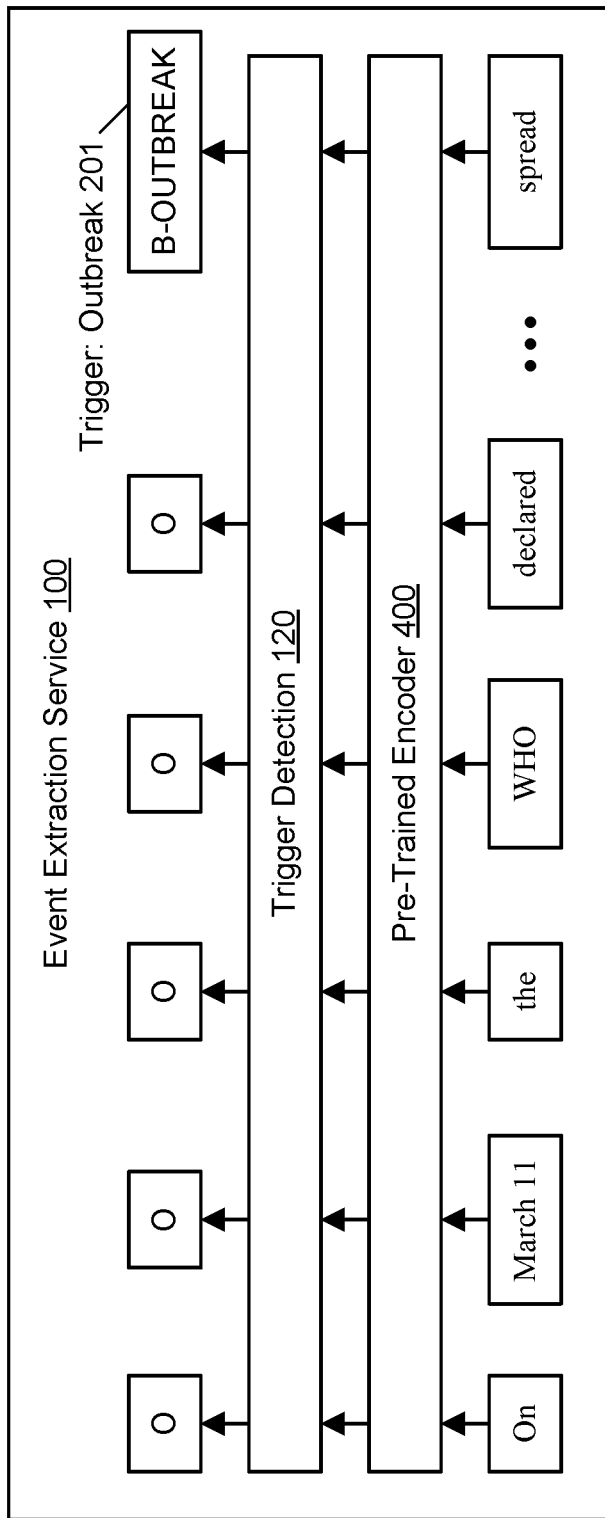
FIG. 4A illustrates further aspects of the example system environment for event extraction from documents with co-reference, including an example of trigger detection, according to some embodiments.
Figure 4B:
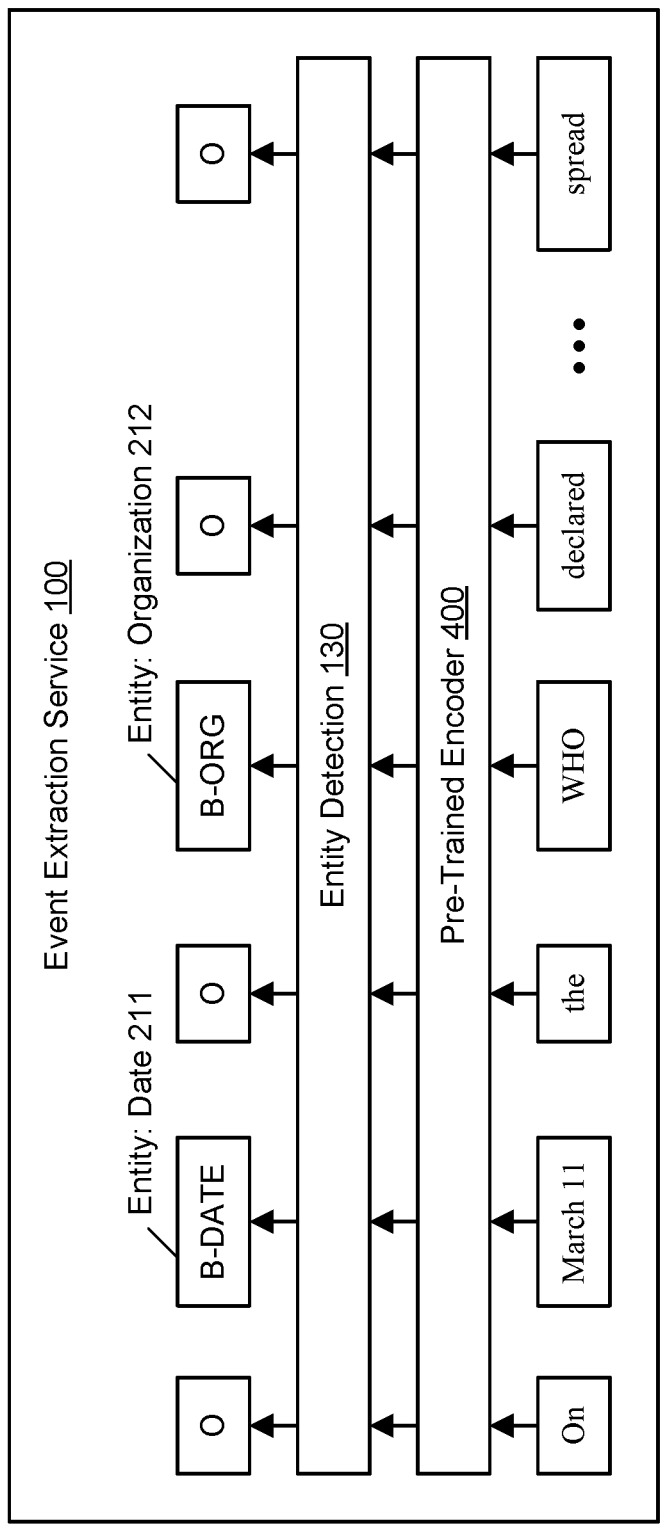
FIG. 4B illustrates further aspects of the example system environment for event extraction from documents with co-reference, including an example of entity detection, according to some embodiments.
Figure 4C:
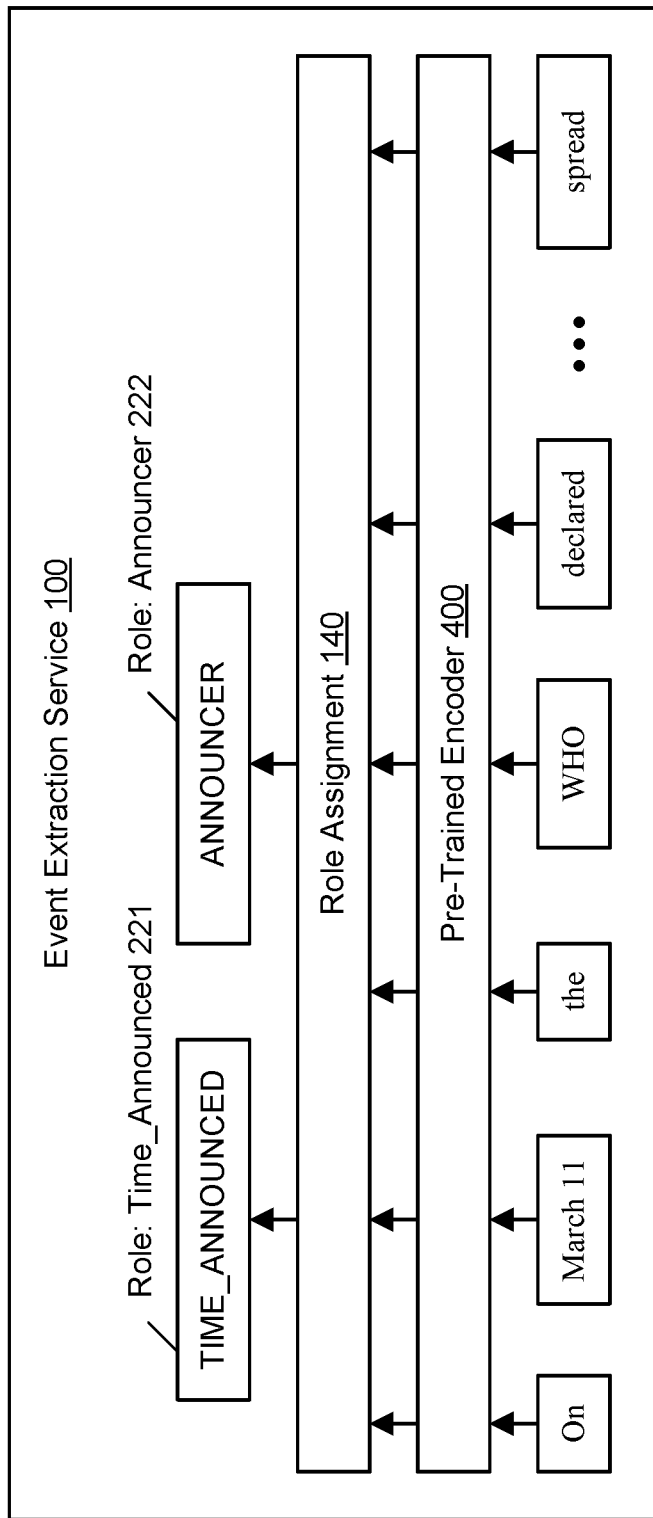
FIG. 4C illustrates further aspects of the example system environment for event extraction from documents with co-reference, including an example of role assignment, according to some embodiments.

FIG. 4A illustrates further aspects of the example system environment for event extraction from documents with co-reference, including an example of trigger detection, according to some embodiments. FIG. 4B illustrates further aspects of the example system environment for event extraction from documents with co-reference, including an example of entity detection, according to some embodiments. FIG. 4C illustrates further aspects of the example system environment for event extraction from documents with co-reference, including an example of role assignment, according to some embodiments. In some embodiments, input text may be encoded using a pre-trained encoder 400. The encoder may represent a Bidirectional Encoder Representations from Transformers (BERT) encoder for natural language processing (NLP) pre-training. The encoder may be shared across all extraction tasks. For input text larger than the max tokens value supported by the pre-trained encoder, a sliding window may be used over the input text. The encoded representation may include individual word representations. The encoded representation may then be used for trigger detection 120, entity detection 130, and role assignment (argument slot filling) 140.

Trigger detection 120 and entity detection 130 may be performed using inside-outside-beginning (IOB) decoders. Trigger detection 120 and entity detection 130 may be performed as two independent classic sequence tagging tasks in the IOB tagging format and using the same input representation. In the IOB tagging format, a B- prefix before a tag may indicate that the tag is the beginning of a chunk, an I- prefix before a tag may indicate that the tag is inside a chunk, and an O tag may indicate that the tag is not part of a chunk. Using IOB tagging, trigger detection 120 may determine whether one of the individual word representations is not part of a trigger span, is the beginning of a trigger span, or is inside a trigger span. For example, as shown in FIG. 4A, trigger detection 120 may identify "spread" as a trigger and assign the tag "B-OUTBREAK" representing the "outbreak" event type, while other tokens may be assigned the tag "O" to indicate that they are not part of a trigger span. In some embodiments, trigger detection 120 may be performed before entity detection 130, and tasks after trigger detection 120 may be performed responsive to detection of any triggers and the corresponding event types.

Using IOB tagging, entity detection 130 may determine whether one of the individual word representations is not part of an entity span, is the beginning of an entity span, or is inside an entity span. For example, as shown in FIG. 4B, entity detection 130 may identify "March 11" as an entity and assign the tag "B-DATE" representing the "date" entity type, identify "WHO" as an entity and assign the tag "B-ORG" to the span to represent the "organization" entity type, and tag other tokens with the tag "O" to indicate that they are not part of an entity span. The input representation may be projected via a fully connected layer followed by a softmax classification. In some embodiments, the trigger detection 120 and entity detection 130 may not have overlapping spans as two different types. In some embodiments, the trigger detection 120 and entity detection 130 may be implemented as a multi-class sequence tagging problem with a softmax at the end.

In some embodiments, type-wise IOB decoders may be used to perform multi-label classification. In some embodiments, entity pooling may be performed to generate combined representations. For example, "March" and "11" may be combined to generate a representation of "March 11."

As shown in FIG. 4C, role assignment (argument slot filling) 140 may assign "March 11" to the TIME_ANNOUNCED role 221 and "WHO" to the ANNOUNCER role 222. To perform argument slot filling 140, two representations may be used: the candidate entity representation and the given trigger representation. At model training time, teacher forcing may be performed, and the gold entity and trigger spans may be taken at input. At inference time, the model may be configured to first do a pass to detect all triggers and entities. Entity boundaries are used to then pool tokens in that span to form a span representation for each entity. Using the entity span representations and each trigger representation, a pair of (candidate_entity e, trigger t) may be classified as a multi-label classification problem for each role. Multi-label classification may be used instead of softmax-based multi-class classification because event datasets do have role overlaps, and the same entity can play multiple roles in an event. Training may be performed by optimizing the three losses for trigger detection 120, entity detection 130, and role assignment (argument slot filling) 140 and comparing to individual or combinations of joint training. The best configuration may be selected based on validation scores for all three tasks.

To perform entity co-reference 150, the entity representations extracted from entity detection 130 may be used. Given representations of all entity spans from entity detection 130 (and from gold entity spans during training), an E×E matrix may be formed for all pairs of entities, where E is the total number of entities in the input text. Each entry in this matrix may be an entity-pair representation formed by combining the representation of each. The entity co-reference 150 may mask a diagonal half of this matrix because co-reference is an undirected relationship between two entities. For the remaining entries, the entity co-reference 150 may perform a 0/1 classification where 1 indicates that this pair of mentions are co-referent.

Similarly, to perform event (trigger) co-reference 160, the trigger representations extracted from trigger detection 120 may be used. Given representations of all trigger spans and arguments of each trigger, a T×T matrix may be formed for all pairs of triggers, where T is the total number of triggers in the input text. Each entry in this matrix may be a trigger-pair representation formed by combining the representation of each. The trigger co-reference 160 may mask a diagonal half of this matrix. For the remaining entries, the trigger co-reference 160 may perform a 0/1 classification where 1 indicates that this pair of mentions are co-referent.

In some embodiments, the event extraction process for a particular set of one or more documents may be performed using an inference pipeline. In some embodiments, the inference pipeline may be implemented using a container in a containerization environment and/or at an endpoint in a machine learning framework. The inference pipeline may include several processors that represent various components or functionality. The inference pipeline may include a pre-processor that performs tokenization to transform the text into a sequence or list of tokens. The inference pipeline may include an inference processor that performs joint extraction of arguments and triggers. The sequence of tokens may be consumed by the inference processor along with the original input document itself. The inference processor may implement the trigger detection 120, event detection 130, and role assignment 140. The inference processor may take the output of the pre-processor and consolidate the inference results to produce an intermediate output.

The inference pipeline may include an additional inference processor that performs entity co-reference 150. The inference pipeline may include an additional inference processor that performs trigger (event) co-reference 160. The inference processors may run asynchronously to maximize throughput. The output of inference processors may be placed in an in-memory queue, where the next processor in the pipeline can consume the output of the previous processor from the queue. The inference pipeline may include a post-processor that aggregates previous inference results and produces the client-facing outputs 180.

In some embodiments, combinations of the trigger detection 120, event detection 130, role assignment 140, entity co-reference 150, and trigger co-reference 160 may be performed using one or more multi-task learning techniques. Multi-task learning may represent a machine learning technique in which multiple learning tasks are solved at the same time in such a way that commonalities and differences across tasks are exploited. Multi-task learning may result in improved learning efficiency and prediction accuracy for the task-specific models, e.g., in comparison to training the models separately. In some embodiments, multi-task learning may reuse the same internal representations for trigger detection 120, event detection 130, role assignment 140, and/or entity co-reference 150, and trigger co-reference 160 instead of performing those tasks independently. In some embodiments, each domain may be represented by a separate trained model such that knowledge is not shared across different domains such as public health and private-sector organizational behavior. In some embodiments, multi-task learning may be performed across two or more domains using a unified model for all the domains. For example, multi-task learning across domains may analyze one or more documents to identify a person that fills one role for one event in one domain and another role with for event in another domain. As another example, multi-task learning across domains may analyze one or more documents to identify a place that fills one role for one event in one domain and another role for another event in another domain. Different domains may be associated with different taxonomies, and multi-task learning may be performed based (at least in part) on the domain-specific taxonomies. For example, multi-task learning may be used to train a model for a new taxonomy (with a lesser amount of annotated data) by using data from one or more taxonomies (with a greater amount of annotated data).

In some embodiments, the inference processor may produce an intermediate output according to the following data structure:

```
[
    {
        "text": "string", #InputDocument
        "predicted_values": {
            "tokens": [
                {
                    "start": number,
                    "end": number,
                    "extent": "string"
                },...
            ],
```

```
            "event_triggers": [
                {
                    "start": number,
                    "end": number,
                    "tag": "string", #EventTriggerType
                    "score": decimal,
                    "event_id": "id",
                    "event_mention_id": "id",
                    "extent": "string"
                },...
            ],
            "event_arguments": [
                {
                    "start": number,
                    "end": number,
                    "tag": "string", #EventArgumentType
                    "score": decimal,
                    "event_id": "id",
                    "event_mention_id": "id",
                    "extent": "string"
                },...
            ],
            "events": [
                {
                    "trigger": {
                        "start": number,
                        "end": number,
                        "tag": "string", #EventTriggerType
                        "score": decimal,
                        "event_id": "id",
                        "event_mention_id: "id",
                        "extent": string
                    },
                    "arguments": [
                        {
                            "name": "string" #EventRoleType
                            "values": [
                                {
                                    "start": number,
                                    "end": number,
                                    "tag": "string", #EventArgumentType
                                    "score": decimal,
                                    "event_id": "id",
                                    "event_mention_id": "id",
                                    "extent": "string"
                                },...
                            ]
                        },...
                    ]
                },...
            ]
        }
    },...
]
```

In some embodiments, the inference processor for entity co-reference may produce an intermediate output according to the following data structure:

```
[
    {
        "text": "string",
        "predicted_values": {
            "tokens": [...],
            "event_triggers": [...],
            "event_arguments": [...],
            "events": [...],
            "argument_groups": [
                {
                    "mentions": [
                        {
                            "start": number,
                            "end": number,
                            "tag": string,
                            "score": decimal,
                            "event_id": "id",
                            "event_mention_id": "id",
```

```
        "extent": "string"
      },...
    ]
  },...
]
```

In some embodiments, the inference processor for trigger co-reference may produce an intermediate output according to the following data structure:

```
[
  {
    "text": "string",
    "predicted_values": {
      "tokens": [...],
      "event_triggers": [...],
      "event_arguments": [...],
      "events": [...],
      "trigger_groups": [
        {
          "mentions": [
            {
              "start": number,
              "end": number,
              "tag": string,
              "score": decimal,
              "event_id": "id",
              "event_mention_id": "id",
              "extent": "string"
            },...
          ]
        }
      ]
    }
  },...
]
```

Figure 5:
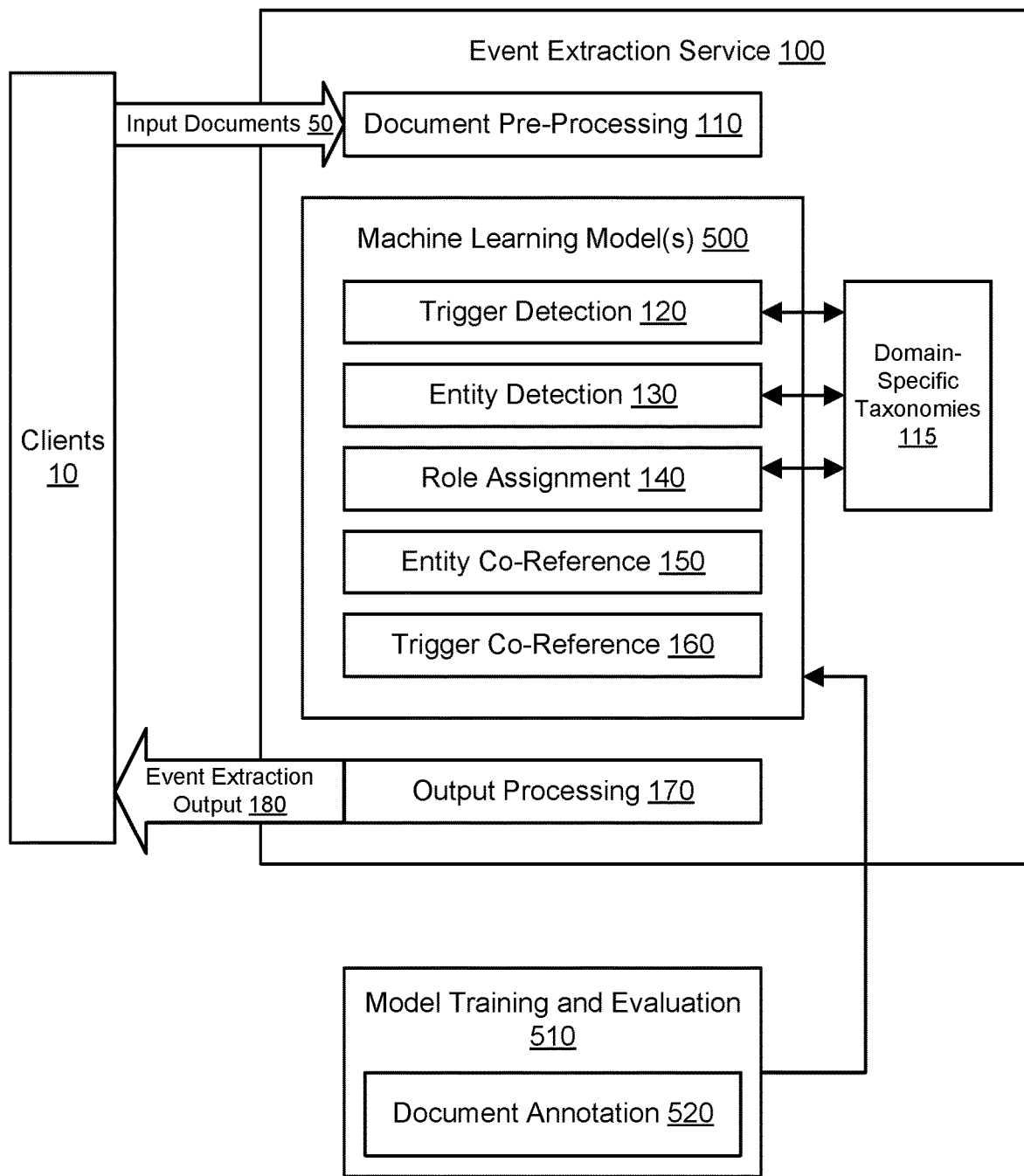
FIG. 5 illustrates further aspects of the example system environment for event extraction from documents with co-reference, including machine learning and annotation of documents, according to some embodiments.

FIG. 5 illustrates further aspects of the example system environment for event extraction from documents with co-reference, including machine learning and annotation of documents, according to some embodiments. In some embodiments, the event extraction service 100 may use one or more machine learning techniques. The machine learning techniques may be used to perform tasks such as trigger detection 120, event detection 130, role assignment 140, trigger co-reference 150, and/or entity co-reference 160. The event extraction service 100 may employ machine learning techniques for increased accuracy of event extraction with role assignment. Machine learning models 500 may be pre-trained for particular domains such as public health and analysis of private-sector behavior. In some embodiments, clients in other domains may train additional machine learning models that can be used by the event extraction service 100.

Machine learning techniques may be implemented using one or more systems that learn from data, identify patterns, and make predictions or other decisions with minimal human intervention (e.g., after human input during an initial configuration phase such as model training). Machine learning techniques may include generating and using one or more models 500 that can programmatically output results (e.g., identification of triggers, entities, and roles that are filled by entities) based (at least in part) on input (e.g., unstructured text documents). A machine learning model 500 may undergo a model training process 510 (e.g., using a training data set) such that it learns patterns sufficient to make inferences about future events. A machine learning model 500 may undergo a model evaluation process 510 to assess the quality of the model's performance, e.g., after training. A machine learning model 500 may include a neural network model. One or more machine learning models 500 may be trained to predict triggers, entities, and role assignments based (at least in part) on input documents 50 that the model did not encounter during training. The prediction phase for such newly encountered input documents may also be referred to as the inference phase.

In some embodiments, the machine learning model(s) 500 may be trained using a training set of annotated documents. In some embodiments, the machine learning model(s) 500 may be evaluated using a training set of annotated documents. The annotated documents may include a plurality of labeled triggers, a plurality of labeled entities, a plurality of labeled argument slots, and/or a plurality of co-reference groups.

In some embodiments, the document annotation 520 may be performed based (at least in part) on one or more manual processes that employ user input. The manual processes may include staging to correct document format errors, enumerate them for tracking purposes, analyze them for document and distributional irregularities, and identify documents for construction of control sets. The manual processes may include pre-processing to ingest documents into a data store, construct batches of documents for annotation, and deploy them for annotation. The manual processes may include annotation that includes labeling the document, wherein one or more annotation vendors receive documents and a custom annotation interface, perform labeling in two blind and one arbitration passes, and return labeled documents for quantitative and qualitative review. The manual process may include an end step for performing additional validation checks and serving documents for modeling. In some embodiments, after a vendor delivers a batch of files, annotation quality is measured and corrections are made, if necessary.

In some embodiments, the document annotation 520 may be performed based (at least in part) on automated processes. For example, one or more machine learning models may be used to label triggers, entities, argument slots, and/or co-reference groups. Annotation may be performed using partially automated processes such as self-training, deep supervision, bootstrapping, and so on. Partially automated processes for annotation may reduce the role of human reviewers by asking for manual review for a small percentage of annotated documents. For example, self-training techniques may train models with less data initially, use the models to annotate more data, and use manual review to correct the annotations with low confidence scores. As another example, deep supervision techniques may use external knowledge bases that represent semantic hierarchies.

Context-Sensitive Linking of Entities to Private Databases

Figure 6:
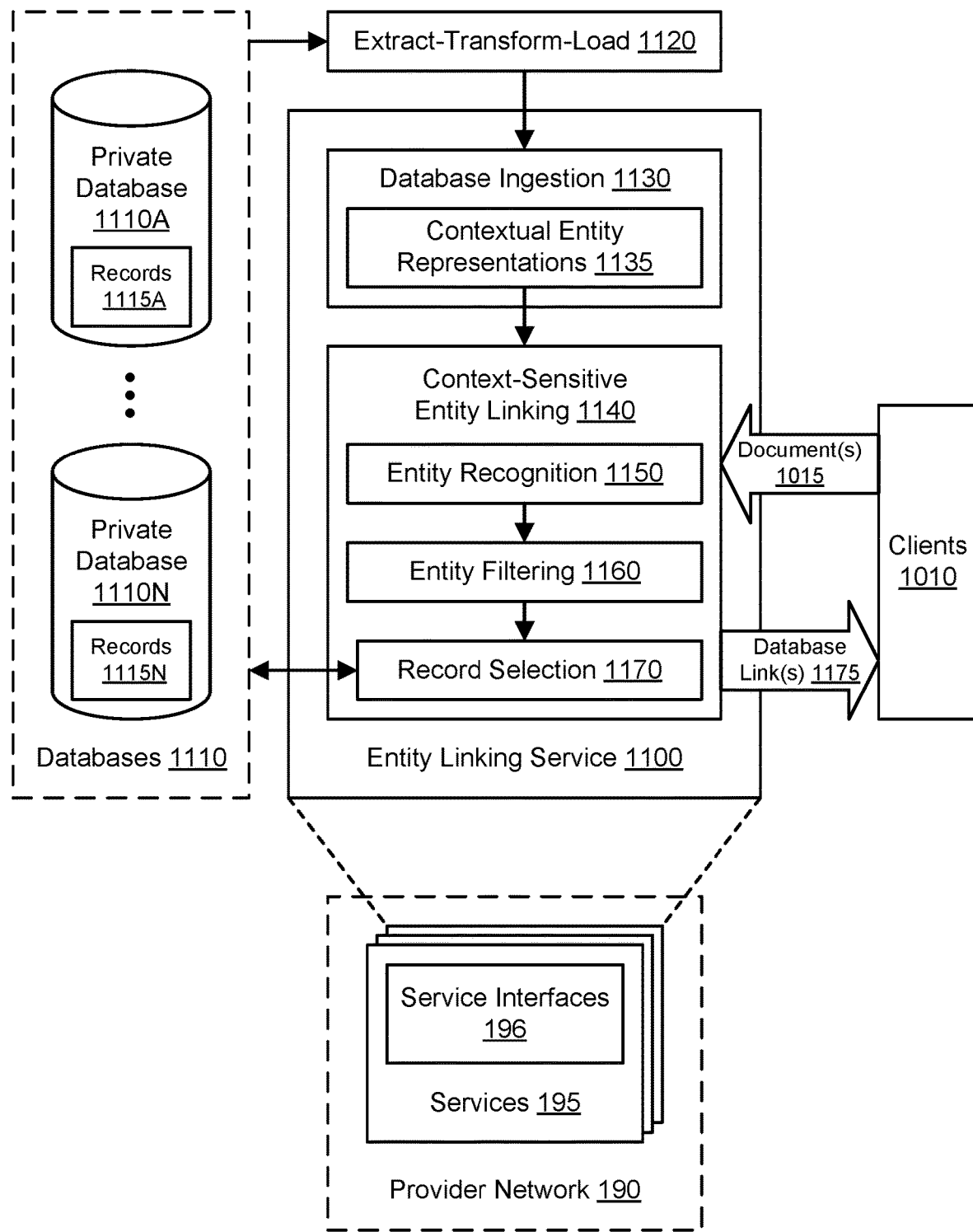
FIG. 6 illustrates an example system environment for context-sensitive linking of entities to private databases, according to some embodiments.

FIG. 6 illustrates an example system environment for context-sensitive linking of entities to private databases, according to some embodiments. An entity linking service 1100 may perform automated analysis of input documents 1015 to link mentions of entities in those documents to records in databases or knowledge bases 1110. The terms "database" and "knowledge base" are used interchangeably herein. Databases and knowledge bases 1110 may include hierarchical data structures, relational database tables, NoSQL tables, individual files (e.g., text files or spreadsheets with rows and columns), and so on. The entity linking service 1100 may perform entity linking tasks for a plurality of clients 1010. Entity linking by the entity linking service 1100 may include disambiguating mentions of entities in text against one or more databases 1110. Entities may include real-world objects such as persons, groups of people, organizations, things, places, dates, and so on. In some embodiments, the input documents 1015 may include news articles, press releases, e-mails, research papers, official reports from governmental sources, and so on. The documents 1015 may be generated through various publishing channels and outlets by various news sources, private-sector entities, public-sector entities, individuals, groups, and so on. The documents 1015 may generally include free-form text, e.g., phrases, sentences, paragraphs, headings, sub-headings, captions for images, and so on. The documents 1015 may include structured elements, e.g., as JavaScript Object Notation (JSON) documents. The text may include mentions of entities. Entities may often be mentioned using names, nominative pronouns (e.g., "she", "he," "it"), possessive pronouns (e.g., "their"), and so on. The documents 15 may include expressions in one or more natural languages. A natural language expressed in the documents 1015 may represent a language, such as English, that developed naturally among people, in contrast to an artificial language or a computer programming language.

In some embodiments, entity linking may be performed for databases that are private, proprietary, and/or confidential. The databases 1110 may include, for example, private database 1110A through private database 1110N. Private databases 1110 may not be globally accessible. Private databases 1110 may be inaccessible to users without proper access credentials permitting read access. The private database(s) 1110 may include records or other units of data that are descriptive of entities. For example, database 1110A may include records 1115A, and database 1110N may include records 1115N. As discussed above, entities may include real-world objects such as persons, groups of people, organizations, things, places, dates, and so on. Entities referenced in the databases 1110 may include names or identifiers of entities along with other descriptive data or other data associated with individual entities. One of the records 1115A-1115N may correspond to a particular entity. For example, a private database used for entity linking by the entity linking service 1100 may include records for names, addresses, and other data for employees of a particular organization. As another example, a private database used for entity linking by the entity linking service 1100 may include a list of place names or other place identifiers along with information descriptive of those places. The records 1115A-1115N in databases 1110 may be owned by clients 1010, or clients 1010 may have exclusive access to the records or the right to exclude others from reading the records. For example, the records 1115A in the private database 1110A may be owned by a particular one of the clients 1010, while the records 115N in the private database 1110N may be owned by a different one of the clients 1010. In some embodiments, entity linking may be performed for a particular client using one or more of the databases 1110 to which the client has read access and not using others of the databases 1110 to which the client lacks read access.

The text with entity mentions in the document input 1015 may be unstructured. The documents 1015 may represent unstructured information such that the documents may not be associated with pre-determined schemas that describe the structure of document contents. The text in a document may include various sections such as headings, sub-headings, and captions along with the body of the text, but the individual sections of the document may be considered to be unstructured. The text of a document may include a sequence of tokens such as words and numerals. In contrast, the information (e.g., records) in the private databases 1110 may generally be structured, e.g., with records having values for particular fields or having other attribute-value pairs. In some embodiments, ingestion 1130 and entity linking 1140 may be performed for databases 1110 having diverse and varied schemas that describe the format of database contents. At least some of the schemas may be unknown during training or other development of the entity linking service 1100.

The entity linking service 1100 may transform records in one or more source databases 1110 from one or more source schemas to a single target schema. The target schema may represent a common format for records that is used for entity linking by the service 1100. In some embodiments, one or more extract-transform-load (ETL) tools 1120 may be used to extract records 1115A-1115N from private databases 1110, transform the records to meet the target schema, and load the transformed records into storage accessible by the entity linking service 1100. The records in the target schema may represent an intermediate set of records. The ETL tool(s) 1120 may be implemented by the entity linking service 1100 or may be implemented by one or more additional services or systems. For example, a service in the same provider network 190 that hosts the entity linking service 1100 may also provide an ETL service 1120.

The entity linking service 1100 may include a component for database ingestion 1130 that consumes the records produced by the ETL tool(s) 1120. In some embodiments, the databases 1110 to be ingested in this manner may be selected or indicated by clients 1010, while other databases may not be ingested. Ingestion 1130 may be performed for a particular client using one or more of the databases 1110 to which the client has read access and not using others of the databases 1110 to which the client lacks read access. In some embodiments, only a portion of the records in a particular database may be ingested in this manner while others may not be ingested, e.g., based on input from clients 1010. In some embodiments, only a portion of fields or attributes of records may be ingested in this manner while others may not be ingested, e.g., based on input from clients 1010. In some embodiments, ingestion 1130 may be performed once for a particular database, e.g., before the client seeks to have entity linking performed using that database. As will be discussed in greater detail below, one or more of the databases 1110 may be live databases whose contents can change over time. Live databases may be monitored for changes, changed records may be re-ingested, and one or more ingestion and entity linking tasks may be performed again in light of the changes.

The ingestion 1130 may include generating contextual entity representations 1135. In some embodiments, the entity linking service 1100 may convert or transform records from private databases 1110 into flat strings or other flat data types. In some embodiments, the entity linking service 1100 may convert records in private databases 1110 into vectors with fixed numbers of values or fixed lengths. An individual record extracted from a private database may be converted into an individual representation in such a flat and/or fixed-length format. Records may be converted into contextual representations 1135 that are sensitive to a context within the source database, e.g., a context of the converted record. In some embodiments, a record may be encoded using a context-sensitive natural language processing (NLP) document encoder. In some embodiments, for example, a record may be encoded using a Bidirectional Encoder Representations from Transformers (BERT) encoder that captures the context of the record's contents. The entity linking service 1100 may store these contextual representations 1135 and use them to perform context-sensitive entity linking 1140 from documents 1015 to private databases 1110. In some embodiments, the contextual entity representations 1135 may include user-specified hints about entities. In some embodiments, some of the contextual entity representations 1135 may represent the context of an entire database. For example, data from outside a particular record may be included in the contextual entity representation for that record. As another example, contextual entity representations 1135 may be generated based (at least in part) on patterns that are observed across other records in the database.

A client of the entity linking service 1100 may invoke or request entity linking tasks using one or more calls to a service interface of the entity linking service. In connection with such a service call, a client of the entity linking service 1100 may provide one or more documents 1015 (or references to one or more documents) to the service. The input documents 1015 for a given client may be provided to the service 1100 as single documents or in batches of varying size (e.g., using one call to the service to request event extraction for one document or many documents). In some embodiments, the input documents 1015 may be collected by a client and stored in a storage location, e.g., a storage bucket of a storage service hosted by the same provider network 190 that offers the entity linking service 1100. The client may specify the storage location, and the entity linking service 1100 may read one or more input documents 1015 from the storage location. In some embodiments, the event extraction service 1100 may use an access credential associated with the client (e.g., an account name and password or an identity and access management role) to read input documents 1015 from the storage location.

Context-sensitive entity linking 1140 may select one of the records 1115A-1115N to match a particular mention of an entity in light of a context of the mention within the document and also in light of a context of the selected records (e.g., the corresponding contextual entity representations 1135). Context-sensitive entity linking 1140 may include using automated techniques for entity recognition 1150 for documents 1015. Entity recognition 1150 may be performed to recognize mentions of entities in documents 1015, e.g., using natural language processing (NLP) techniques. Entity recognition 1150 may be performed using regular expression matching or other rule-based approaches to identify spans of characters or tokens associated with particular mentions. A recognized mention may include one or more tokens or spans of characters within the document. A recognized mention may be encoded such that it captures an appropriate amount of context. The context may include other tokens or spans of characters from the document. In some embodiments, a mention may be encoded as a vector, e.g., such that the vector can be compared to the vectors of the contextual entity representations. In some embodiments, a mention may be encoded using a Bidirectional Encoder Representations from Transformers (BERT) encoder that captures the context of a mention within the document. In some embodiments, entity recognition 1150 may be performed according to user input. For example, a user may select a span of text in a document in a user interface, and the service 1100 may attempt to find a match for that span of text in one or more private databases 1110.

Context-sensitive entity linking 1140 may include using automated techniques for entity filtering 1160. The entity filtering 1160 may be performed without retrieving data from the database(s) 1110 at runtime. In some embodiments, the entity linking service 1100 may use the contextual representations 1135 to determine a set of candidate records for a particular mention, e.g., by filtering 1160 out a large number of contextual representations that represent unlikely matches with the mention. A candidate record may often include one or more of the same tokens (e.g., words) in the contextual representation of a mention. A particular contextual representation may correspond to one record in one of the private databases 1110. Using the entity filtering 1160, the candidate contextual representations and/or corresponding candidate records may be ranked according to scores or other values indicative of a likely match with an entity mention. In some embodiments, one or more techniques such as BERT encoding and Elasticsearch may be used to generate the ranking of candidates. In some embodiments, the top N candidate records (or their corresponding entity representations) may be selected and ranked by the filtering 1160. For example, the top 32 or 64 records may be ranked. In some embodiments, the value N may vary according to one or more performance optimization goals, e.g., to balance latency with accuracy.

Context-sensitive entity linking 1140 may include using automated techniques for record selection 1170. The entity filtering 1160 may reduce the number of records to be retrieved from the database(s) 1110 and thus improve the latency of entity linking 1140 along with reducing the use of network resources. In some embodiments, the entity linking service 1100 may examine one or more of the candidate records in the private database(s) 1110 to select a record representing the best match for a mention. For example, the top N candidate records may be read from the database(s) 1110. The retrieved records may be re-ranked or otherwise analyzed according to their actual contents, and the top match may be selected for a particular mention. In some embodiments, one or more records may be encoded using a Bidirectional Encoder Representations from Transformers (BERT) encoder, and the BERT embeddings may be used for record selection 1170.

In some embodiments, the context-sensitive entity linking 1140 may generate output that includes one or more links 1175 or references to selected records in the private databases 1110. In some embodiments, the context-sensitive entity linking 1140 may generate output that includes contents of selected records from the private databases 1110. The output 1175 for a particular client may reflect matching records for one document or many documents. In some embodiments, a plurality of mentions of entities may be recognized in a particular document, and a plurality of links 1175 may be output for that document. In some embodiments, a mention may be linked to one private database. In some embodiments, a mention may be linked to two or more private databases. In some embodiments, the service 1100 may provide the output 1175 for a particular document to a particular client using an application programming interface (API) or other programmatic interface associated with the service. In some embodiments, the service 1100 may provide the output 1175 for a particular document to a particular client in a user interface, e.g., a graphical user interface (GUI). For example, the original document may be presented in a GUI along with one or more links to records in the database(s) 1110. In some embodiments, the user interface can be used to drill down into all or part of a matching record for a particular mention. In some embodiments, the mention can be highlighted in the text automatically, and portions of the matching record can be presented concurrently in the same GUI if desired by the user. Using the output of the entity linking service 1100, clients 1010 may enhance their knowledge of entities in private databases 1110.

In some embodiments, the client may specify a storage location for output of the entity linking service 1100. The storage location may be specified using a service call to the entity linking service 1100, e.g., the same service call that invoked the entity linking for one or more input documents. The entity linking service 1100 may write one or more outputs to the storage location. In some embodiments, the entity linking service 1100 may use an access credential associated with the client (e.g., an account name and password or an identity and access management role) to write the outputs to the storage location.

In some embodiments, one or more of the input documents 1015 may be generated using transformation of audio input to text, e.g., using speech recognition techniques. In some embodiments, one or more of the input documents 1015 may be generated using transformation of image input or video input to text, e.g., using optical character recognition (OCR) techniques. The transformation of audio, images, or video to text may be performed by another service, e.g., an audio transcription or OCR service hosted by the same provider network that hosts the entity linking service 1100.

In some embodiments, the private databases 1110 may include data other than text. For example, the private databases 1110 may include image data related to various entities, e.g., photos associated with entities. In some embodiments, such data may be transformed into a vector representation, and the vector representation may be used for entity linking as discussed above. Similarly, the documents 1015 may include non-textual data such as images. As an example, an input to the context-sensitive entity linking 1140 may include a photo of a particular building. In this example, the private database 1110N may include records 1115N for individual locations, and those records may include photos of buildings at the corresponding locations. Instead of (or in addition to) transforming text into contextual entity representations, the service 1100 may ingest and transform the photos of buildings into vector representations. When the input with the photo of the particular building is received by the service 1100, the service may also transform the input image into a vector representation that is comparable with the contextual representations derived from the database 1110N. A comparison may be performed such that the closest matching image is selected in the database 1110N, and a link to the corresponding database record is generated as output of the service 1100.

In one embodiment, one or more components of the entity linking service 1100 may be implemented using resources of a provider network 190. The provider network 190 may represent a network set up by an entity such as a private-sector company or a public-sector organization to provide one or more services 195 (such as various types of network-accessible computing or storage) accessible via the Internet and/or other networks to a distributed set of clients. The provider network 190 may include numerous services 195 that collaborate according to a service-oriented architecture. For example, the entity linking service 1100 may be implemented using a service-oriented architecture in which various services 195 perform complex tasks by sending requests and responses using service interfaces 196. The entity linking service 1100 may offer one or more service interfaces by which clients of the entity linking service may request event extraction tasks. A service interface may be implemented as an application programming interface (API) or other programmatic interface. For example, a client of the entity linking service 1100 may use an API to provide one or more documents (e.g., by specifying a storage bucket in which the documents are stored) for which entity linking is sought. In some embodiments, a user interface (e.g., a graphical user interface or command-line interface) may be built on top of the API or other programmatic interface such that end users may invoke the functionality of the entity linking service 1100.

The provider network 190 may include numerous data centers hosting various resource pools, such as collections of physical and/or virtualized computer servers, storage devices, networking equipment and the like, that are used to implement and distribute the infrastructure and services offered by the provider. Compute resources may be offered by the provider network 190 to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the entity linking service 1100 may be implemented as a service of the provider network 190, the service may be implemented using a plurality of different instances that are distributed throughout one or more networks, and each instance may offer access to the functionality of the service to various clients. Because resources of the provider network 190 may be under the control of multiple clients (or tenants) simultaneously, the provider network may be said to offer multi-tenancy and may be termed a multi-tenant provider network. The provider network 190 may be hosted in the cloud and may be termed a cloud provider network. In one embodiment, portions of the functionality of the provider network 190, such as the service 1100, may be offered to clients in exchange for fees.

In various embodiments, components of the entity linking service 1100 may be implemented using any suitable number and configuration of computing devices, any of which may be implemented by the example computing device 3000 illustrated in FIG. 18. In some embodiments, the computing devices may be located in any suitable number of data centers or geographical locations. In various embodiments, at least some of the functionality of the entity linking service 1100 may be provided by the same computing device or by different computing devices. In various embodiments, if any of the components of the entity linking service 1100 are implemented using different computing devices, then the components and their respective computing devices may be communicatively coupled, e.g., via one or more networks. Any of the components of the entity linking service 1100 may represent any combination of software and hardware usable to perform their respective functions. In some embodiments, operations implemented by the entity linking service 1100 may be performed automatically, e.g., without a need for user initiation or user intervention after an initial configuration stage, and/or programmatically, e.g., by execution of program instructions on at least one computing device. In some embodiments, the entity linking service 1100 may include additional components not shown, fewer components than shown, or different combinations, configurations, or quantities of the components shown.

Clients 1010 of the entity linking service 1100 may represent external devices, systems, or entities with respect to the event extraction service. Client devices 1010 may be managed or owned by one or more customers or end users of the entity linking service 1100. In one embodiment, the client devices may be implemented using any suitable number and configuration of computing devices, any of which may be implemented by the example computing device 3000 illustrated in FIG. 18. Clients 1010 may convey network-based service requests to the entity linking service 1100 via one or more networks, e.g., to request entity linking for one or more specified documents with one or more private databases. The network(s) may encompass any suitable combination of networking hardware and protocols necessary to establish network-based communications between client devices and the entity linking service 1100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the entity linking service 1100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the entity linking service 1100. In one embodiment, client devices may communicate with the entity linking service 1100 using a private network rather than the public Internet. In various embodiments, the various components of the entity linking service 1100 may also communicate with other components of the entity linking service using one or more network interconnects.

Figure 7:
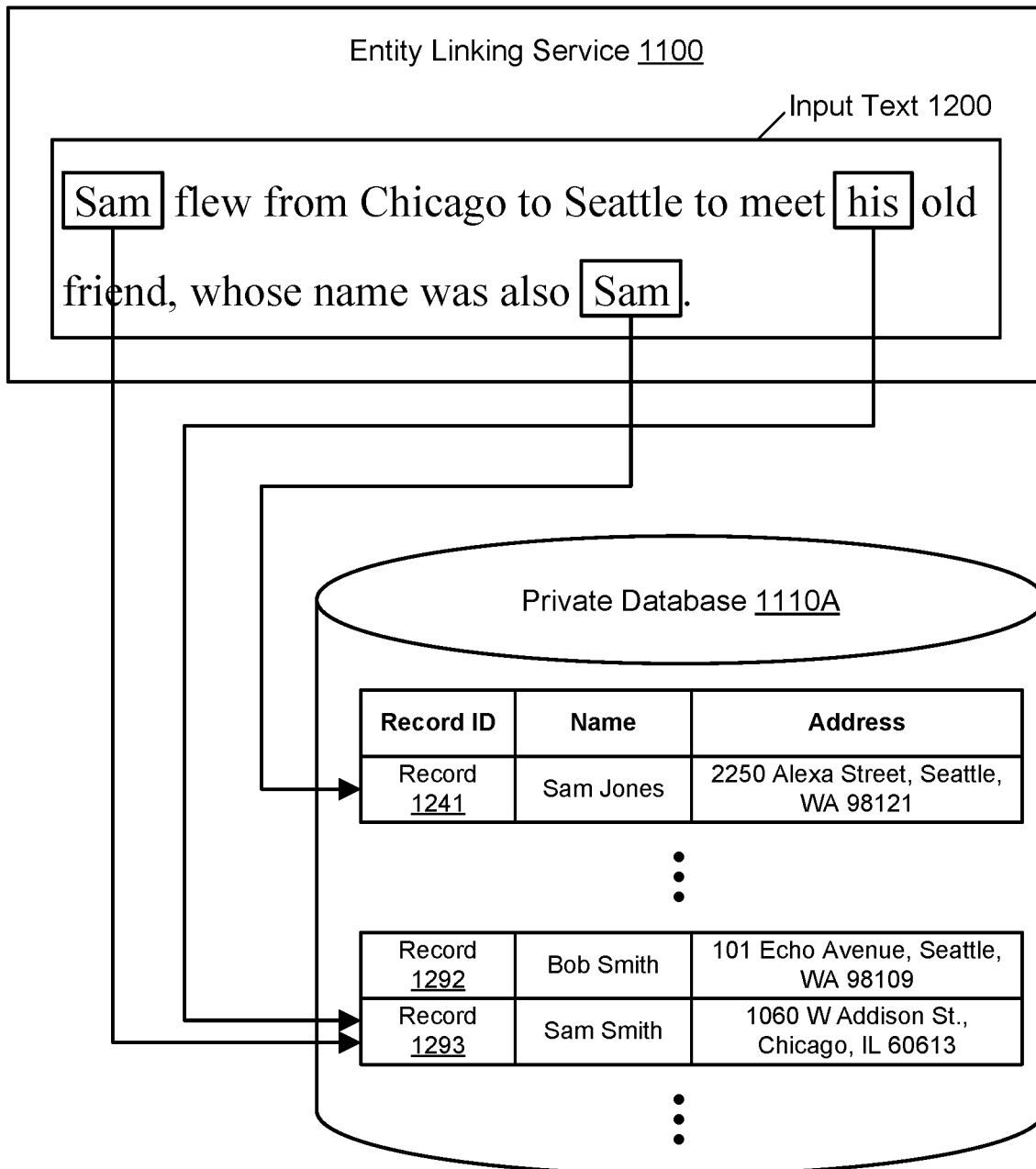
FIG. 7 is an example of context-sensitive linking of entities to private databases, according to some embodiments.

FIG. 7 is an example of context-sensitive linking of entities to private databases, according to some embodiments. Using the output of the entity linking service 1100, clients 1010 may enhance their knowledge of entities in private databases 1110. For example, a particular organization may have a private database with records for names, addresses, and other data for employees of the organization. The entity linking service 1100 may be used to detect mentions of employees in news reports or press releases. As another example, another private database may include a list of place names along with proprietary information descriptive of those places. The entity linking service 1100 may be used to provide additional information about places mentioned in news articles. The service 1100 may perform disambiguation using the context of a document as well as the context of a private database. For example, if a document mentions a place name "Paris" and indicates the context that the place is a small town, the entity linking service may disambiguate the reference and link to a record for the town of Paris, Texas (with the record indicating a population of 24,839 in 2018) instead of a record for Paris, France (with the record indicating a metro population in excess of 12 million).

In the example of FIG. 7, the entity linking service 1100 may receive the following input text 1200: "Sam flew from Chicago to meet his old friend, whose name was also Sam." Using the entity linking techniques described herein, the service 1100 may generate a contextual representation of the first mention of "Sam" that includes the context that this entity flew from Chicago. The service 1100 may generate a contextual representation of the mention of "his" that includes the context that the antecedent basis for this entity is the first mention of "Sam." The service 1100 may generate a contextual representation of the second mention of "Sam" that includes the context that this entity was located in Seattle. Based on analysis of these contextual representations, the service 1100 may determine links to a private database 1110A that includes records with records IDs, names of individuals, and their addresses. In the illustrated example, the service 1100 may determine that the first mention of "Sam" and the first mention of "his" both link to record 1293 that names Sam Smith at the address 1060 W Addison St., Chicago, IL, 60613. In some embodiments, the service 1100 may cluster the first mention of "Sam" and the first mention of "his" in a single entity group as two mentions that have the same referent. In the illustrated example, the service 1100 may also determine that the second mention of "Sam" links to record 1241 that names Sam Jones at the address 2250 Alexa Street, Seattle, WA 98121. None of these mentions may be linked to various other records in the database 1110A, such as record 1292 that names Bob Smith at the address 101 Echo Avenue, Seattle, WA 98109.

In some embodiments, entities may include events such that events may be identified in documents and then linked to private databases. For example, the span "flew" in the input text 1200 may be recognized as an occurrence of an event type such as "travel" or "air travel." As described herein, the event may be associated with various semantic roles such as the person who traveled (Sam Smith), the origin (Chicago), and the destination (Seattle). These semantic roles may be filled with entities or entity groups according to a travel-specific taxonomy. In some embodiments, using the linking service 1100, the event may be linked to a record in a private database, e.g., a database of airline reservations for employees of an organization.

In some embodiments, entity mentions in one or more documents that have the same referent may be clustered using a single entity group. In some embodiments, event mentions in one or more documents that have the same referent may be clustered using a single event (or trigger) group. In some embodiments, the entity linking service 1100 may determine that an entity mentioned in a document cannot be linked to any records in one or more databases 1110A-110N, at least not with a minimum confidence score. For example, the service 1100 may link the first mention of "Sam" along with "his" to record 1293 describing Sam Smith. However, the service 1100 may be unable to link the second mention of "Sam" to a record in the database 1110A. For example, the database 1110A may represent records for employees of an organization that employs Sam Smith but not the other Sam. In some embodiments, entity mentions or entity groups that cannot be linked to database records may be reported to a client by the service 1100 along with the database link(s) 1175. The inability of the service 1100 to find links for particular entities may drive additional analysis or additional tasks. For example, a user may decide to update a database to include entities for whom links to records could not be determined with confidence. As another example, a user may decide to augment records in a database such that entities can be disambiguated in the future.

Figure 8:
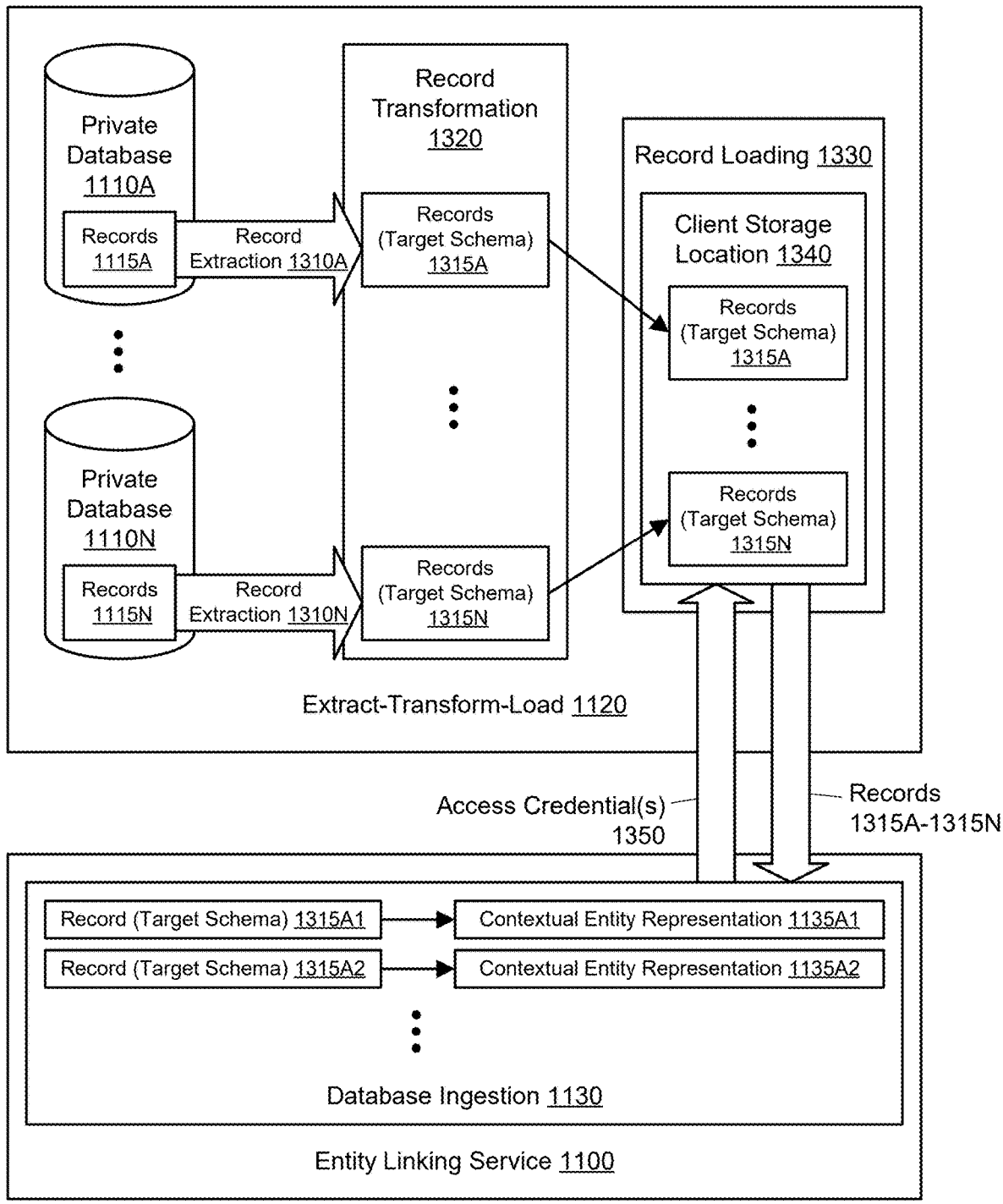
FIG. 8 illustrates further aspects of the example system environment for context-sensitive linking of entities to private databases, including the use of one or more extract-transform-load (ETL) tools, according to some embodiments.

FIG. 8 illustrates further aspects of the example system environment for context-sensitive linking of entities to private databases, including the use of one or more extract-transform-load (ETL) tools, according to some embodiments. In some embodiments, one or more extract-transform-load (ETL) tools 1120 may be used to perform extraction 1310A of records 1115A from private database 1110A and perform extraction 1310N of records 1115N from private database 1110N. In some embodiments, the service 1100 may supply appropriate access credential(s) in order to obtain the records 1115A-1115N from the private databases 1110. For example, the access credential(s) may include one or more account names and corresponding passwords. As another example, the access credential(s) may include one or more policies or roles for an identity and access management service. In some embodiments, a copy of a database may be stored by the service 1100 and encrypted using a key provided by the client.

As discussed above, entity linking may be performed for databases 1110 having diverse and varied schemas that describe the format of database contents. In some embodiments, databases or knowledge bases 1110 may include files such as text files that lack schemas. At least some of the schemas may be unknown during training or other development of the entity linking service 1100 In some embodiments, entity linking may be performed for databases 1110 having diverse and varied schemas that describe the format of database contents. At least some of the schemas may be unknown during training or other development of the entity linking service 1100. The entity linking service 1100 may transform records in one or more source databases 1110 from one or more source schemas (or from no schema) to a single target schema. The target schema may represent a common format for records that is used for entity linking by the service 1100. The one or more extract-transform-load (ETL) tools 1120 may be used to perform transformation 1320 of records 1115A from a first source schema to a common target schema, thus producing records 1315A in the target schema. Similarly, the one or more extract-transform-load (ETL) tools 1120 may be used to perform transformation 1320 of records 1115N from a second source schema to the common target schema, thus producing records 1315N in the target schema. Transformation 1320 may include reformatting or reorganizing contents of records 1115A-1115N to meet the target schema. Transformation 1320 may include selecting some fields and ignoring others, such that the modified records 1315A-1315N do not include all the data from the original records. In some embodiments, the records 1315A-1315N from different databases may be combined into a single set of records expressed in the target schema. In some embodiments, instead of or in addition to ETL tool(s) 1120, one or more other data pipelines or custom scripts may be used for transformation 1320.

The one or more extract-transform-load (ETL) tools 1120 may be used to perform loading 1330 of records 1315A-1315N, e.g., by copying the records into one or more client storage locations 1340. The storage 1340 may be provided by a storage service of the provider network 190. The storage 1340 may be accessible by the entity linking service 1100. In some embodiments, the service 1100 may supply appropriate access credential(s) 1350 in order to obtain the records 1315A-1315N from the storage 1340. For example, the access credential(s) 1350 may include one or more account names and corresponding passwords. As another example, the access credential(s) 1350 may include one or more policies or roles for an identity and access management service.

As discussed above, the entity linking service 1100 may include a component for database ingestion 1130 that consumes the records 1315A-1315N produced by the ETL tool(s) 1120. The ingestion 1130 may include generating contextual entity representations 1135 corresponding to at least some of the records 1315A-1315N. In some embodiments, the entity linking service 1100 may convert or transform records 1315A-1315N into flat strings or other flat data types. In some embodiments, the entity linking service 1100 may convert records 1315A-1315N into vectors, e.g., vectors having a particular number of dimensions. An individual record may be uniquely identifiable using a single key (e.g., a value for an attribute or field) or a compound key (e.g., a combination of values for multiple attributes or fields). In some embodiments, an individual record extracted from a private database may be converted into an individual representation in a flat and/or fixed-length format. For example, record 1315A1 may be converted to a contextual entity representation 1135A1, record 1315A2 may be converted to a contextual entity representation 1135A2, and so on. Records 1315A-1315N may be converted into contextual representations 1135 that are sensitive to a context within the source database, e.g., a context of the converted record or a context of multiple records. The entity linking service 1100 may store these contextual representations 1135 and use them to perform context-sensitive entity linking 1140 from documents 1015 to private databases 1110.

In some embodiments, ingestion 1130 and/or entity linking 1140 may be performed according to one or more machine learning techniques or machine learning models. Machine learning techniques may be implemented using one or more systems that learn from data, identify patterns, and make predictions or other decisions with minimal human intervention (e.g., after human input during an initial configuration phase such as model training). Machine learning techniques may include generating and using one or more models that can programmatically output results (e.g., identification of entities and links to matching entities in databases) based (at least in part) on input (e.g., unstructured text documents and structured databases). A machine learning model may undergo a model training process (e.g., using a training data set) such that it learns patterns sufficient to make inferences about future events. For example, during training, different combinations of columns or fields may be used to generate contextual representations so that the model is more robust during inference. A machine learning model may undergo a model evaluation process to assess the quality of the model's performance, e.g., after training. A machine learning model may include a neural network model. One or more machine learning models may be trained to predict entity links based (at least in part) on input documents 1015 that the model did not encounter during training. The prediction phase for such newly encountered input documents may also be referred to as the inference phase.

Figure 9:
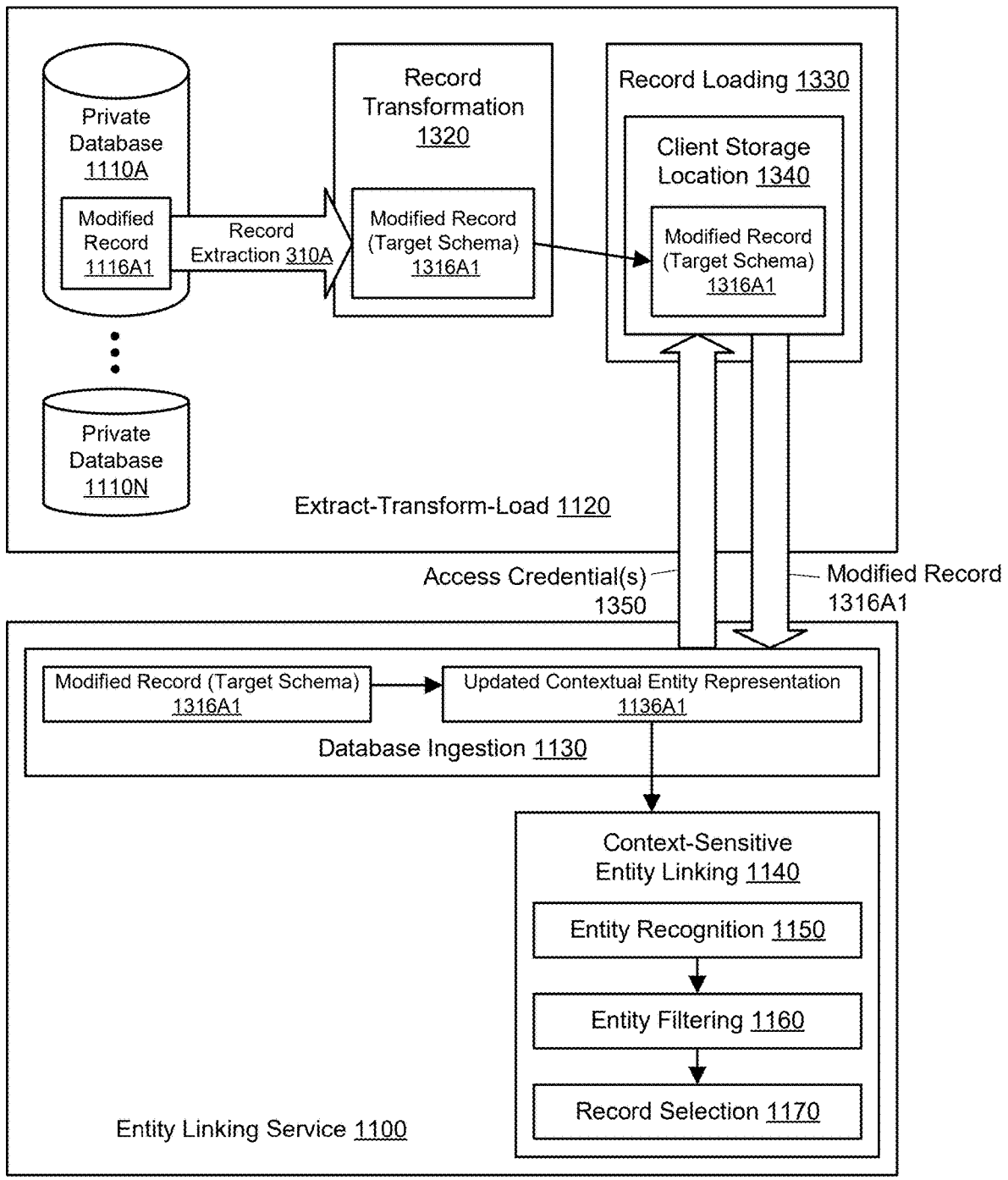
FIG. 9 illustrates further aspects of the example system environment for context-sensitive linking of entities to private databases, including the updating of entity representations and entity linking when corresponding records are changed in private databases, according to some embodiments.

FIG. 9 illustrates further aspects of the example system environment for context-sensitive linking of entities to private databases, including the updating of entity representations and entity linking when corresponding records are changed in private databases, according to some embodiments. In some embodiments, ingestion 1130 may be performed once for a particular database, e.g., before the client seeks to have entity linking performed using that database. In some embodiments, one or more of the databases 1110 may be live databases whose contents can change over time. Live databases may be monitored for changes, e.g., periodically by one or more ETL tools 1120. Modified records may include new records, deleted records, records with modified contents, and so on. If one or more changes to a previously ingested database 1110A are detected, each modified record 1116A1 may be extracted using record extraction 1310A. As discussed above, record transformation 1320 may be performed to transform the record 1116A1 from the source schema to a modified record 1316A1 in the common target schema. Again, the modified record 1316A1 may be loaded to the client storage location(s) 1350. In some embodiments, the modified record 1316A1 may be ingested by the service 1100, and an updated contextual entity representation 1136A1 may be generated. In some embodiments, the updated contextual entity representation 1136A1 may be used to update the output of the context-sensitive entity linking 1140. For example, if previous output linked to an earlier version of the modified record 1116A1, then one or more entity linking 1140 tasks may be performed again using the updated contextual entity representation 1136A1 to potentially produce different output. In some embodiments, on detecting changes to records such as record 1116A1, the service 1100 may select a different record that best matches a mention after the changes, and the service may generate output with a link to the different record.

Figure 10:
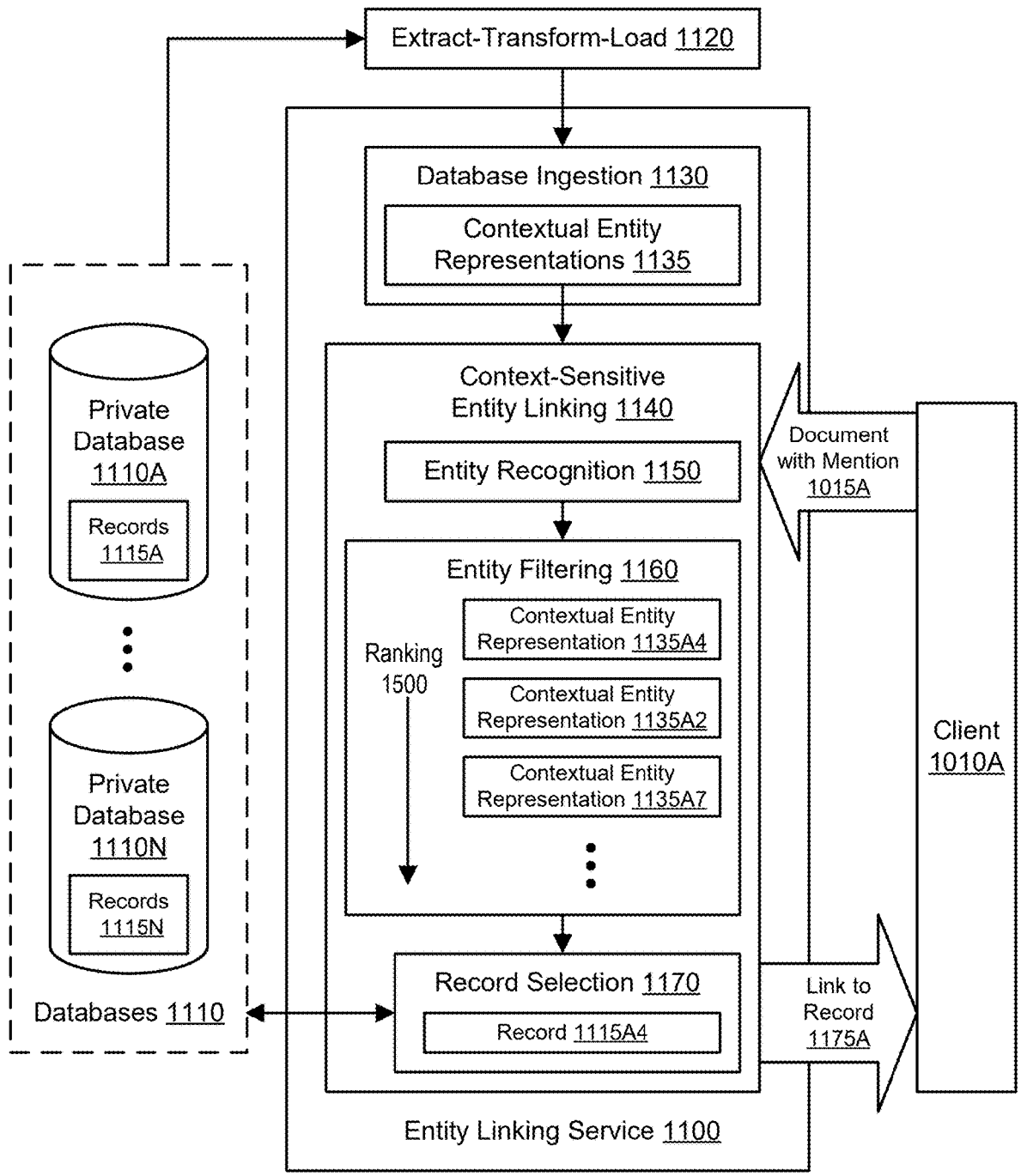
FIG. 10 illustrates further aspects of the example system environment for context-sensitive linking of entities to private databases, including the use of ranked contextual representations for filtering potential matches with records, according to some embodiments.

FIG. 10 illustrates further aspects of the example system environment for context-sensitive linking of entities to private databases, including the use of ranked contextual representations for filtering potential matches with records, according to some embodiments. As discussed above, context-sensitive entity linking 1140 may include using automated techniques for entity filtering 1160. The entity filtering 1160 may reduce the number of records to be retrieved from the database(s) 1110 for entity linking at runtime and thus improve the latency of entity linking 1140 along with reducing the use of network resources. In some embodiments, the entity linking service 1100 may use the contextual representations 1135 to determine a set of candidate records for a particular mention, e.g., by filtering 1160 out a large number of contextual representations that represent unlikely matches with the mention. A particular contextual representation may correspond to one record in one of the private databases 1110. As shown in the example of FIG. 10, for a particular input document 1015A with an entity mention as provided by a client 1010A, the entity filtering 1160 may generate a candidate set of contextual entity representations such as representations 1135A2, 1135A4, 1135A7, and so on. The candidate set may exclude other contextual entity representations from the same private database(s).

Using the entity filtering 1160, the candidate contextual representations and/or corresponding candidate records may be ranked according to scores or other values indicative of a likely match with an entity mention. As shown in the example of FIG. 10, the ranking 1500 of the candidates in order from best to worst may first include the representation 1135A4, then the representation 1135A2, then the representation 1135A7, and so on. In some embodiments, the top N candidate records (or their corresponding entity representations) may be selected and ranked by the filtering 1160. For example, the top 32 or 64 records may be ranked. In some embodiments, the value N may vary according to one or more performance optimization goals.

Context-sensitive entity linking 1140 may include using automated techniques for record selection 1170. In some embodiments, the entity linking service 1100 may examine one or more of the candidate records in the private database(s) 1110 to select a record representing the best match for a mention. For example, the top N candidate records may be read from the database(s) 1110. The retrieved records may be re-ranked according to their actual contents, and the top match may be selected for a particular mention. In the example of FIG. 10, the record 1115A4 may be selected from private database 1110A. The record 1115A4 may correspond to the top-ranked contextual entity representation 1135A4. The service 1100 may produce a link 1175A to the record as output to the client 1010A.

Figure 11:
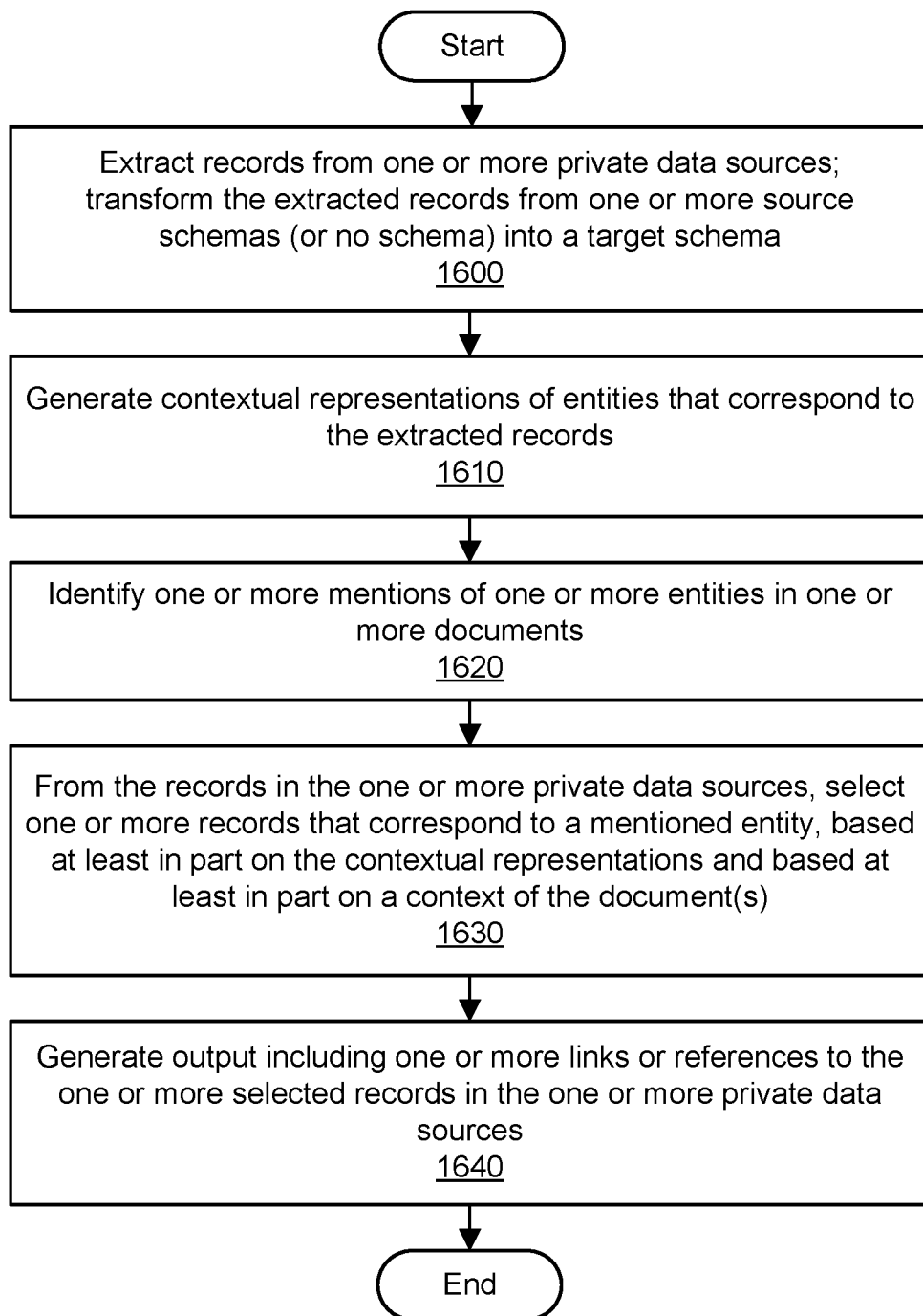
FIG. 11 is a flowchart illustrating a method for context-sensitive linking of entities to private databases, according to some embodiments.

FIG. 11 is a flowchart illustrating a method for context-sensitive linking of entities to private databases, according to some embodiments. As shown in 1600, records may be extracted from one or more private data sources. Data sources may include private databases or knowledge bases such as relational databases, NoSQL databases, graph databases, repositories, catalogs, spreadsheet files, text files, and so on. The private data source(s) may not be globally accessible. The private database(s) may be inaccessible to users without proper access credentials permitting read access. The private data source(s) may include records or other units of data that are descriptive of entities. Entities may include real-world objects (or objects from virtual worlds) such as persons, groups of people, organizations, things, places, dates, and so on. Entities referenced in the data source(s) may include names or identifiers of entities along with other descriptive data or other data associated with individual entities. Records may be uniquely identifiable within a database using one or more values for fields or attributes. For example, a record in a relational database may be identifiable by an ID number in a particular column, while records in a text file may be associated with different line numbers. The records may be transformed from one or more source schemas (or no schema) to a target schema. The target schema may represent a common format for records that is used for entity linking by the service. In some embodiments, one or more extract-transform-load (ETL) tools may be used to extract records from private data sources, transform the records to meet the target schema, and load the transformed records into storage accessible by the entity linking service. The records in the target schema may represent an intermediate set of records. In some embodiments, ingestion of such records in a common schema may be performed for databases having diverse and varied schemas.

As shown in 1610, contextual representations may be generated for entities that correspond to the extracted and transformed records. In some embodiments, the entity linking service may convert or transform records from private databases into flat strings or other flat data types. In some embodiments, the entity linking service may convert records in private data sources into vectors with fixed numbers of values or fixed lengths. An individual record extracted from a private data source may be converted into an individual representation in such a flat and/or fixed-length format. Records may be converted into contextual representations that are sensitive to a context within the source database, e.g., a context of the converted record or a context of multiple records. Contextual representations may be generated using natural language processing (NLP) techniques. Contextual representations may include a plurality of Bidirectional Encoder Representations from Transformers (BERT) that capture the context of a mention.

As shown in 1620, one or more mentions of one or more entities may be identified or recognized in one or more input documents. Entity recognition may be performed to recognize mentions of entities in text, e.g., using natural language processing (NLP) techniques. A recognized mention may include one or more tokens or spans of characters within the document(s). A recognized mention may be encoded such that it captures an appropriate amount of context. The context may include other tokens or spans of characters from the document(s). In some embodiments, a mention may be encoded as a vector, e.g., such that the vector can be compared to the vectors of the contextual entity representations. In some embodiments, a mention may be encoded using a Bidirectional Encoder Representations from Transformers (BERT) encoder that captures the context of a mention within the document(s).

As shown in 1630, for at least some of the mentions, one or more records may be selected from the records in the one or more data source(s), where the selected record(s) correspond to the mentioned entity. The record(s) may be selected based at least in part on the contextual representations and based at least in part on a context of the mention in the document(s). Entity filtering may reduce the number of records to be retrieved from the data source(s) for entity linking at runtime and thus improve the latency of entity linking along with reducing the use of network resources. In some embodiments, the entity linking service may use the contextual representations to determine a set of candidate records for a particular mention, e.g., by filtering out a large number of contextual representations that represent unlikely matches with the mention. A candidate record may often include one or more of the same tokens (e.g., words) in the contextual representation of a mention. The candidate contextual representations and/or corresponding candidate records may be ranked according to scores or other values indicative of a likely match with an entity mention. In some embodiments, the entity linking service may examine one or more of the candidate records in the private data source(s) to select a record representing the best match for a mention. For example, the top N candidate records may be read from the data source(s) and examined. In some embodiments, the retrieved records may be re-ranked according to their actual contents. The record representing the top match may be selected for a particular mention.

As shown in 1640, output may be generated that includes one or more links or references to the one or more selected records in the one or more private data sources. In some embodiments, a mention may be linked to one private data source. In some embodiments, a mention may be linked to two or more private data sources. In some embodiments, the context-sensitive entity linking may generate output that includes contents of selected records from the private data source(s). In some embodiments, a plurality of mentions of entities may be recognized in a particular document, and a plurality of links may be output for that document. In some embodiments, a ranked list of records (e.g., ranked by confidence scores for matches with a mentioned entity) may be output for an entity. For example, the user may choose to look at the top N records linked to an entity mention. In some embodiments, entity mentions with the same referent may be clustered in the output as a single entity group. In some embodiments, the service may provide the output for a particular document to a particular client using an application programming interface (API) or other programmatic interface associated with the service. In some embodiments, the service may provide the output for a particular document to a particular client in a user interface, e.g., a graphical user interface (GUI). Using the output of the entity linking service, clients may enhance their knowledge of entities in private data sources.

Lifecycle Management for Customized Natural Language Processing

Figure 12A:
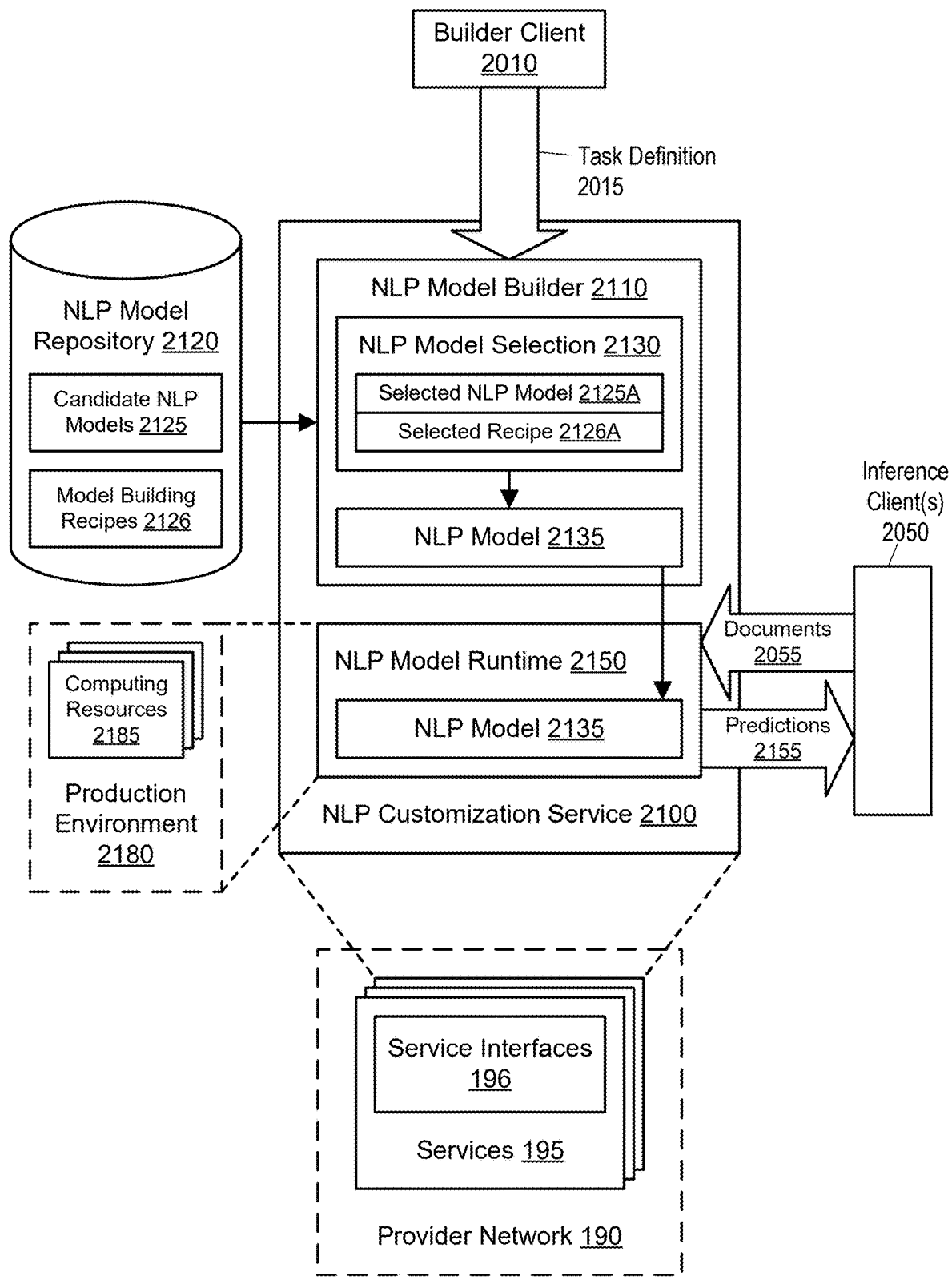
FIG. 12A and FIG. 12B illustrate an example system environment for lifecycle management for customized natural language processing, according to some embodiments.
Figure 12B:
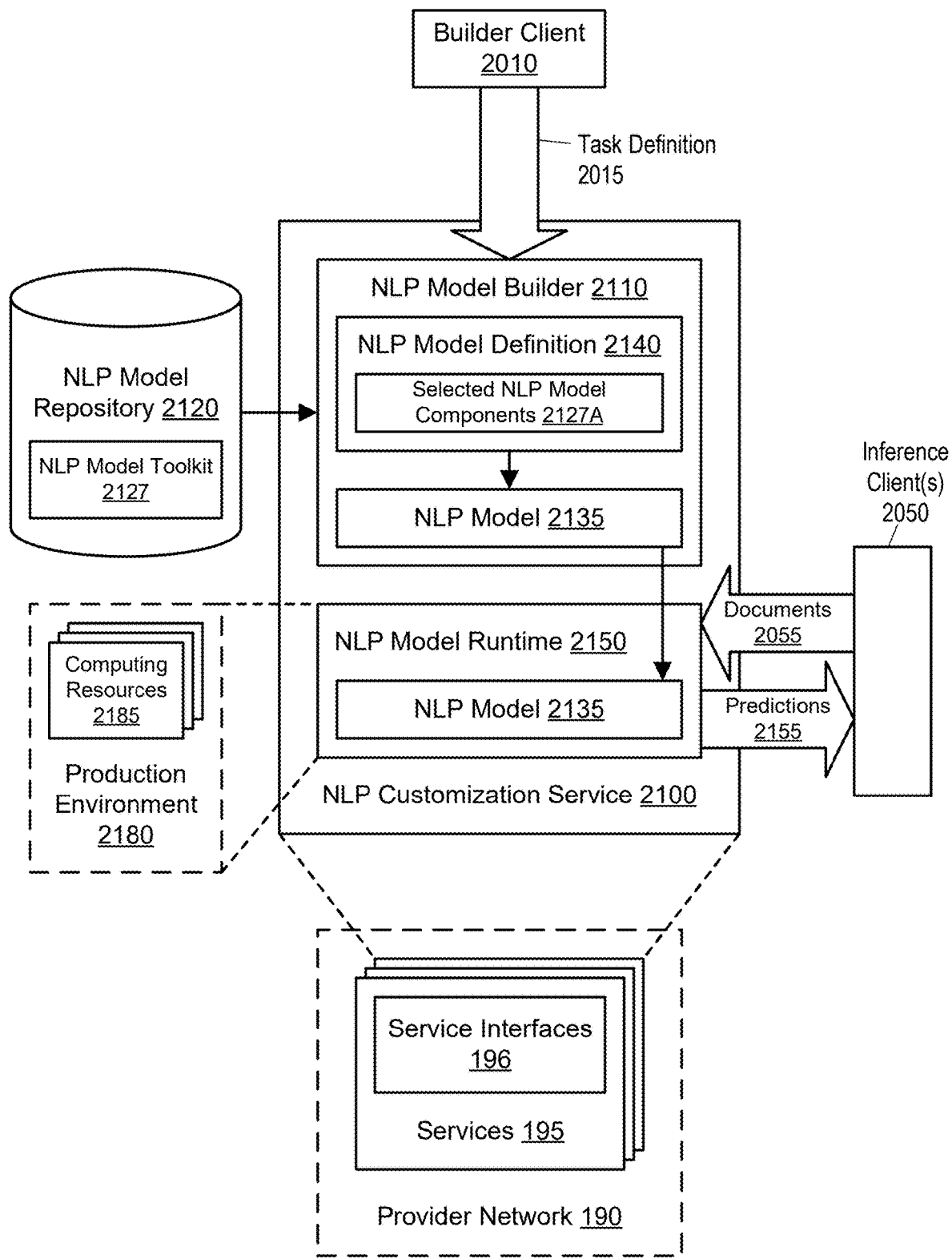

FIG. 12A and FIG. 12B illustrate an example system environment for lifecycle management for customized natural language processing, according to some embodiments. An NLP customization service 2100 may perform automated (or semi-automated) management of custom NLP models across the model lifecycle. For example, a custom NLP model 2135 may be used to classify documents in various categories, extract events from documents, extract entities from documents, link entities in documents to database records, and/or other NLP tasks. The lifecycle of a custom NLP model 2135 may include various stages performed using an NLP model builder component 2110, such as defining tasks for the model, collecting and/or preparing training data for the model, annotating the training data, selecting attributes for the model, training the model, evaluating the trained model (e.g., for accuracy and/or performance), and so on. The lifecycle of a custom NLP model 2135 may include various stages performed using an NLP model runtime component 2150, such as deploying the trained model to a production environment 2180, using the deployed model to provide predictions 2155 (inference) for input documents 2055, monitoring the inference to detect changing conditions in input documents, monitoring the inference to detect changes in the accuracy or performance of the model, and so on. In some embodiments, the lifecycle of a custom NLP model 2135 may include refining or fine-tuning the model over time, e.g., to adapt to changing conditions observed during inference. To reduce the involvement of users, the service 2100 may perform one or more of the lifecycle stages in the absence of user input and instead using techniques for automation.

In some embodiments, custom NLP tasks may be performed according to one or more machine learning techniques or machine learning models. Machine learning techniques may be implemented using one or more systems that learn from data, identify patterns, and make predictions or other decisions with minimal human intervention (e.g., after human input during an initial configuration phase such as model training). Machine learning techniques may include generating and using one or more models that can programmatically output results (e.g., identification of entities and links to matching entities in databases) based (at least in part) on input (e.g., unstructured text documents and structured databases). A machine learning model may undergo a model training process (e.g., using a training data set) such that it learns patterns sufficient to make inferences about future events. For example, during training, different combinations of textual inputs in a corpus of training documents may be used so that the model is more robust during inference. A machine learning model may undergo a model evaluation process to assess the quality of the model's performance, e.g., after training. A machine learning model may include a neural network model. One or more machine learning models may be trained to provide predictions 2155 based (at least in part) on input documents 2055 that the model did not encounter during training. The prediction phase for such newly encountered input documents may also be referred to as the inference phase.

A builder client 2010 may represent a person, group, or organization that seeks to develop one or more custom NLP applications. The builder client 2010 of the NLP customization service 2100 may invoke or request custom NLP model building tasks using one or more calls to a user interface or programmatic interface of the NLP customization service. For example, the builder client 2010 may provide or indicate a task definition 2015 associated with a custom NLP model. The task definition 2015 may include a selection or indication of one or more NLP tasks to be implemented using a custom NLP model. The task definition 2015 may include one or more requirements for use of the custom NLP model in training, evaluation, and/or production. For example, the requirements may indicate a minimum threshold of accuracy. As another example, the requirements may indicate thresholds of performance (e.g., latency metrics for inference). Such requirements may be used in evaluating a trained model before deploying the model to production. In some embodiments, such requirements may be used in determining whether to refine or fine-tune a model. In some embodiments, such requirements may be used in refining or fine-tuning a model before deploying the retrained or fine-tuned model to production.

In some embodiments, the requirements may include one or more resource usage values or budgetary values that indicate the priorities of the builder client 2010 with respect to lifecycle stages of the custom NLP model 2135. Based (at least in part) on resource usage values specified in the task definition 2015, the service 2100 may select an amount of resources to be used for individual lifecycle stages such as collecting and/or preparing training data for the model, annotating the training data, selecting attributes for the model, training the model, evaluating the trained model, using the deployed model to provide predictions 2155 (inference) for input documents 2055, monitoring the inference to detect changing conditions in input documents, monitoring the inference to detect changes in the accuracy or performance of the model, refining or fine-tuning the model over time, and so on. The resource usage values may include an overall budget or value for the entire lifecycle and/or individual budgets or values for various lifecycle stages. For example, the service 2100 may determine a model retraining rate according to the resource usage values, and the model retraining rate may affect how often model retraining is performed. As another example, the service 2100 may determine a training data processing rate according to the resource usage values, and the training data processing rate may affect how often training data is collected, annotated, and/or corrected in initially training or in retraining the model.

As shown in FIG. 12A, the NLP model builder 2110 may include a component 2130 for NLP model selection. Based (at least in part) on the task definition 2015, the NLP model selection 2130 may select one or more elements from an NLP model repository 2120. The repository 2120 may include a plurality of candidate NLP models 2125. The candidate NLP models 2125 may include models associated with different NLP tasks such as document classification, event extraction, entity extraction, and so on. The model selection 2130 may determine a selected NLP model 2125A from the repository based (at least in part) on the task definition 2015. In some embodiments, the repository 2120 may include a plurality of model building recipes 2126. The model building recipes 2126 may include plans or instructions for programmatically performing various model building tasks such as collecting and/or preparing training data for the model, annotating the training data, selecting attributes for the model, training the model, evaluating the trained model, and so on. In some embodiments, the model selection 2130 may determine a selected recipe 2126A from the repository based (at least in part) on the task definition 2015. In some embodiments, the recipe 2126A may be associated with the selected NLP model 2125A and may be selected on the basis of that association. For example, as part of specifying the task definition 2015, the client 2010 may select a "classification" option in a user interface associated with the model builder 2110. The classification option may be associated with one or more of the candidate NLP models 2125 (including the selected model 2125A) and one or more of the model building recipes 2126 (including the selected recipe 2126A). The client 2010 may provide "ground truth" training documents for which accurate output has been established. The training documents may be annotated. Based (at least in part) on the selection of a particular NLP task and on the training documents, the NLP model builder 2110 may automatically select a model topology or other model characteristics for the custom NLP model 2135, train the model using the training data, evaluate the trained model according to any requirements (e.g., requirements for accuracy or performance as indicated in the task definition 2015), and deploy the trained model to the runtime component 2150. In some embodiments, at least some of the recipes 2126 may be published via a marketplace or other distribution channel so that custom NLP solutions may be shared across different builder clients.

In some embodiments, the builder client 2010 may seek to build a custom NLP application that combines a plurality of NLP tasks. As shown in FIG. 12B, the NLP model builder 2110 may include a component 2140 for NLP model definition. Based (at least in part) on the task definition 2015, the NLP model definition 2140 may select a plurality of elements from an NLP model toolkit 2127 of the repository 2120. The task definition 2015 may indicate a plurality of primitives or NLP operations. The toolkit 2127 may include models, recipes, and other components usable to build NLP models for various NLP tasks such as document classification, event extraction, entity extraction, highlighting spans of text, and so on. The model definition 2140 may determine a plurality of selected NLP model components 2127A from the repository based (at least in part) on the task definition 2015. For example, as part of specifying the task definition 2015, the client 2010 may select both a "classification" option and an "extraction" option in a user interface associated with the model builder 2110. The classification option may be associated with one or more items in the toolkit 2127 (including one portion of the selected components 2127A), and the extraction option may also be associated with one or more items in the toolkit 2127 (including another portion of the selected components 2127A). The model builder 2110 may produce a model 2135 using a combination of the selected components 2127A. The client 2010 may provide "ground truth" training documents for which accurate output has been established. The training documents may be annotated. Based (at least in part) on the selection of the NLP tasks and on the training documents, the NLP model builder 2110 may automatically select a model topology or other model characteristics for the custom NLP model 2135, train the model using the training data, evaluate the trained model according to any requirements (e.g., requirements for accuracy or performance as indicated in the task definition 2015), and deploy the trained model to the runtime component 2150.

The runtime component 2150 may be implemented using one or more computing resources 2185 in a production environment 2180. In some embodiments, the runtime component 2150 may include one or more endpoints at which the model 2135 is deployed. The one or more endpoints may be hosted by a service that manages deployment and inference for machine learning models. The managed service for machine learning model inference may be hosted in the provider network 190 as one of the services 195. In some embodiments, the managed service for machine learning model inference may enable batch transform jobs by initializing compute instances (using the resources 2185) and distributing the inference workload 2055 across the instances.

Inference client(s) 2050 may represent one or more persons, groups, or organizations that seek to use the custom NLP application(s) to provide predictions 2155 based (at least in part) on input documents 2055. In some embodiments, the inference client(s) 2050 may include the builder client 2010. In some embodiments, the inference client(s) 2050 may not include the builder client 2010 but may instead represent customers or users of the builder client. An inference client 2050 of the NLP customization service 2100 may invoke or request inference tasks using one or more calls to a user interface or programmatic interface of the NLP customization service. In connection with such a service call, an inference client 2050 of the NLP customization service 2100 may provide one or more documents 2055 (or references to one or more documents) to the service. The input documents 2055 for a given client may be provided to the service 2100 as single documents or in batches of varying size (e.g., using one call to the service to request event extraction for one document or many documents). In some embodiments, the input documents 2055 may be collected by a client 2050 and stored in a storage location, e.g., a storage bucket of a storage service hosted by the same provider network 190 that offers the NLP customization service 2100. The client 2050 may specify the storage location, and the NLP model runtime 2150 may read one or more input documents 2055 from the storage location. In some embodiments, the NLP model runtime 2150 may use an access credential associated with the client (e.g., an account name and password or an identity and access management role) to read input documents 2055 from the storage location.

In some embodiments, an inference client 2050 may specify a storage location for output 2155 of the custom NLP model 2135. The storage location may be specified using a service call to the NLP customization service 2100, e.g., the same service call that invoked the inference task(s) for one or more input documents. The NLP model runtime 2150 may write one or more outputs to the storage location. In some embodiments, the NLP model runtime 2150 may use an access credential associated with the client (e.g., an account name and password or an identity and access management role) to write the outputs 2155 to the storage location.

In some embodiments, one or more of the input documents 2055 may be generated using transformation of audio input to text, e.g., using speech recognition techniques. In some embodiments, one or more of the input documents 2055 may be generated using transformation of image input or video input to text, e.g., using optical character recognition (OCR) techniques. The transformation of audio, images, or video to text may be performed by another service, e.g., an audio transcription or OCR service hosted by the same provider network 190 that hosts the NLP customization service 2100. In some embodiments, the techniques described herein may be applied to image input, video input, or audio input instead of (or in addition to) text input. For example, a client 2010 may provide a task definition about one or more tasks associated with image analysis, such as object recognition or other computer vision tasks; a cloud-based service may build, train, and evaluate a model that implements the specified image analysis task(s); and the model may be used in a production environment to perform the image analysis task(s) for input images.

In one embodiment, one or more components of the NLP customization service 2100 may be implemented using resources of a provider network 190. The provider network 190 may represent a network set up by an entity such as a private-sector company or a public-sector organization to provide one or more services 195 (such as various types of network-accessible computing or storage) accessible via the Internet and/or other networks to a distributed set of clients. The provider network 190 may include numerous services 195 that collaborate according to a service-oriented architecture. For example, the NLP customization service 2100 may be implemented using a service-oriented architecture in which various services 195 perform complex tasks by sending requests and responses using service interfaces 196. The NLP customization service 2100 may offer one or more service interfaces by which clients of the NLP customization service may request event extraction tasks. A service interface may be implemented as an application programming interface (API) or other programmatic interface. For example, an inference client 2050 of the NLP customization service 2100 may use an API to provide one or more documents (e.g., by specifying a storage bucket in which the documents are stored) for which custom natural language processing is sought. As another example, a builder client 2010 of the service 2100 may use an API to specify portions of a task definition 2015. In some embodiments, a user interface (e.g., a graphical user interface or command-line interface) may be built on top of the API or other programmatic interface such that end users may invoke the functionality of the NLP customization service 2100.

The provider network 190 may include numerous data centers hosting various resource pools, such as collections of physical and/or virtualized computer servers, storage devices, networking equipment and the like, that are used to implement and distribute the infrastructure and services offered by the provider. Compute resources may be offered by the provider network 190 to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the NLP customization service 2100 may be implemented as a service of the provider network 190, the service may be implemented using a plurality of different instances that are distributed throughout one or more networks, and each instance may offer access to the functionality of the service to various clients. Because resources of the provider network 190 may be under the control of multiple clients (or tenants) simultaneously, the provider network may be said to offer multi-tenancy and may be termed a multi-tenant provider network. The provider network 190 may be hosted in the cloud and may be termed a cloud provider network. In one embodiment, portions of the functionality of the provider network 190, such as the service 2100, may be offered to clients in exchange for fees.

In various embodiments, components of the NLP customization service 2100 may be implemented using any suitable number and configuration of computing devices, any of which may be implemented by the example computing device 3000 illustrated in FIG. 18. In some embodiments, the computing devices may be located in any suitable number of data centers or geographical locations. In various embodiments, at least some of the functionality of the NLP customization service 2100 may be provided by the same computing device or by different computing devices. In various embodiments, if any of the components of the NLP customization service 2100 are implemented using different computing devices, then the components and their respective computing devices may be communicatively coupled, e.g., via one or more networks. Any of the components of the NLP customization service 2100 may represent any combination of software and hardware usable to perform their respective functions. In some embodiments, operations implemented by the NLP customization service 2100 may be performed automatically, e.g., without a need for user initiation or user intervention after an initial configuration stage, and/or programmatically, e.g., by execution of program instructions on at least one computing device. In some embodiments, the NLP customization service 2100 may include additional components not shown, fewer components than shown, or different combinations, configurations, or quantities of the components shown.

Clients 2010 and 2050 of the NLP customization service 2100 may represent external devices, systems, or entities with respect to the service. Client devices 2010 and 2050 may be managed or owned by one or more customers or end users of the NLP customization service 2100. In one embodiment, the client devices may be implemented using any suitable number and configuration of computing devices, any of which may be implemented by the example computing device 3000 illustrated in FIG. 18. Clients 2010 and 2050 may convey network-based service requests to the NLP customization service 2100 via one or more networks, e.g., to request entity linking for one or more specified documents with one or more private databases. The network(s) may encompass any suitable combination of networking hardware and protocols necessary to establish network-based communications between client devices and the NLP customization service 2100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the NLP customization service 2100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the NLP customization service 2100. In one embodiment, client devices may communicate with the NLP customization service 2100 using a private network rather than the public Internet. In various embodiments, the various components of the NLP customization service 2100 may also communicate with other components of the NLP customization service using one or more network interconnects.

Figure 13:
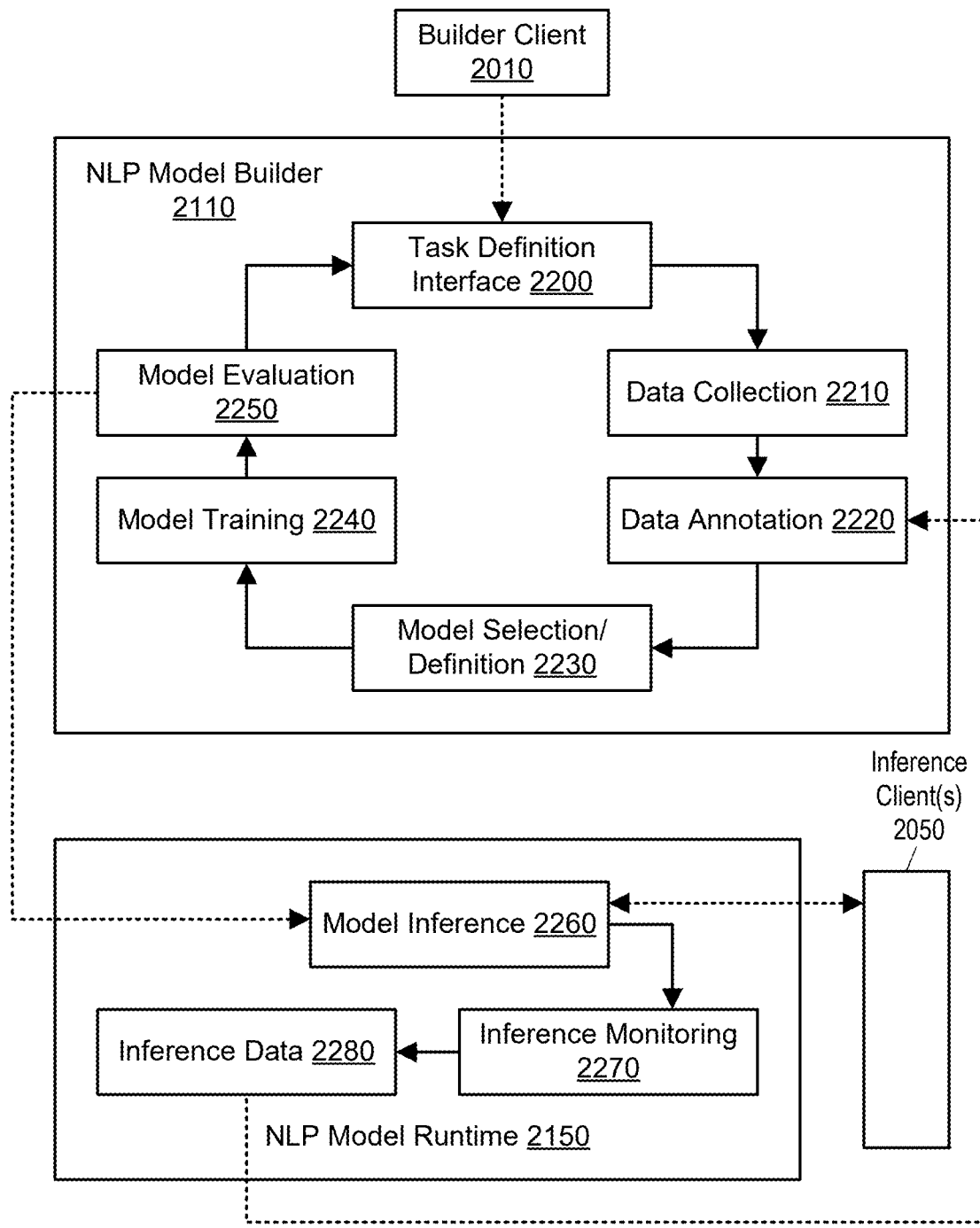
FIG. 13 illustrates further aspects of the example system environment for lifecycle management for customized natural language processing, including tasks performed in model building and at runtime, according to some embodiments.

FIG. 13 illustrates further aspects of the example system environment for lifecycle management for customized natural language processing, including tasks performed in model building and at runtime, according to some embodiments. As discussed above, the lifecycle of a custom NLP model 2135 may include various stages performed using an NLP model builder component 2110, such as defining tasks for the model, collecting and/or preparing training data for the model, annotating the training data, selecting attributes for the model, training the model, evaluating the trained model (e.g., for accuracy and/or performance), and so on. As shown in FIG. 13, the model builder 2110 may include a task definition interface 2200 that enables the builder client 2010 to indicate one or more portions of the task definition 2015. The interface 2200 may include one or more graphical user interfaces (GUIs), command-line interfaces (CLIs), voice-enabled interfaces, or programmatic interfaces on which a user interface is built. The task definition interface 2200 may represent a declarative interface. The task definition 2015 may include a definition of a problem to be solved using the custom NLP model. The task definition 2015 may include a configuration of a flow of custom annotation and evaluation specifications.

The model builder 2110 may include a component 2210 for data collection. The data collection 2210 may execute a data collection task targeted at gathering data required for building training and evaluation documents. The model builder 2110 may include a component 2220 for data annotation. The data annotation 2220 may assign labels to portions of previously collected documents that are intended to be used for training and evaluation. The data annotation 2220 may correct problems in previously collected documents that are intended to be used for training and evaluation. In some embodiments, the data collection 2210 and/or data annotation 2220 may be implemented using the same managed service that hosts the inference endpoints.

In some embodiments, the model builder 2110 may perform other automated preparation tasks for a corpus of documents used for training or evaluation. For example, the model builder 2110 may select some portions of documents and exclude other portions to build a corpus of documents for training or evaluation. As another example, the model builder 2110 may reformat or transform contents of documents to build a corpus of documents for training or evaluation. In some embodiments, the model builder 2110 may perform data augmentation. Data augmentation may include enriching data in a corpus of documents, e.g., by adding text or metadata usable for training or evaluation. In some embodiments, the model builder 2110 may perform arbitration associated with the data annotation 2220. Arbitration may include resolving conflicts in annotations. For example, multiple external vendors may be assigned annotation tasks, and the labels assigned by those vendors may differ for a particular span in a particular document. Arbitration may improve the quality of annotation by using algorithms or heuristics to select some labels and discard other labels.

The model builder 2110 may include a component 2230 for model selection/definition. The model selection/definition 2230 may implement aspects of the model selection 2130 and/or model definition 2140. The model selection/definition 2230 may select a model topology for the custom NLP mode. The model selection/definition 2230 may configure a pipeline for hyperparameter tuning or optimization based (at least in part) on the selected task(s) and the available dataset. The model builder 2110 may include a component 2240 for model training. The model training 2240 may produce a trained NLP model that is suitable for evaluation and inference. The model builder 2110 may include a component 2250 for model evaluation. The model evaluation may evaluate the trained model for conformance to one or more requirements, e.g., as indicated in the task definition 2015 and/or according to default values. For example, the requirements may specify one or more thresholds for accuracy, latency, resource usage, and/or other performance metrics or cost values. The requirements may also be referred to as acceptance rules.

If a trained model fails the evaluation 2250, one or more of the model building lifecycle stages may be performed again, e.g., by modifying one or more characteristics of the model until the resulting model passes the evaluation. If a trained model passes the evaluation 2250, the model may be deployed automatically to perform model inference 2260 in a production environment 2180. As discussed above, the lifecycle of a custom NLP model 2135 may include various stages performed using an NLP model runtime component 2150, such as deploying the trained model to a production environment 2180, using the deployed model to provide predictions 2155 (inference) for input documents 2055, monitoring the inference to detect changing conditions in input documents, monitoring the inference to detect changes in the accuracy or performance of the model, and so on.

As shown in FIG. 13, the model runtime 2150 may include a component 2260 for model inference. The inference may be performed synchronously or asynchronously with respect to input documents provided by inference client(s) 2050. The model runtime 2150 may include a component 2270 for inference monitoring. The inference monitoring 2270 may collect data usable for evaluating performance of the model in production and potentially deciding to fine-tune the model. The model runtime 2150 may include a component 2280 for storing, processing, and/or analyzing inference data 2280 collected by the inference monitoring 2270. The inference data 2280 may include one or more input documents for which predictions were generated with confidence scores below a confidence threshold. The inference data 2280 may include one or more input documents that statistically deviate with respect to the task definition from the corpus of documents used for training the model. The inference data 2280 may include one or more performance metrics or resource usage metrics associated with the inference 2260. The use of the inference data 2280 may be configured by the builder client 2010. For example, the client 2010 may configure the service 2100 to sample from inference data 2280, analyze model performance on the inference data (following additional annotation), choose to keep the inference data for retraining, or choose to discard the inference data. In some embodiments, the inference data 2280 may comprise explicit feedback, e.g., feedback generated based (at least in part) on user input about model accuracy. In some embodiments, the inference data 2280 may comprise implicit feedback, e.g., feedback generated in an automated manner. For example, implicit feedback may be generated if a user clicks on a disambiguated mention of an entity in a GUI.

In some embodiments, the lifecycle of a custom NLP model 2135 may include automatically retraining or fine-tuning the model over time, e.g., to adapt to changing conditions observed during inference 2260. Inference data 2280 may be provided to the model builder 2110 in real-time (or near-real-time) or may be accumulated in batches. Analysis of the inference data 2280 may drive retraining. For example, low-confidence model output may be collected for further disambiguation or correction and for incorporation into the training set. As shown in FIG. 13, the inference data 2280 analysis may drive additional data annotation 2220 using the collected inference data 2280. The additional data annotation 2220 may then be used for additional model selection/definition 2230, additional model training 2240, and additional evaluation 2250. Using these additional model building tasks, a custom NLP model may be continuously fine-tuned to ensure that models continue to meet accuracy and performance requirements.

Figure 14A:
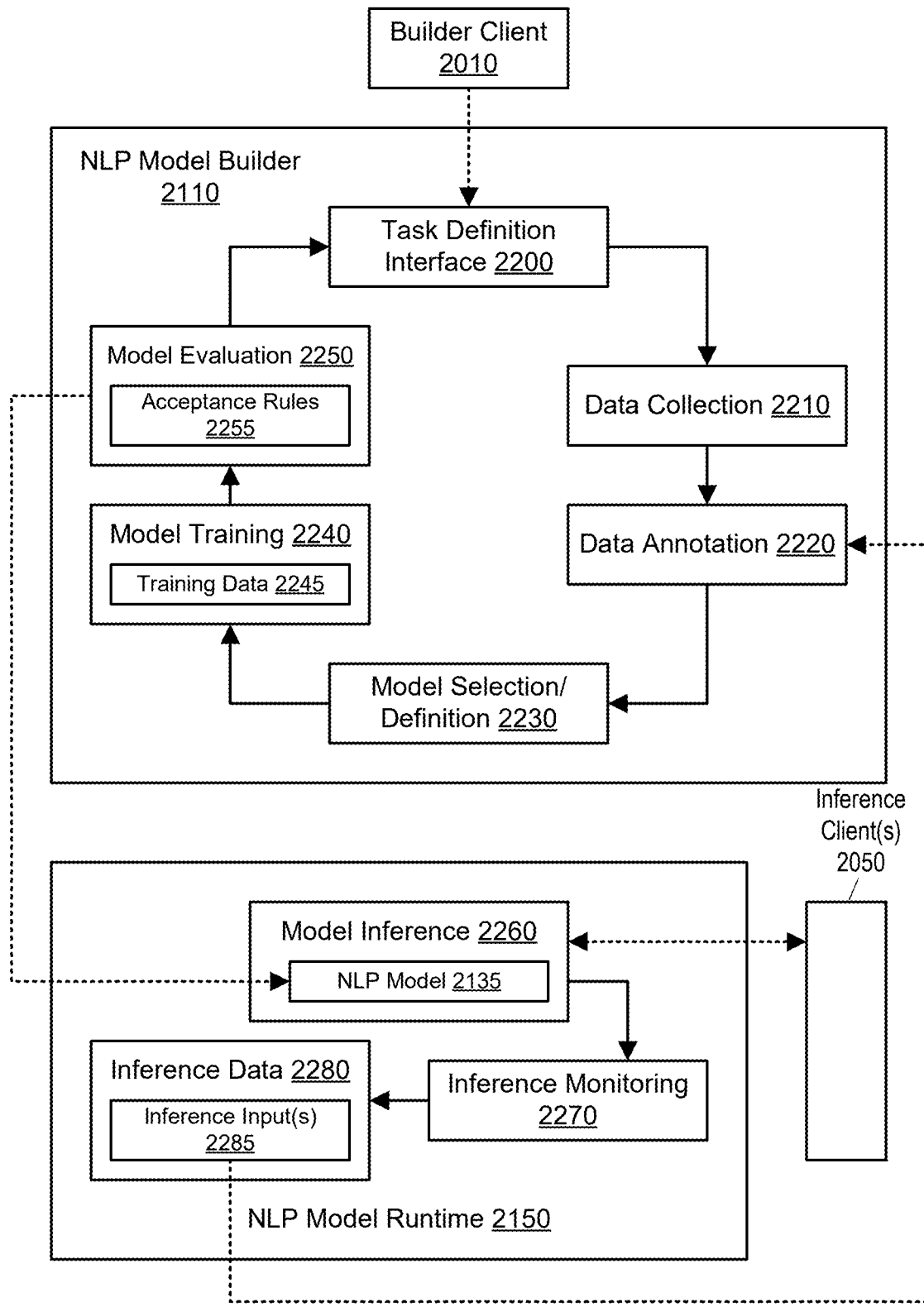
FIG. 14A and FIG. 14B illustrate further aspects of the example system environment for lifecycle management for customized natural language processing, including a feedback loop for NLP model retraining, according to some embodiments.
Figure 14B:
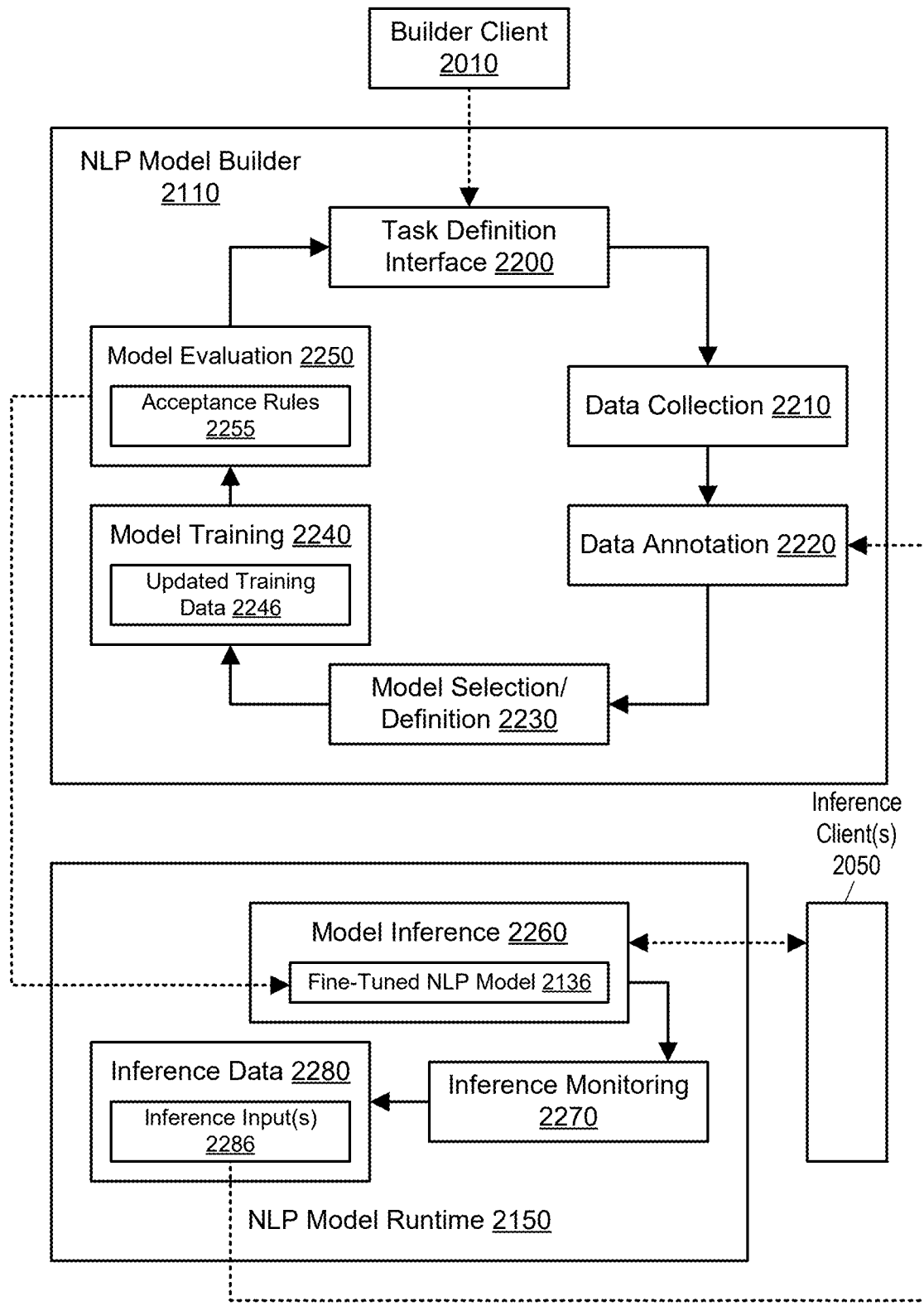

FIG. 14A and FIG. 14B illustrate further aspects of the example system environment for lifecycle management for customized natural language processing, including a feedback loop for NLP model retraining, according to some embodiments. In some embodiments, the service 2100 may provide continuous iteration over model and/or continuous monitoring. The service 2100 may provide capabilities for monitoring model performance in production. The service 2100 may automate a loop of data collection and annotation that feeds a model retraining flow.

As shown in FIG. 14A, a custom NLP model 2135 may be deployed to a production environment to perform model inference 2260. The model 2135 may be deployed to production after being trained using a set of training data 2245 (e.g., a corpus of annotated documents) and evaluated against one or more acceptance rules 2255. Inference based on the model 2135 may be monitored to collect inference data 2280. The inference data 2280 may include one or more inference inputs 2285. For example, the inference input(s) 2285 may include one or more input documents associated with low-confidence outputs and/or one or more input documents that statistically deviate with respect to the task definition from the corpus of documents used for training the model.

As shown in FIG. 14B, the inference input(s) 2285 may be used to drive additional annotation and training stages at the model builder 2110. Analysis of the inference input(s) 2285 may drive additional data annotation 2220 using the inference input(s) 2285. The additional data annotation 2220 may then be used for additional model selection/definition 2230, additional model training 2240 using an updated set of training data 2246, and additional evaluation 2250 against the original set of acceptance rules 2255. After training and evaluation, an updated and fine-tuned model 2136 may be deployed to the production environment for model inference 2260. One or more characteristics of the fine-tuned model 2136 may differ from those of the earlier iteration of the model 2135, and the fine-tuned model may provide improved accuracy and/or performance. The fine-tuned model may again be monitored to collect inference data 2280 such as additional inference input(s) 2286. The additional inference input(s) 2286 may be used to drive additional annotation and training stages at the model builder 2110. Using these additional model building tasks, a custom NLP model may be continuously fine-tuned to ensure that models continue to meet accuracy and performance requirements.

As discussed above, the requirements indicated in the task definition 2015 may include one or more resource usage values or budgetary values that indicate the priorities of the builder client 2010 with respect to lifecycle stages of the custom NLP model 2135. Based (at least in part) on resource usage values specified in the task definition 2015, the service 2100 may select an amount of resources to be used for individual lifecycle stages such as collecting 2210 and/or preparing training data for the model, annotating 2220 the training data, selecting 2230 attributes for the model, training 2240 the model, evaluating 2250 the trained model, using the deployed model to provide inference 2260 for input documents 2055, monitoring 2270 the inference to detect changing conditions in input documents, monitoring the inference to detect changes in the accuracy or performance of the model, retraining or fine-tuning the model over time, and so on. The resource usage values may include an overall budget or value for the entire lifecycle and/or individual budgets or values for various lifecycle stages. For example, the service 2100 may determine a model retraining rate according to the resource usage values, and the model retraining rate may affect how often model retraining is performed. As another example, the service 2100 may determine a training data processing rate according to the resource usage values, and the training data processing rate may affect how often new training data is collected, annotated, and/or corrected for model retraining.

Figure 15:
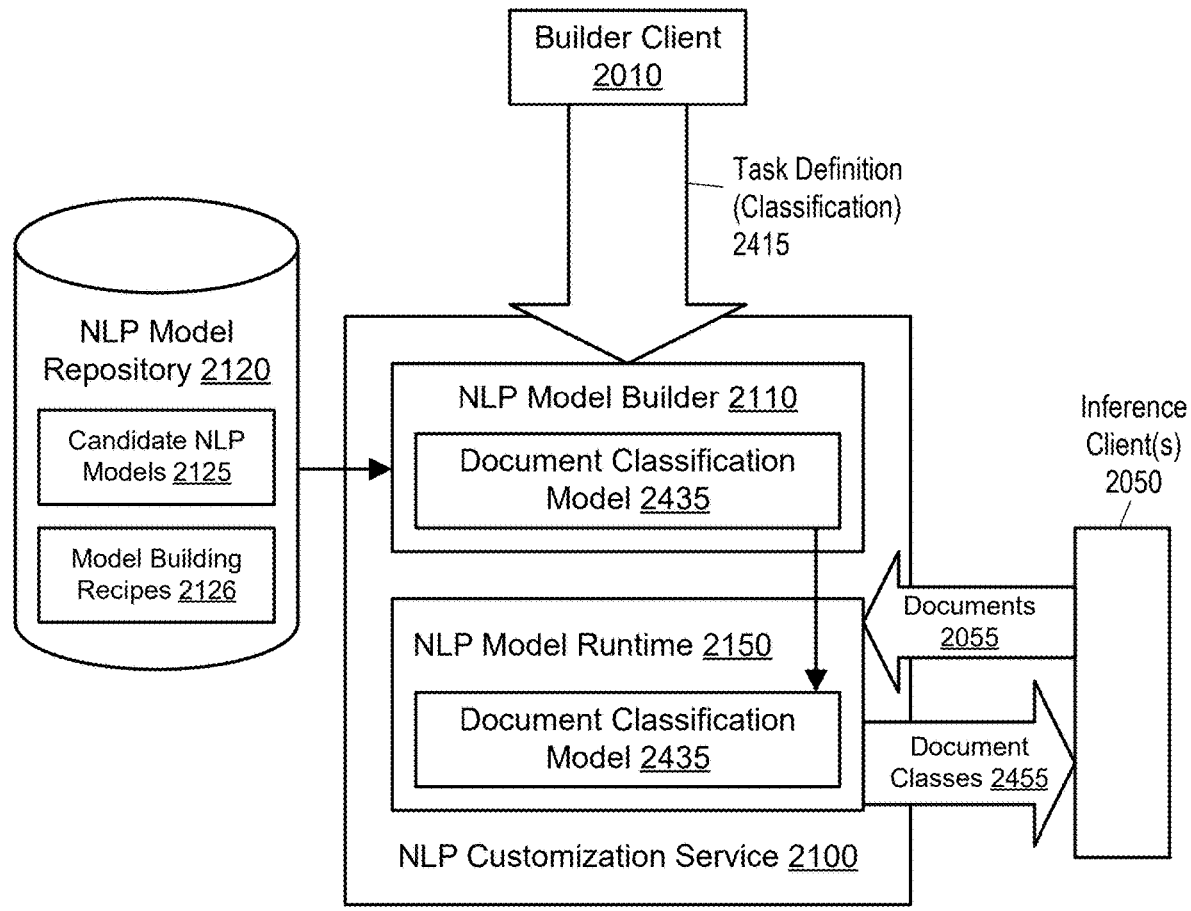
FIG. 15 illustrates further aspects of the example system environment for lifecycle management for customized natural language processing, including use of the NLP customization service to perform custom classification on input documents, according to some embodiments.

FIG. 15 illustrates further aspects of the example system environment for lifecycle management for customized natural language processing, including use of the NLP customization service to perform custom classification on input documents, according to some embodiments. In some embodiments, the NLP customization service 2100 may be used to build and deploy a custom model 2435 for classification of input documents 2055 into various predefined classes or categories. In some embodiments, the input documents 2055 may include news articles, press releases, e-mails, research papers, official reports from governmental sources, and so on. The input documents 2055 may be generated through various publishing channels and outlets by various news sources, private-sector entities, public-sector entities, individuals, groups, and so on. The input documents 2055 may generally include free-form text, e.g., phrases, sentences, paragraphs, headings, sub-headings, captions for images, and so on. The input documents 2055 may represent unstructured information such that the documents may not be associated with pre-determined schemas that describe the structure of document contents. The input documents 2055 may include expressions in one or more natural languages. A natural language expressed in the input documents 2055 may represent a language, such as English, that developed naturally among people, in contrast to an artificial language or a computer programming language.

Clients of the service 2100 may have domain-specific or client-specific requirements for document classification. For example, a particular client in the public health domain may seek to classify documents into categories such as announcements of outbreaks, announcements of new treatments, and so on. As another example, a particular client that analyzes behaviors of private-sector organizations may seek to classify documents into categories such as announcements of mergers and acquisitions, announcements of initial public offerings, product announcements, earnings announcements, announcements of leadership changes, and so on. Existing NLP solutions may be unable to perform such custom classification tasks without a significant investment of time and resources by clients.

Using the NLP customization service 2100, a builder client 2010 may build and deploy a custom document classification model 2435 that classifies input documents 2055 into client-defined categories. The client 2010 may provide a task definition 2415 indicating that the custom NLP solution should perform classification. For example, the client 2010 may select a "classification" option in a user interface associated with the model builder 2110. The classification option may be associated with one or more of the candidate NLP models 2125 and one or more of the model building recipes 2126. The client 2010 may provide the set of client-defined categories. The client 2010 may provide "ground truth" training documents for which classification in the client-defined categories has been established. The training documents may be annotated. Based (at least in part) on the selection of a classification task and on the training documents, the NLP model builder 2110 may automatically select a model topology (from a set of candidate model topologies) or other model characteristics for the document classification model 2435, train the model using the training data, evaluate the trained model according to any requirements (e.g., requirements for accuracy or performance as indicated in the task definition 2415), and deploy the trained model to the runtime component 2150.

At runtime, the document classification model 2435 may be used to assign individual input documents 2055 to individual document classes 2455. Inference client(s) 2050 may provide the input documents 2055, receive the document classification output 2455, and potentially use the output to perform additional tasks. In some embodiments, the additional tasks may include classification-specific NLP tasks such as event extraction or entity extraction that varies according to the document classification. These extraction tasks may be performed using one or more additional custom models that are built and deployed by the service 2100.

Figure 16:
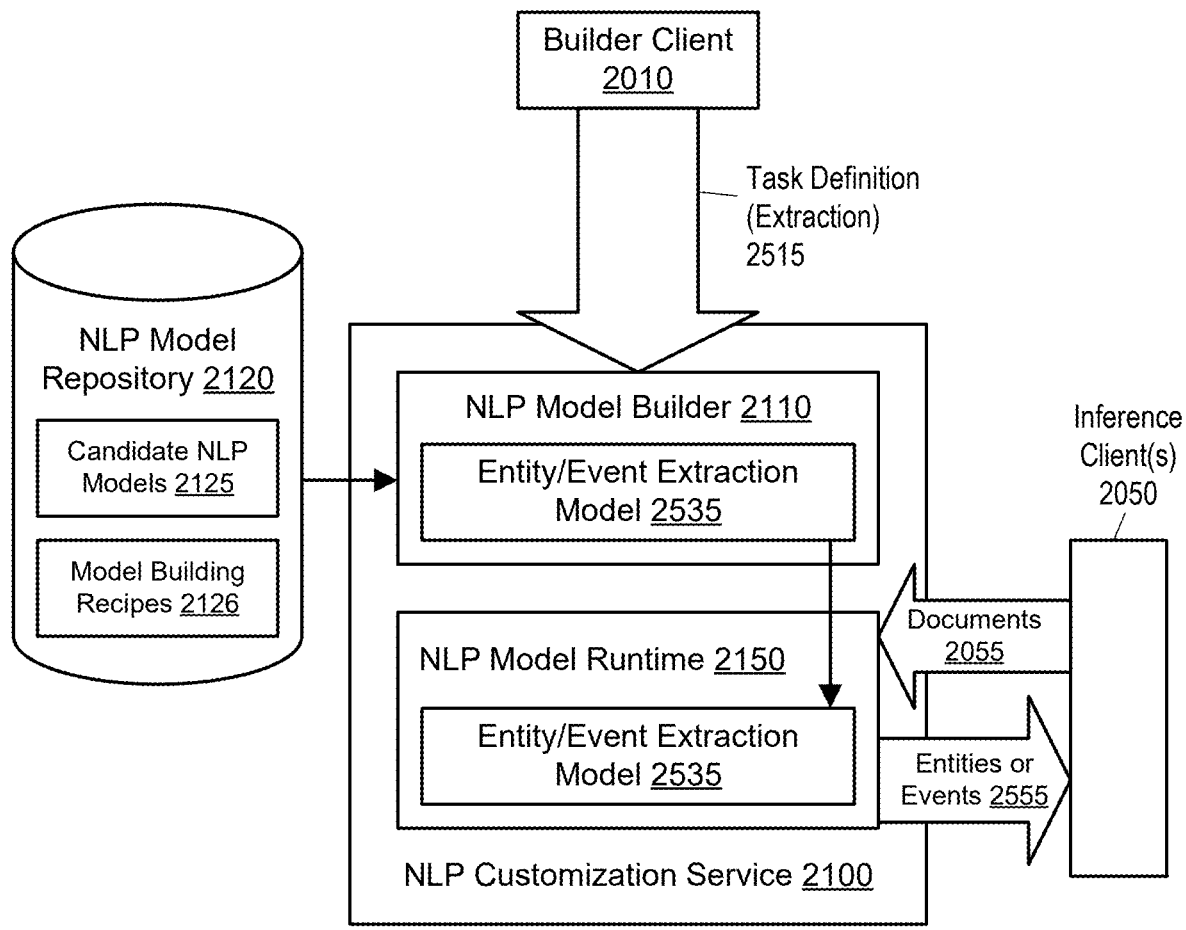
FIG. 16 illustrates further aspects of the example system environment for lifecycle management for customized natural language processing, including use of the NLP customization service to perform custom extraction on input documents, according to some embodiments.

FIG. 16 illustrates further aspects of the example system environment for lifecycle management for customized natural language processing, including use of the NLP customization service to perform custom extraction on input documents, according to some embodiments. In some embodiments, the NLP customization service 2100 may be used to build and deploy a custom model 2535 for extraction of events and/or entities from input documents 2055. In some embodiments, the input documents 2055 may include news articles, press releases, e-mails, research papers, official reports from governmental sources, and so on. The input documents 2055 may be generated through various publishing channels and outlets by various news sources, private-sector entities, public-sector entities, individuals, groups, and so on. The input documents 2055 may generally include free-form text, e.g., phrases, sentences, paragraphs, headings, sub-headings, captions for images, and so on. The input documents 2055 may represent unstructured information such that the documents may not be associated with pre-determined schemas that describe the structure of document contents. The input documents 2055 may include expressions in one or more natural languages. A natural language expressed in the input documents 2055 may represent a language, such as English, that developed naturally among people, in contrast to an artificial language or a computer programming language.

In an NLP extraction task, a trigger may represent a word or short phrase that best expresses the occurrence of an event. An event may represent an occurrence of an event type that happened or could happen in the real world. An event may represent some change of state. A trigger may represent a textual reference to a unique event type and a span of tokens within the input document. Entities may include references to real-world objects such as persons, groups of people, organizations, things, places, dates, and so on. Entities may often be associated with names and pronouns in the input documents 2050. An entity may represent a textual reference to a unique entity type and a span of tokens within the input document.

Clients of the service 2100 may have domain-specific or client-specific requirements for event extraction and/or entity extraction. For example, a particular client in the public health domain may seek to extract information about various events from announcements of outbreaks, announcements of new treatments, and so on. As another example, a particular client that analyzes behaviors of private-sector organizations may seek to extract information about various events from announcements of mergers and acquisitions, announcements of initial public offerings, product announcements, earnings announcements, announcements of leadership changes, and so on. Custom extraction may be performed using a domain-specific or client-specific taxonomy that describes relationships between trigger (event) types and entity types. Existing NLP solutions may be unable to perform such custom extraction tasks without a significant investment of time and resources by clients.

Using the NLP customization service 2100, a builder client 2010 may build and deploy a custom entity/event extraction model 2535 that extracts entities and/or events from input documents 2055. The client 2010 may provide a task definition 2515 indicating that the custom NLP solution should perform extraction. For example, the client 2010 may select an "extraction" option in a user interface associated with the model builder 2110. The extraction option may be associated with one or more of the candidate NLP models 2125 and one or more of the model building recipes 2126. The client 2010 may provide a taxonomy that describes relationships of entity types to event types. The client 2010 may provide "ground truth" training documents for which accurate extraction output has been established. The training documents may be annotated. Based (at least in part) on the selection of an extraction task and on the training documents, the NLP model builder 2110 may automatically select a model topology or other model characteristics for the extraction model 2535, train the model using the training data, evaluate the trained model according to any requirements (e.g., requirements for accuracy or performance as indicated in the task definition 2515), and deploy the trained model to the runtime component 2150.

At runtime, the extraction model 2535 may be used to extract events and/or entities from individual input documents 2055. Inference client(s) 2050 may provide the input documents 2055, receive the extraction output (e.g., extracted entities and/or events) 2555, and potentially use the output to perform additional tasks. For a given document, event extraction using a custom model 2535 may identify words that represent triggers for occurrences of events, identify words (mentions) that represent entities (e.g., real-world objects such as persons, organizations, places, dates, and so on), and assign entities to semantic roles for the triggers (e.g., who, where, when, etc.). In some embodiments, event extraction using a custom model 2535 may group related trigger representations (e.g., synonyms for the same occurrence of a particular event type) and/or group related entity representations (e.g., the initial reference to a named organization as well as subsequent pronouns with the same referent). For a given document, entity extraction using a custom model 2535 may identify words (mentions) that represent entities (e.g., real-world objects such as persons, organizations, places, dates, and so on). Entity extraction using a custom model 2535 may link entities to other data sources, e.g., databases or knowledge bases that contain additional information about the entities.

Event extraction using a custom model 2535 may assign entities to semantic roles associated with triggers or events. An argument may represent an entity or entity group that stands in a particular semantic relationship with respect to an occurrence of an event type. Arguments may fill semantic roles specified by client-specific or domain-specific taxonomies. Role assignment using a custom model 2535 may assign identified entities to one or more of the roles associated with a trigger. Role assignment using a custom model 2535 may select one or more of the identified entities for assignment to one or more roles and may discard or not select others of the identified entities. For example, an input document may be analyzed using a custom model 2535 to detect a trigger ("elected") for an "election" event type and to assign entities to election-related roles such as "Joan Smith" (elected person), "November 3" (date of election), "U.S. House" (office), "New York" (constituency), and so on. The event type and the role assignments may be included in the output 2555 of the custom model 2535 for the particular input document. For the same "election" event, the role assignment may not assign roles to other entities such as other people who are quoted in the document, named family members of Ms. Smith, other dates, other places, and so on. These other entities may be excluded from the output 2535 of the custom model 2535 for the particular input document.

Entity/event extraction using a custom model 2535 may group related entity representations in the same document. Related entity representations may include, for example, the initial reference to a named organization as well as subsequent pronouns (e.g., "it" or "they") or other references to the same organization. Using a trigger (event) co-reference, the custom extraction model 2535 may group related trigger representations in the same document. Related trigger or event representations may include, for example, synonyms for the same occurrence of a particular event type or repeated references to the same occurrence of a particular event type. Using the entity co-reference and the trigger co-reference, the outputs 2555 of the custom extraction model 2535 may be simplified by grouping triggers or entities.

Figure 17:
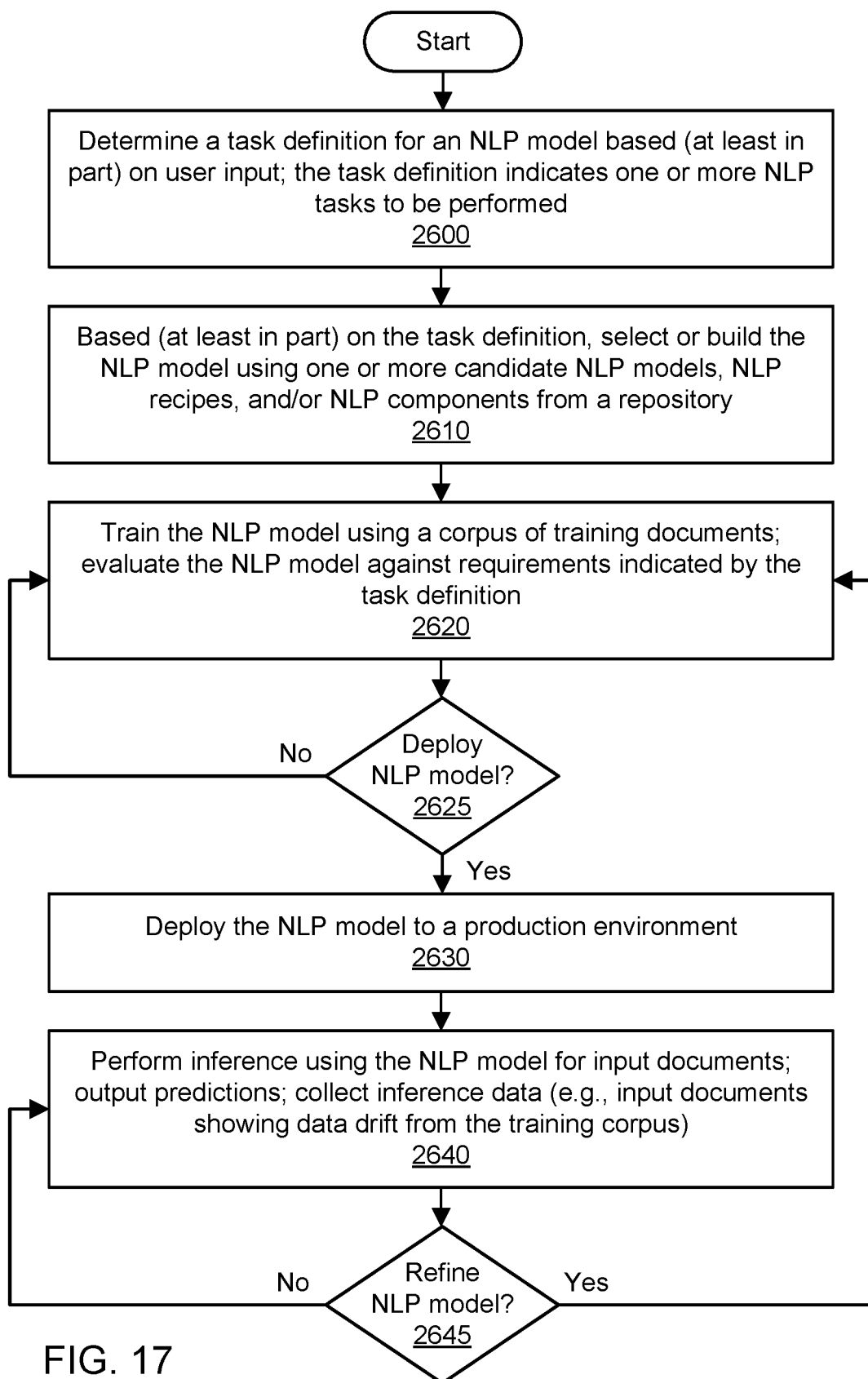
FIG. 17 is a flowchart illustrating a method for lifecycle management for customized natural language processing, according to some embodiments.

FIG. 17 is a flowchart illustrating a method for lifecycle management for customized natural language processing, according to some embodiments. As shown in 2600, a task definition for a natural language processing (NLP) model may be determined. The task definition may be determined based (at least in part) on user input, e.g., from a client of a model builder of an NLP customization service. The task definition may include a selection or indication of one or more NLP tasks to be implemented using a custom NLP model. The task definition may include one or more requirements for use of the custom NLP model in training, evaluation, and/or production. For example, the requirements may indicate a minimum threshold of accuracy. As another example, the requirements may indicate thresholds of performance (e.g., latency metrics for inference).

As shown in 2610, one or more portions of the custom NLP model may be selected or built. Based (at least in part) on the task definition, the model selection may select one or more elements from an NLP model repository. The repository may include a plurality of candidate NLP models associated with different NLP tasks such as document classification, event extraction, entity extraction, and so on. In some embodiments, the repository may include a plurality of model building recipes. The model building recipes may include plans for performing various model building tasks such as collecting and/or preparing training data for the model, annotating the training data, selecting attributes for the model, training the model, evaluating the trained model, and so on. In some embodiments, the operation shown in 2610 may select a plurality of elements from an NLP model toolkit of the repository, e.g., to combine a plurality of NLP tasks into a single custom NLP application.

As shown in 2620, the custom NLP model may be trained using a corpus of training documents and evaluated against one or more requirements indicated by the task definition. The training documents may be collected, annotated, and optionally processed in other ways to generate the training corpus. Similarly, a corpus of evaluation documents may be prepared. As shown in 2625, the method may determine whether to deploy the custom NLP model based (at least in part) on the evaluation. If the model failed the acceptance rules of the evaluation, then the method may proceed again to the operation shown in 2610 or 2620 to modify one or more characteristics of the model and perform additional training and evaluation. However, if the custom NLP model passed the acceptance rules of the evaluation, then as shown in 2630, the model may be deployed to a production environment.

As shown in 2640, the custom NLP model may be used to perform inference in the production environment. The inference may output predictions for a set of input documents. The inference may be monitored to collect inference data. The inference data may include one or more input documents for which predictions were generated with confidence scores below a confidence threshold. The inference data may include one or more input documents that statistically deviate with respect to the task definition from the corpus of documents used for training the model. The inference data may include one or more performance metrics or resource usage metrics associated with the inference. As shown in 2645, the method may determine whether to refine the NLP model based (at least in part) on automated analysis of the accuracy or performance of the model, e.g., based (at least in part) on the inference data. If so, then the method may proceed again to the operation shown in 2610 or 2620 to modify one or more characteristics of the model and perform additional training and evaluation. If not, then the existing NLP model may continue to be used for inference as shown in 2640.

Illustrative Computer System

In at least some embodiments, a computer system that implements a portion or all of one or more of the technologies described herein may include a computer system that includes or is configured to access one or more computer-readable media. FIG. 18 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 18 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

The foregoing may be better understood in view of the following clauses:

Clause 1. A system, comprising:
an event extraction service hosted by a provider network and Internet-accessible by a plurality of clients, wherein the provider network offers a plurality of services including the event extraction service, and wherein the event extraction service comprises one or more processors and one or more memories to store computer-executable instructions that, when executed, cause the one or more processors to:
receive a document comprising a sequence of tokens, wherein the document is provided by an individual one of the clients;
identify one or more event groups in the document, wherein an individual one of the event groups comprises a plurality of textual references to an occurrence of an event type, and wherein the one or more event groups are associated with one or more argument slots representing one or more semantic roles for entities with respect to the one or more event groups;
identify one or more entity groups in the document, wherein an individual one of the entity groups comprises a plurality of textual references to a real-world object type;
assign one or more of the entity groups to one or more of the argument slots; and
provide, to the individual one of the clients, output indicating the one or more event groups and the one or more of the entity groups assigned to the one or more of the argument slots.

Clause 2. The system as recited in clause 1, wherein the one or more memories store additional computer-executable instructions that, when executed, cause the one or more processors to:
determine that a first entity in the document and a second entity in the document refer to a same real-world object corresponding to one of the entity groups.

Clause 3. The system as recited in clause 1, wherein the one or more memories store additional computer-executable instructions that, when executed, cause the one or more processors to:
determine that a first event in the document and a second event in the document refer to a same occurrence corresponding to one of the event groups.

Clause 4. The system as recited in clause 1, wherein the one or more event groups are identified in the document, the one or more entity groups are identified in the document, and the one or more of the entity groups are assigned to the one or more of the argument slots using one or more machine learning models.

Clause 5. A method, comprising:
determining, by an event extraction service, one or more triggers in a document comprising text, wherein an individual one of the triggers comprises a textual reference to an occurrence of an event, and wherein the one or more triggers are associated with one or more semantic roles;
determining, by the event extraction service, one or more entity groups in the document, wherein an individual one of the entity groups comprises a plurality of textual references to a real-world object;
assigning, by the event extraction service, one or more of the entity groups to one or more of the semantic roles; and
generating, by the event extraction service, an output indicating the one or more triggers and the one or more of the entity groups assigned to the one or more of the semantic roles.

Clause 6. The method as recited in clause 5, further comprising:
determining, by the event extraction service, that a first entity in the document and a second entity in the document refer to a same real-world object corresponding to one of the entity groups.

Clause 7. The method as recited in clause 5, further comprising:
determining, by the event extraction service, that a first trigger in the document and a second trigger in the document refer to a same occurrence corresponding to a trigger group.

Clause 8. The method as recited in clause 5, wherein the one or more triggers are identified in the document, the one or more entity groups are identified in the document, and the one or more of the entity groups are assigned to the one or more of the semantic roles using one or more taxonomies that specify relationships between events and entities.

Clause 9. The method as recited in clause 5, wherein the one or more triggers are identified in the document, the one or more entity groups are identified in the document, and the one or more of the entity groups are assigned to the one or more of the semantic roles using one or more machine learning models.

Clause 10. The method as recited in clause 9, wherein the one or more machine learning models are trained using a plurality of annotated documents, wherein the plurality of annotated documents comprise a plurality of labeled triggers, a plurality of labeled entities, and a plurality of labeled argument slots.

Clause 11. The method as recited in clause 5, wherein an individual one of the entity groups comprises one or more entities identified in the document and one or more entities identified in one or more additional documents, wherein the document and the one or more additional documents are provided by a client, and wherein the output indicating the individual one of the entity groups is sent to the client.

Clause 12. The method as recited in clause 5, wherein the event extraction service is hosted by a provider network and Internet-accessible by a plurality of clients via a service interface, and wherein the provider network offers a plurality of services including the event extraction service.

Clause 13. One or more non-transitory computer-readable storage media storing program instructions that, when executed on or across one or more processors, perform:
identifying, using one or more machine learning models, one or more trigger groups in a document comprising a sequence of tokens, wherein an individual one of the trigger groups comprises a plurality of textual references to an occurrence of an event type, and wherein the one or more trigger groups are associated with one or more argument slots representing one or more semantic roles for entities;
identifying, using the one or more machine learning models, one or more entities in the document, wherein an individual one of the entities comprises a textual reference to a real-world object type;
assigning, using the one or more machine learning models, one or more of the entities to one or more of the argument slots; and
generating an output indicating the one or more trigger groups and the one or more of the entities assigned to the one or more of the argument slots.

Clause 14. The one or more non-transitory computer-readable storage media as recited in clause 13, further comprising additional program instructions that, when executed on or across the one or more processors, perform:
determining, using the one or more machine learning models, that a first entity in the document and a second entity in the document refer to a same real-world object corresponding to an entity group.

Clause 15. The one or more non-transitory computer-readable storage media as recited in clause 13, further comprising additional program instructions that, when executed on or across the one or more processors, perform:
determining, using the one or more machine learning models, that a first trigger in the document and a second trigger in the document refer to a same occurrence corresponding to one of the trigger groups.

Clause 16. The one or more non-transitory computer-readable storage media as recited in clause 13, wherein the one or more trigger groups are identified in the document, the one or more entities are identified in the document, and the one or more of the entities are assigned to the one or more of the argument slots using one or more taxonomies that specify relationships between event types and object types.

Clause 17. The one or more non-transitory computer-readable storage media as recited in clause 13, wherein the one or more trigger groups are identified in the document, the one or more entities are identified in the document, and the one or more of the entities are assigned to the one or more of the argument slots using one or more multi-task learning techniques based at least in part on a plurality of taxonomies, wherein an individual one of the taxonomies comprises a plurality of relationships between event types and argument slots.

Clause 18. The one or more non-transitory computer-readable storage media as recited in clause 13, wherein the output excludes one or more of the entities that were not assigned to the one or more argument slots.

Clause 19. The one or more non-transitory computer-readable storage media as recited in clause 13, wherein an individual one of the trigger groups comprises one or more triggers identified in the document and one or more triggers identified in one or more additional documents, wherein the document and the one or more additional documents are provided by a client, and wherein the output indicating the individual one of the trigger groups is sent to the client.

Clause 20. The one or more non-transitory computer-readable storage media as recited in clause 13, further comprising additional program instructions that, when executed on or across the one or more processors, perform:
populating one or more nodes in a knowledge graph based at least in part on the output; or
populating one or more records in a database based at least in part on the output.

Clause 21. A system, comprising:
an entity linking service hosted by a provider network and Internet-accessible by a plurality of clients, wherein the provider network offers a plurality of services including the entity linking service, and wherein the entity linking service comprises one or more processors and one or more memories to store computer-executable instructions that, when executed, cause the one or more processors to:
generate a plurality of contextual representations of entities based at least in part on a plurality of records extracted from a private database, wherein the private database is accessed using an access credential associated with an owner of the private database, and wherein individual ones of the entities correspond to individual ones of the plurality of records of the private database;
identify a mention of an entity in a document, wherein the document comprises text, and wherein the mention of the entity comprises one or more tokens in the text;
select, from the plurality of records of the private database, a record corresponding to the entity, wherein the record corresponding to the entity is selected based at least in part on the plurality of contextual representations of the entities and based at least in part on a context of the mention of the entity in the document; and
generate output comprising a link to the selected record in the private database.

Clause 22. The system as recited in clause 21, wherein the one or more memories store additional computer-executable instructions that, when executed, cause the one or more processors to:

transform the plurality of records in the private database into an intermediate set of records using one or more extract-transform-load (ETL) tools, wherein the plurality of records in the private database are transformed into the intermediate set of records to match a target schema used by the entity linking service, and wherein the plurality of contextual representations of the entities are generated based at least in part on the intermediate set of records expressed in the target schema.

Clause 23. The system as recited in clause 21, wherein a plurality of candidate records in the private database comprise at least one of the tokens, wherein the plurality of candidate records are ranked, and wherein the record is selected from the plurality of candidate records.

Clause 24. The system as recited in clause 21, wherein the plurality of contextual representations comprise vectors.

Clause 25. A method, comprising:
storing, by an entity linking service, a plurality of representations of entities, wherein individual ones of the entities correspond to individual ones of a plurality of records in one or more private data sources;
determining, by the entity linking service, a mention of an entity in one or more documents;
selecting, by the entity linking service from the plurality of records in the one or more private knowledge bases, one or more records corresponding to the entity, wherein the one or more records corresponding to the entity are selected based at least in part on the plurality of representations of the entities and based at least in part on a context of the mention of the entity in the one or more documents; and
generating, by the entity linking service, output comprising a reference to the selected one or more records in the one or more private data sources.

Clause 26. The method as recited in clause 25, further comprising:
extracting and transforming the plurality of records in the one or more private data sources into an intermediate set of records, wherein the intermediate set of records are expressed in a schema used by the entity linking service, and wherein the plurality of representations of entities are generated based at least in part on the intermediate set of records.

Clause 27. The method as recited in clause 25, further comprising:
determining, by the entity linking service, the plurality of representations of the entities using one or more natural language processing (NLP) techniques, wherein the plurality of representations comprise contextual representations.

Clause 28. The method as recited in clause 25, wherein the one or more private data sources are accessed by the entity linking service using one or more access credentials associated with one or more owners of the one or more private data sources.

Clause 29. The method as recited in clause 25, wherein the mention of the entity comprises one or more tokens in text of the one or more documents, wherein a plurality of candidate records in the one or more private data sources comprise at least one of the tokens, and wherein the one or more records are selected from the plurality of candidate records.

Clause 30. The method as recited in clause 25, wherein at least two of the private data sources differ in respective schemas.

Clause 31. The method as recited in clause 25, further comprising:
detecting one or more modified records in the one or more private data sources; and
responsive to the detecting the one or more modified records:
updating, by the entity linking service, the plurality of the representations of the entities;
selecting, by the entity linking service from the one or more modified records in the one or more private data sources, an additional record corresponding to the entity; and
generating, by the entity linking service, additional output comprising a link to the additional selected record in the one or more private data sources.

Clause 32. The method as recited in clause 25, wherein the output comprises a ranked list of the selected records.

Clause 33. One or more non-transitory computer-readable storage media storing program instructions that, when executed on or across one or more processors, perform:
generating and storing, by an entity linking service, a plurality of representations of entities based at least in part on a plurality of records in a proprietary knowledge base, wherein the entity linking service is hosted by a provider network and Internet-accessible by a plurality of clients, and wherein individual ones of the entities correspond to individual ones of the plurality of records in the proprietary knowledge base;
identifying, by the entity linking service, a mention of an entity in a document, wherein the document comprises text;
selecting, by the entity linking service from the plurality of records in the proprietary knowledge base, a record corresponding to the entity, wherein the record corresponding to the entity is selected based at least in part on the plurality of representations of the entities and based at least in part on a context of the mention of the entity in the document; and
generating, by the entity linking service, output comprising a link to the selected record in the proprietary knowledge base.

Clause 34. The one or more non-transitory computer-readable storage media as recited in clause 33, further comprising additional program instructions that, when executed on or across the one or more processors, perform:
extracting and transforming the plurality of records in the proprietary knowledge base into an intermediate set of records using one or more extract-transform-load (ETL) tools, wherein the plurality of records in the proprietary knowledge base are transformed into the intermediate set of records to meet a schema used by the entity linking service, and wherein the plurality of representations of entities are generated based at least in part on the intermediate set of records.

Clause 35. The one or more non-transitory computer-readable storage media as recited in clause 33, wherein the output comprises a ranking of the selected record and one or more additional records in the proprietary knowledge base.

Clause 36. The one or more non-transitory computer-readable storage media as recited in clause 33, further comprising additional program instructions that, when executed on or across the one or more processors, perform:
determining, by the entity linking service, the plurality of representations of the entities based at least in part on a context in the proprietary knowledge base, wherein the plurality of representations are generated using a context-sensitive natural language processing (NLP) document encoder.

Clause 37. The one or more non-transitory computer-readable storage media as recited in clause 33, wherein the proprietary knowledge base is accessed by the entity linking service using an access credential associated with an owner of the proprietary knowledge base.

Clause 38. The one or more non-transitory computer-readable storage media as recited in clause 33, wherein the mention of the entity comprises one or more tokens in the text, wherein a plurality of candidate records in the proprietary knowledge base comprise at least one of the tokens, and wherein the record is selected from the plurality of candidate records.

Clause 39. The one or more non-transitory computer-readable storage media as recited in clause 33, wherein the plurality of representations of the entities are generated based at least in part on a first portion of a plurality of fields in the proprietary knowledge base and not on a second portion of the fields, wherein the first portion of the fields is indicated by a client of the entity linking service.

Clause 40. The one or more non-transitory computer-readable storage media as recited in clause 33, wherein the plurality of representations comprise vectors.

Clause 41. A system, comprising:
a natural language processing (NLP) customization service hosted by a provider network and Internet-accessible by a plurality of clients, wherein the provider network offers a plurality of services including the NLP customization service, and wherein the NLP customization service comprises one or more processors and one or more memories to store computer-executable instructions that, when executed, cause the one or more processors to:
  determine a task definition associated with an NLP model based at least in part on user input, wherein the task definition comprises an indication of one or more tasks to be implemented using the NLP model and one or more requirements associated with use of the NLP model in a production environment;
  select the NLP model from a plurality of candidate NLP models based at least in part on the task definition;
  train the NLP model using a plurality of training documents;
  deploy the NLP model to the production environment after the NLP model is trained;
  perform inference using the NLP model for a plurality of input documents in the production environment, wherein the input documents comprise natural language text, wherein the inference outputs a plurality of predictions to a customer based at least in part on the natural language text, and wherein inference data is collected based at least in part on the inference; and
  refine the NLP model based at least in part on the inference data.

Clause 42. The system as recited in clause 41, wherein the task definition comprises a model accuracy threshold, and wherein the one or more memories store additional computer-executable instructions that, when executed, cause the one or more processors to:
  evaluate an accuracy of the NLP model with respect to the model accuracy threshold; and
  modify the NLP model based at least in part on evaluation of the accuracy of the NLP model.

Clause 43. The system as recited in clause 41, wherein the task definition comprises one or more resource usage values, and wherein the one or more memories store additional computer-executable instructions that, when executed, cause the one or more processors to:
  select a model retraining rate based at least in part on the one or more resource usage values, wherein the NLP model is retrained according to the model retraining rate.

Clause 44. The system as recited in clause 41, wherein the NLP model is configured to perform document classification or event extraction for the plurality of input documents.

Clause 45. A method, comprising:
  determining, by a natural language processing (NLP) customization service, a task definition associated with an NLP model based at least in part on user input, wherein the task definition comprises an indication of one or more tasks to be implemented using the NLP model and one or more requirements associated with use of the NLP model;
  determining, by the NLP customization service, the NLP model based at least in part on the task definition;
  training, by the NLP customization service, the NLP model;
  performing inference using the NLP model for a plurality of input documents, wherein the inference outputs a plurality of predictions based at least in part on the input documents, and wherein inference data is collected based at least in part on the inference; and
  generating, by the NLP customization service, a retrained NLP model based at least in part on the inference data.

Clause 46. The method as recited in clause 45, wherein the task definition comprises a model accuracy threshold, and wherein the method further comprises:
  evaluating, by the NLP customization service, an accuracy of the NLP model with respect to the model accuracy threshold; and
  modifying, by the NLP customization service, one or more characteristics of the NLP model based at least in part on the evaluating.

Clause 47. The method as recited in clause 45, wherein the task definition comprises one or more resource usage values, and wherein the method further comprises:
  selecting, by the NLP customization service, a model retraining rate based at least in part on the one or more resource usage values, wherein the NLP model is retrained according to the model retraining rate.

Clause 48. The method as recited in clause 45, wherein the determining, by the NLP customization service, the NLP model based at least in part on the task definition further comprises:
  selecting, by the NLP customization service, a model topology from a plurality of candidate model topologies.

Clause 49. The method as recited in clause 45, wherein the inference data comprises one or more input documents that statistically deviate with respect to the task definition from a corpus of training documents used in training the NLP model.

Clause 50. The method as recited in clause 45, further comprising:
  collecting, by the NLP customization service, a plurality of training documents;
  annotating, by the NLP customization service, the plurality of training documents, wherein the NLP model is trained using the annotated training documents.

Clause 51. The method as recited in clause 45, wherein the NLP model is deployed to a production environment after being trained, and wherein the method further comprises:

deploying the retrained model to the production environment; and performing additional inference using the retrained NLP model in the production environment for a plurality of additional input documents, wherein additional inference data is collected based at least in part on the additional inference.

Clause 52. The method as recited in clause 45, wherein the NLP customization service is hosted by a provider network and Internet-accessible by a plurality of clients via a service interface, and wherein the provider network offers a plurality of services including the NLP customization service.

Clause 53. One or more non-transitory computer-readable storage media storing program instructions that, when executed on or across one or more processors, perform:
 determining, by a natural language processing (NLP) customization service, a task definition associated with an NLP model based at least in part on user input, wherein the task definition comprises an indication of one or more tasks to be implemented using the NLP model and one or more requirements associated with use of the NLP model in a production environment;
 selecting, by the NLP customization service, the NLP model from a plurality of candidate NLP models based at least in part on the task definition;
 training, by the NLP customization service, the NLP model;
 performing inference using the NLP model for a plurality of input documents, wherein the input documents comprise natural language text, wherein the inference outputs a plurality of predictions based at least in part on the natural language text, and wherein inference data is collected based at least in part on the inference;
 generating, by the NLP customization service, a retrained NLP model based at least in part on the inference data; and
 performing additional inference using the retrained NLP model for a plurality of additional input documents, wherein additional inference data is collected based at least in part on the additional inference.

Clause 54. The one or more non-transitory computer-readable storage media as recited in clause 53, further comprising additional program instructions that, when executed on or across the one or more processors, perform:
 evaluating, by the NLP customization service, a performance of the NLP model with respect to the one or more requirements; and
 modifying, by the NLP customization service, one or more characteristics of the NLP model based at least in part on the evaluating.

Clause 55. The one or more non-transitory computer-readable storage media as recited in clause 53, wherein the task definition comprises one or more resource usage values, and wherein the one or more non-transitory computer-readable storage media further comprise additional program instructions that, when executed on or across the one or more processors, perform:
 selecting, by the NLP customization service, a training data processing rate based at least in part on the one or more resource usage values, wherein training data used in training the NLP model is collected, annotated, or corrected according to the training data processing rate.

Clause 56. The one or more non-transitory computer-readable storage media as recited in clause 53, wherein the inference data comprises one or more input documents that are associated with individual ones of the predictions having confidence scores below a confidence threshold.

Clause 57. The one or more non-transitory computer-readable storage media as recited in clause 53, wherein the NLP model is selected based at least in part on hyperparameter tuning.

Clause 58. The one or more non-transitory computer-readable storage media as recited in clause 53, wherein the NLP model is trained, evaluated, deployed to the production environment, and used for inference in an absence of additional user input from a user that specified the task definition.

Clause 59. The one or more non-transitory computer-readable storage media as recited in clause 53, further comprising additional program instructions that, when executed on or across the one or more processors, perform:
 preparing, by the NLP customization service, a corpus of training documents, wherein the NLP model is trained using the corpus of training documents.

Clause 60. The one or more non-transitory computer-readable storage media as recited in clause 53, wherein the NLP model is trained and evaluated based at least in part on a model building recipe, and wherein the model building recipe is selected based at least in part on the task definition.

What is claimed is:

1. A system, comprising:
 an entity linking service implementing one or more machine learning models and hosted by a provider network and Internet-accessible by a plurality of clients, wherein the provider network offers a plurality of services including the entity linking service, and wherein the entity linking service comprises one or more processors and one or more memories to store computer-executable instructions that, when executed, cause the one or more processors to:
  transform a plurality of records in a private database into an intermediate set of records using one or more extract-transform-load (ETL) tools, wherein the intermediate set of records comprises one or more vector representations of the plurality of records from the private database, wherein the plurality of records in the private database is transformed into the intermediate set of records to match a target schema used by the entity linking service, wherein the private database is accessed using an access credential associated with an owner of the private database;
  generate, using the one or more machine learning models, a plurality of contextual representations of entities based at least in part on the intermediate set of records, wherein individual ones of the entities correspond to individual ones of the intermediate set of records;
  identify, using the one or more machine learning models, a mention of an entity and a mention of an event associated with the entity in a document, wherein the mention of the entity comprises a textual mention of the entity, and wherein the mention of the event associated with the entity comprises a textual mention of the event associated with the entity;
  select, using the one or more machine learning models, a record corresponding to the entity mentioned in the document and the event mentioned in the document from the intermediate set of records, wherein the record corresponding to the entity mentioned in the document and the event mentioned in the document is selected based at least in part on the plurality of contextual representations of the entities from at least the intermediate set of records extracted from the private database and based at least in part on a context identified in the document and related to the event mentioned in the document; and
generate output comprising a link to the selected record in the private database.

2. The system as recited in claim 1, wherein the mention of the entity comprises one or more tokens in text of the document, wherein the intermediate set of records comprises at least one of the tokens, wherein the intermediate set of records is ranked, and wherein the record is selected from the intermediate set of records.

3. The system as recited in claim 1, wherein the plurality of contextual representations comprises vectors.

4. A method, comprising:
storing, by an entity linking service using one or more machine learning models, a plurality of representations of entities, wherein individual ones of the entities correspond to individual ones of a plurality of records in one or more private data sources;
extracting and transforming the plurality of records in the one or more private data sources into an intermediate set of records, wherein the intermediate set of records comprises one or more vector representations of the plurality of records from the one or more private sources, wherein the plurality of records is transformed into the intermediate set of records to match a target schema used by the entity linking service, and wherein the plurality of representations of entities is generated based at least in part on the intermediate set of records;
determining, by the entity linking service using the one or more machine learning models, a mention of an entity and a mention of an event associated with the entity in one or more documents;
selecting, by the entity linking service using the one or more machine learning models, one or more records corresponding to the entity mentioned in the one or more documents and the event mentioned in the one or more documents from the intermediate set of records, wherein the one or more records corresponding to the entity and the event are selected based at least in part on the plurality of representations of the entities from the intermediate set of records and based at least in part on a context identified in the one or more documents and related to the event mentioned in the one or more documents; and
generating, by the entity linking service, output comprising a reference to the selected one or more records in the one or more private data sources.

5. The method as recited in claim 4, further comprising:
determining, by the entity linking service, the plurality of representations of the entities using one or more natural language processing (NLP) techniques, wherein the plurality of representations comprises contextual representations.

6. The method as recited in claim 4, wherein the one or more private data sources are accessed by the entity linking service using one or more access credentials associated with one or more owners of the one or more private data sources.

7. The method as recited in claim 4, wherein the mention of the entity comprises one or more tokens in text of the one or more documents, wherein a plurality of candidate records in the one or more private data sources comprises at least one of the tokens, and wherein the one or more records are selected from the intermediate set of records.

8. The method as recited in claim 4, further comprising:
detecting one or more modified records in the one or more private data sources; and
responsive to the detecting the one or more modified records:
updating, by the entity linking service, the plurality of the representations of the entities;
selecting, by the entity linking service from the one or more modified records in the one or more private data sources, an additional record corresponding to the entity; and
generating, by the entity linking service, additional output comprising a link to the additional selected record in the one or more private data sources.

9. The method as recited in claim 4, wherein the output comprises a ranked list of the selected records.

10. One or more non-transitory computer-readable storage media storing program instructions that, when executed on or across one or more processors, cause an entity linking service to perform:
extracting and transforming, by the entity linking service using one or more machine learning models, a plurality of records in a proprietary knowledge base into an intermediate set of records using one or more extract-transform-load (ETL) tools, wherein the intermediate set of records comprises one or more vector representations of the plurality of records from the proprietary knowledge base, wherein the plurality of records in the proprietary knowledge base is transformed into the intermediate set of records to match a target schema used by the entity linking service;
generating and storing, by the entity linking service using the one or more machine learning models, a plurality of representations of entities based at least in part on the intermediate set of records, wherein the entity linking service is hosted by a provider network and Internet-accessible by a plurality of clients, and wherein individual ones of the entities correspond to individual ones of the intermediate set of records;
identifying, by the entity linking service using the one or more machine learning models, a mention of an entity and a mention of an event associated with the entity in a document, wherein the mention of the entity comprises a textual mention of the entity, and wherein the mention of the event associated with the entity comprises a textual mention of the event associated with the entity;
selecting, by the entity linking service using the one or more machine learning models, a record corresponding to the entity mentioned in the document and the event mentioned in the document and from the intermediate set of records, wherein the record corresponding to the entity mentioned in the document and the event mentioned in the document is selected based at least in part on the plurality of representations of the entities from the intermediate set of records and based at least in part on a context identified in the document and related to the event mentioned in the document; and
generating, by the entity linking service, output comprising a link to the selected record in the proprietary knowledge base.

11. The one or more non-transitory computer-readable storage media as recited in claim 10, wherein the output comprises a ranking of the selected record and one or more additional records in the proprietary knowledge base.

12. The one or more non-transitory computer-readable storage media as recited in claim 10, further comprising additional program instructions that, when executed on or across the one or more processors, perform:

determining, by the entity linking service, the plurality of representations of the entities based at least in part on a context in the proprietary knowledge base, wherein the plurality of representations is generated using a context-sensitive natural language processing (NLP) document encoder.

13. The one or more non-transitory computer-readable storage media as recited in claim 10, wherein the proprietary knowledge base is accessed by the entity linking service using an access credential associated with an owner of the proprietary knowledge base.

14. The one or more non-transitory computer-readable storage media as recited in claim 10, wherein the mention of the entity comprises one or more tokens in the text, wherein a plurality of candidate records in the proprietary knowledge base comprises at least one of the tokens, and wherein the record is selected from the plurality of candidate records.

15. The one or more non-transitory computer-readable storage media as recited in claim 10, wherein the plurality of representations of the entities is generated based at least in part on a first portion of a plurality of fields in the proprietary knowledge base and not on a second portion of the fields, wherein the first portion of the fields is indicated by a client of the entity linking service.

16. The one or more non-transitory computer-readable storage media as recited in claim 10, wherein the plurality of representations comprises vectors.

\* \* \* \* \*